United States Patent
Johnson et al.

(10) Patent No.: US 7,181,401 B2
(45) Date of Patent: *Feb. 20, 2007

(54) METHODS FOR GENERATING VOICE PROMPTS USING GRAMMATICAL RULES IN A SYSTEM PROVING TDM VOICE COMMUNICATIONS AND VOIP COMMUNICATIONS

(75) Inventors: Christopher Sean Johnson, San Jose, CA (US); Scott K. Pickett, Los Gatos, CA (US)

(73) Assignee: Converged Data Solutions LLC, Chicago, IL (US)

( * ) Notice: Subject to any disclaimer, the term of this patent is extended or adjusted under 35 U.S.C. 154(b) by 315 days.

This patent is subject to a terminal disclaimer.

(21) Appl. No.: 10/683,857

(22) Filed: Oct. 10, 2003

(65) Prior Publication Data

US 2004/0128144 A1    Jul. 1, 2004

Related U.S. Application Data

(63) Continuation-in-part of application No. 10/325,763, filed on Dec. 18, 2002, which is a continuation of application No. 09/419,384, filed on Oct. 15, 1999, now Pat. No. 6,560,222, which is a continuation of application No. 09/369,038, filed on Aug. 4, 1999, now Pat. No. 6,633,848, and a continuation-in-part of application No. PCT/US99/07587, filed on Apr. 5, 1999, now abandoned, which is a continuation of application No. 09/167,408, filed on Oct. 6, 1998, now Pat. No. 6,154,465, which is a continuation-in-part of application No. 09/163,596, filed on Sep. 29, 1998, now Pat. No. 6,343,074, which is a continuation-in-part of application No. 09/161,550, filed on Sep. 25, 1998, now Pat. No. 6,208,658.

(51) Int. Cl.
    *G10L 21/00*  (2006.01)
    *H04L 12/66*  (2006.01)

(52) U.S. Cl. ..................... 704/277; 370/353

(58) Field of Classification Search ............... 704/8, 704/277; 370/353
    See application file for complete search history.

(56) References Cited

U.S. PATENT DOCUMENTS

| | | | |
|---|---|---|---|
| 4,958,366 A | 9/1990 | Hashimoto | 379/70 |
| 5,136,633 A | 8/1992 | Tejada et al. | 379/88.2 |
| 5,195,086 A | 3/1993 | Baumgartner et al. | 370/264 |
| 5,333,266 A | 7/1994 | Boaz et al. | 709/206 |
| 5,412,712 A * | 5/1995 | Jennings | 379/88.05 |
| 5,440,615 A * | 8/1995 | Caccuro et al. | 379/88.06 |
| 5,475,738 A | 12/1995 | Penzias | 379/67 |
| 5,479,411 A | 12/1995 | Klein | 379/88 |
| 5,493,606 A * | 2/1996 | Osder et al. | 379/88.05 |
| 5,533,018 A | 7/1996 | DeJager et al. | 370/352 |
| 5,533,110 A | 7/1996 | Pinard et al. | 379/201 |
| 5,541,921 A | 7/1996 | Swenson et al. | 370/376 |
| 5,568,540 A | 10/1996 | Greco et al. | 379/89 |
| 5,652,789 A | 7/1997 | Miner et al. | 379/201 |
| 5,659,597 A | 8/1997 | Bareis et al. | 455/563 |
| 5,689,553 A | 11/1997 | Ahuja et al. | 379/202 |
| 5,761,201 A | 6/1998 | Vaudreuil | 370/392 |
| 5,778,058 A | 7/1998 | Gavin | 379/225 |
| 5,809,021 A | 9/1998 | Diaz et al. | 370/364 |
| 5,809,493 A | 9/1998 | Ahamed et al. | 706/52 |
| 5,812,795 A | 9/1998 | Horovitz et al. | 709/245 |
| 5,821,937 A | 10/1998 | Tonelli et al. | 345/356 |
| 5,838,664 A | 11/1998 | Polomski | 370/263 |
| 5,838,923 A | 11/1998 | Lee et al. | 709/236 |
| 5,841,763 A | 11/1998 | Leondires et al. | 370/260 |
| 5,862,136 A | 1/1999 | Irwin | 370/395 |
| 5,864,560 A | 1/1999 | Li et al. | 370/465 |
| 5,887,139 A | 3/1999 | Madison, Jr. et al. | 709/223 |
| 5,898,830 A | 4/1999 | Wesinger, Jr. et al. | 713/201 |
| 5,912,888 A | 6/1999 | Walsh et al. | 370/355 |
| 5,923,737 A | 7/1999 | Weishut et al. | 379/93.17 |
| 5,926,463 A | 7/1999 | Ahearn et al. | 370/254 |
| 5,940,488 A | 8/1999 | DeGrazia et al. | 379/201 |
| 5,944,786 A | 8/1999 | Quinn | 709/206 |
| 5,946,386 A | 8/1999 | Rogers et al. | |
| 5,950,167 A | 9/1999 | Yaker | 704/275 |

| | | | |
|---|---|---|---|
| 5,978,672 A | 11/1999 | Hartmaier et al. | 455/413 |
| 5,978,835 A | 11/1999 | Ludwig et al. | 709/204 |
| 5,982,767 A | 11/1999 | McIntosh | 370/352 |
| 5,991,723 A | 11/1999 | Duffin | 704/260 |
| 5,996,010 A | 11/1999 | Leong et al. | 709/223 |
| 5,999,179 A | 12/1999 | Kekic et al. | 345/349 |
| 6,003,077 A | 12/1999 | Bawden et al. | 709/223 |
| 6,012,088 A | 1/2000 | Li et al. | 709/219 |
| 6,018,567 A | 1/2000 | Dulman | 379/34 |
| 6,040,834 A | 3/2000 | Jain et al. | 345/356 |
| 6,041,306 A | 3/2000 | Du et al. | 705/8 |
| 6,043,816 A | 3/2000 | Williams et al. | 345/340 |
| 6,044,107 A | 3/2000 | Gatherer et al. | 375/222 |
| 6,044,403 A | 3/2000 | Gerszberg et al. | 709/225 |
| 6,047,053 A | 4/2000 | Miner et al. | 379/201 |
| 6,047,054 A | 4/2000 | Bayless et al. | 379/202 |
| 6,049,531 A | 4/2000 | Roy | 370/260 |
| 6,054,987 A | 4/2000 | Richardson | 345/348 |
| 6,055,574 A | 4/2000 | Smorodinsky et al. | 709/226 |
| 6,058,166 A | 5/2000 | Osder et al. | 370/88.05 |
| 6,154,465 A | 11/2000 | Pickett | 370/465 |
| 6,292,773 B1 | 9/2001 | Bernardes et al. | 379/88.05 |
| 6,366,578 B1 | 4/2002 | Johnson | 370/353 |
| 6,633,848 B1 | 10/2003 | Johnson et al. | 704/277 |
| 6,744,758 B2 | 6/2004 | Pickett | 370/352 |

OTHER PUBLICATIONS

Black, ATM Foundation For Broadband Networks, pp. 137-152, 170-173 (1995).

Stallings, William, SNMP, SNMPv2, SNMPv3, and RMON 1 and 2 third edition, pp. 41-43, 76-77, 80-81, 85-86, 99-101, 110, 138-141, 43-144, 150-152, 155-157, 179, 181-183 (1996).

* cited by examiner

*Primary Examiner*—V. Paul Harper
(74) *Attorney, Agent, or Firm*—Loudermilk + Associates

(57) ABSTRACT

Systems and methods by which voice/data communications may occur in multiple modes/protocols are disclosed. In particular, systems and methods are provided for multiple native mode/protocol voice and data transmissions and receptions with a computing system having a multi-bus structure, including, for example, a TDM bus and a packet bus, and multi-protocol framing engines. Such systems preferably include subsystem functions such as PBX, voice mail and other telephony functions, LAN hub and data router. In preferred embodiments, a TDM bus and a packet bus are intelligently bridged and managed, thereby enabling such multiple mode/protocol voice and data transmissions to be intelligently managed and controlled with a single, integrated system. A computer or other processor includes a local area network controller, which provides routing and hub(s) for one or more packet networks. The computer also is coupled to a buffer/framer, which serves to frame/deframe data to/from the computer from TDM bus. The buffer/framer includes a plurality of framer/deframer engines, supporting, for example, ATM and HDLC framing/deframing. The buffer/framer is coupled to the TDM bus by way of a switch/multiplexer, which includes the capability to intelligently map data traffic between the buffer/framer and the TDM bus to various slots of the TDM frames. Preferably, a DSP pool is coupled to buffer/framer in a manner to provide various signal processing and telecommunications support, such as dial tone generation, DTMF detection and the like. The TDM bus is coupled to a various line/station cards, serving to interface the TDM bus with telephone, facsimiles and other telecommunication devices, and also with a various digital and/or analog WAN network services. Language support for such systems is accomplished by way of a program/data structure so that additional language support may be readily implemented, for example, by a non-software programmer using grammar and voice prompt files, which are preferably located in a predetermined directory in the system.

18 Claims, 46 Drawing Sheets

FIG. 16B

Station Ports

Card/Module: (Slot 1) Analog Station Card, 24-port ▸

State: Disabled ▷

Phone Type: Caller ID ▷

MWI Type: Lamp ▷

Operation Mode: Vmail ▸

● Courtesy Reset
○ Force Reset

☐ Card in Service

| | State | Phone Type | MWI Type | Operation Mode |
|---|---|---|---|---|
| -1- | Enabled | Caller ID | Stutter | Station |
| -2- | Enabled | Basic | Stutter | Station |
| -3- | Enabled | Basic | Lamp | Station |
| -4- | Enabled | Caller ID | Stutter | Station |
| -5- | Enabled | Basic | Stutter | Vmail |
| -6- | Enabled | Basic | Stutter | Station |
| -7- | Enabled | Basic | Lamp | Station |
| -8- | Enabled | Basic | Stutter | Station |
| -9- | Enabled | Basic | Stutter | Station |
| -10- | Enabled | Basic | Stutter | Station |
| -11- | Enabled | Basic | Stutter | Station |
| -12- | Enabled | Basic | Stutter | Station |
| -13- | Enabled | Basic | Stutter | Station |
| -14- | Enabled | Basic | Stutter | Station |
| -15- | Enabled | Basic | Stutter | No Config |
| -16- | Enabled | Basic | Stutter | Station |
| -17- | Enabled | Basic | Stutter | Vmail |
| -18- | Enabled | Basic | Stutter | Station |
| -19- | Enabled | Basic | Stutter | Station |
| -20- | Enabled | Basic | Stutter | Station |
| -21- | Enabled | Basic | Stutter | Station |
| -22- | Enabled | Basic | Stutter | Station |
| -23- | Enabled | Basic | Stutter | Station |
| -24- | Enabled | Basic | Stutter | Station |

[ Restore ]   [ Apply ]   [ Done ]   [ Help ]

Frame Relay Configuration

Virtual Port: [ ] ▽    ☐ Removed    [ Add ]

Port Settings

Name: [                    ]

DLCI (16-991): [ 100 ] ▲▽

LMI Mode: [ User ] ▽

LMI Type: [ T1.617 Annex D ] ▽

Encapsulation: [ RFC1490 ] ▽

[ Restore ]  [ Apply ]  [ Done ]  [ Help ]

| Trunk Monitor | | | | Use Periodic Polling<br>Refresh On Demand | Polling Intervals (in secs): | | |
|---|---|---|---|---|---|---|---|
| Slot | Board | Port | State | | | Called Party | Calling Party |
| 14 | T1 Card | 3 | Incoming Call | | | | 300 |
| 14 | T1 Card | 3 | Incoming Call | | | | 301 |
| 14 | T1 Card | 3 | Incoming Call | | | | 302 |
| 14 | T1 Card | 3 | Incoming Call | | | | 303 |
| 14 | T1 Card | 3 | Incoming Call | | | | 304 |
| 14 | T1 Card | 3 | Incoming Call | | | | 305 |
| 14 | T1 Card | 3 | Incoming Call | | | | 306 |
| 14 | T1 Card | 3 | Outbound Call | | | | 8481307 |
| 14 | T1 Card | 3 | Outbound Call | | | | 8481308 |
| 14 | T1 Card | 3 | Outbound Call | | | | 8481309 |
| 14 | T1 Card | 3 | Outbound Call | | | | 8481310 |
| 14 | T1 Card | 3 | Outbound Call | | | | 8481311 |
| 14 | T1 Card | 3 | Outbound Call | | | | 8481312 |
| 14 | T1 Card | 3 | Outbound Call | | | | 8481313 |
| 14 | T1 Card | 3 | Outbound Call | | | | 8481314 |
| 14 | T1 Card | 3 | Outbound Call | | | | 8481314 |
| 14 | T1 Card | 3 | Outbound Call | | | | 8481314 |
| 14 | T1 Card | 3 | Outbound Call | | | | 8481314 |
| 14 | T1 Card | 3 | Outbound Call | | | | 8481314 |
| 14 | T1 Card | 3 | Outbound Call | | | | 8481314 |
| 14 | T1 Card | 3 | Outbound Call | | | | 8481314 |

Link Monitor

○ Use Periodic Polling    Polling Intervals (in secs): [1]
● Refresh on Demand    [Refresh]

| Slot | Board | Port | Admin | Auto Partition | Link |
|---|---|---|---|---|---|
| 7 | Ethernet Hub Card | 15 | Enabled | No | No Link |
| 7 | Ethernet Hub Card | 16 | Enabled | No | No Link |
| 7 | Ethernet Hub Card | 17 | Enabled | No | No Link |
| 7 | Ethernet Hub Card | 18 | Enabled | No | No Link |
| 7 | Ethernet Hub Card | 19 | Enabled | No | No Link |
| 7 | Ethernet Hub Card | 20 | Enabled | No | No Link |
| 7 | Ethernet Hub Card | 21 | Enabled | No | No Link |
| 7 | Ethernet Hub Card | 22 | Enabled | No | No Link |
| 7 | Ethernet Hub Card | 23 | Enabled | No | No Link |
| 7 | Ethernet Hub Card | 24 | Enabled | No | No Link |
| 5 | Resource Switch C.... | 1 | Enabled | No | No Link |
| 5 | Resource Switch C.... | 2 | Enabled | No | No Link |
| 5 | Resource Switch C.... | 3 | Enabled | No | No Link |
| 5 | Resource Switch C.... | 4 | Enabled | No | No Link |
| 5 | Resource Switch C.... | 5 | Enabled | No | No Link |
| 5 | Resource Switch C.... | 6 | Enabled | No | No Link |
| 5 | Resource Switch C.... | 7 | Enabled | No | Link |
| 5 | Resource Switch C.... | 8 | Enabled | No | No Link |
| 5 | Resource Switch C.... | 9 | Enabled | No | No Link |
| 5 | Resource Switch C.... | 10 | Enabled | No | No Link |
| 5 | Resource Switch C.... | 11 | Enabled | No | No Link |
| 5 | Resource Switch C.... | 12 | Enabled | No | No Link |

[Done]   [Help]

| Link Monitor | | | | | |
|---|---|---|---|---|---|
| ○ Use Periodic Polling | | | Polling Intervals (in secs): 1 | | |
| ● Refresh on Demand | | | Refresh | | |
| Extension | State | Other Party | Display Name | Card | Port |
| | Offhook Active | | Default | 0 | 0 |
| | Offhook Active | | Default | 0 | 0 |
| | Offhook Active | | Default | 0 | 0 |
| | Offhook Active | | Default | 0 | 0 |
| | Offhook Active | | Default | 0 | 0 |
| | Offhook Active | | Default | 0 | 0 |
| | Offhook-Active | | Default | 0 | 0 |
| | Offhook Active | | Default | 0 | 0 |
| | Offhook Active | | Default | 0 | 0 |
| | Offhook Active | | Default | 0 | 0 |
| 571 | Phone is not op... | | Default | 0 | 0 |
| 572 | Phone is not op... | | Default | 0 | 0 |
| 100 | Idle | | Default | 0 | 0 |
| 101 | Idle | | Default | 0 | 0 |
| 102 | Idle | | Default | 0 | 0 |
| 103 | Idle | | Default | 0 | 0 |
| 104 | Idle | | Default | 0 | 0 |
| 105 | Idle | | Default | 0 | 0 |
| 106 | Idle | | Default | 0 | 0 |
| 107 | Idle | | Default | 0 | 0 |
| 108 | Idle | | Default | 0 | 0 |
| 109 | Idle | | Default | 0 | 0 |

[Done] [Help]

Warning: Applet Window

METHODS FOR GENERATING VOICE PROMPTS USING GRAMMATICAL RULES IN A SYSTEM PROVING TDM VOICE COMMUNICATIONS AND VOIP COMMUNICATIONS

This is a continuation of application Ser. No. 09/369,038, filed Aug. 4, 1999, now U.S. Pat. No. 6,663,848, which is a continuation-in-part of application Ser. No. 10/325,763, filed Dec. 18, 2002, which is a continuation of Ser. No. 09/419,384, filed Oct. 15, 1999, now U.S. Pat. No. 6,560,222, which is a continuation of Ser. No. 09/167,408, filed Oct. 6, 1998, now U.S. Pat. No. 6,154,465, which is a continuation-in-part of Ser. No. 09/163,596, filed Sep. 29, 1998, now U.S. Pat. No. 6,343,074, which is a continuation-in-part of Ser. No. 09/161,550, filed Sep. 25, 1998, now U.S. Pat. No. 6,208,658. This also is a continuation-in-part of International Application PCT/US99/07587 filed Apr. 5, 1999, with an international filing date of, now abandoned.

FIELD OF THE INVENTION

The present invention relates to systems and methods for transmitting and receiving voice and data in multiple modes, and more particularly to systems and methods for multiple native mode voice and data transmissions and receptions with a communications system having a multi-bus structure, including, for example, a time division multiplexed ("TDM") bus, a packet bus, and a control bus, and multi-protocol framing engines, preferably including subsystem functions such as PBX, voice mail, file server, web server, communications server, telephony server, LAN hub and data router, and method for performing telephony and data functions using the same, and still more particularly to methods for implementing language capabilities using such systems and methods.

BACKGROUND OF THE INVENTION

U.S. application Ser. No. 09/055,072, was filed on Apr. 3, 1998, for Systems and Methods for Multiple Mode Voice and Data Communications Using Intelligently Bridged TDM and Packet Buses; U.S. application Ser. No. 09/055,036, was filed on Apr. 3, 1998, for System arid Method for Generating Voltages in Telephony Station Cards; U.S. application Ser. No. 09/161,550, was filed on Sep. 25, 1998, for Systems and Methods for Multiple Mode Voice and Data Communications Using Intelligently Bridged TDM and Packet Buses and Methods for Performing Telephony and Data Functions Using the Same; U.S. application Ser. No. 09/163,596, was filed on Sep. 29, 1998, for Systems and Methods for Multiple Mode Voice and Data Communications Using Intelligently Bridged TDM and Packet Buses and Methods for Performing Telephony and Data Functions Using the Same; U.S. application Ser. No. 09/167,408, was filed on Oct. 6, 1998, for Systems and Methods for Multiple Mode Voice and Data Communications Using Intelligently Bridged TDM and Packet Buses and Methods for Performing Telephony and Data Functions Using the Same; and U.S. application Ser. No. 09/283,101, was filed on Mar. 31, 1999 for Systems and Methods For Multiple Mode Voice and Data Communications Using Intelligently Bridged TDM and Packet Buses and Methods For Performing Telephony And Data Functions Using the Same.

Businesses, particularly small to medium size offices, typically have a need for a variety of voice and data communications. For example, a typical office might have a dedicated fax machine, using a dedicated or shared telephone line, one or more telephone lines for voice communications, perhaps coupled to a central or distributed voice mail system(s), and one or more computers or computer networks, often coupled to telephone lines via one or more modems. Many offices now use the Internet in some form for business communications or research or the like, often by way of a modem or modem pool coupled to individual computers.

Typically, such business communication needs have been fulfilled with piecemeal technical solutions, typically from separate equipment and service vendors, and with separate hardware, software and design considerations.

FIG. 1 illustrates a conventional small office communication configuration. Voice communication system 1 typically is implemented by way of multiple analog trunk 16 from wide area network ("WAN") 18. WAN 18 often consists of a telecommunication network by way of a local telephone company or other telecommunications service provider. Analog trunk 16 may be directed through switching system 10, which may be a conventional PBX or similar telephone switch. Telephones 12 and voice mail system 14 are coupled to switching system 10. Often, dedicated analog line 16A is coupled to facsimile 44 for facsimile communications.

Data system 2 typically is implemented with a plurality of computers (or workstations, etc.) 24 interconnected by way of packet network 26, which may be a standard Ethernet compliant network or other office network. Network 26 often is coupled to remote access server 32, which is connected to one or more analog trunks 40, and which may include one or more modems in a modem pool. Computers 24 may communicate with remote systems via the modem pool of remote access server 32 over analog lines 40 and WAN 42. Network 26 @typically includes a connection to printer 22 and file server 20. In more sophisticated systems, network 26 may be coupled to switching hub 28 and router 30, which is coupled to WAN 42 over digital trunks 38. Data system 2 also may include a connection between one or more of computers 24 to modem 36, which in term is coupled to WAN 42 over dedicated analog trunk 40A.

Such a conventional system often is characterized by piecemeal equipment and network solutions, limited or non-existent coordination and management between voice system 1 and data system 2, non-optimized or non-integrated equipment, and inefficient use of costly network services (telephone lines, data lines, etc.), such as duplicate and often idle phone and data network lines, often provided from multiple equipment/service providers. In general, such conventional systems are neither constructed nor operated in a manner to provide efficient and integrated voice/data communications.

With respect to language capabilities in such systems, in previous systems supporting voice/audio prompt and information capabilities, it was understood that, due to the particular intricacies and nuances of the particular languages (e.g., sentence structure, syntax, grammar, dialects, etc.), such voice/audio prompts and/or information (as used hereinafter, generally "voice prompts") are programmed uniquely for each set of voice prompts for each language. Thus, for each particular language or language variant to be supported in the system, software must be written to specifically implement the set of voice prompts to support the particular language or language variant. This typically would require that a programmer and a linguist or other language specialist expend substantial time and resources, etc., to specifically write code for each particular language/ language variant to be supported by the system. As the need for additional language/language variant support arises, this inevitably results in substantial delays and expense while such software is developed and debugged, etc.

SUMMARY OF THE INVENTION

The present invention is intended to address various disadvantages of such conventional communication systems. The present invention provides various systems and methods, perhaps more succinctly a platform, by which voice and data communications may occur in multiple modes and various protocols, and more particularly systems and methods for multiple native mode voice and data transmissions and receptions with a communications/computing system having a multi-bus structure, including, for example, a TDM bus, a packet bus and a control bus, and multi-protocol framing engines, preferably including subsystem functions such as PBX, voice mail and other telephony functions, email and/or file server, Internet server, LAN hub and data router. With the present invention, a platform and various processes are provided in which a TDM bus and a packet bus are intelligently bridged and managed, thereby enabling such multiple mode/protocol voice and data transmissions to be intelligently managed and controlled with a single, integrated system.

In preferred embodiments, a computer or other processor includes a local area network controller, which provides routing and hubs and/or switches for one or more packet networks. The computer also is coupled to a multiple buffer/framer, which serves to frame/deframe data to/from the computer from TDM bus. The buffer/framer includes a plurality of framer/deframer engines, supporting, for example, ATM and HDLC framing/deframing, and raw buffering of voice data or the like. The buffer/framer is coupled to the TDM bus by way of a multiple port or multiport switch/multiplexer, which includes the capability to intelligently map data traffic between the buffer/framer and the TDM bus to various slots of the TDM frames. Preferably, a DSP pool is coupled to one or more switch/multiplexer ports and/or the buffer/framer in a manner to provide various signal processing and telecommunications support, such as dial tone generation, DTMF detection and the like. The TDM bus is coupled to a various line/station cards, serving to interface the TDM bus with telephone, facsimiles and other telecommunication devices, and also with a various digital and/or analog WAN network services. The present invention provides a platform by which processing functions may be switched to provide support for a wide range of network, vendor and application services.

With the present invention, a full PBX-type telecommunication system may be provided by way of the computer/processor and associated telephony hardware and software. Functions such as voice mail, automated attendant, call forwarding, hold, transfer, caller ID, conferencing and other telephony functions may be similarly provided. While supporting such telephony functions in their native mode primarily by way of the TDM bus, the computer/processor also supports concurrent packet data transmissions over the LAN subsystem and packet bus(es). As needed to efficiently support various voice/data communications in the particular office/work environment, the buffer/framer and switch/multiplexer provide a multi-protocol router functionality, enabling the TDM bus traffic and the packet bus traffic to be intelligently bridged and managed without degradation of each other, and without requiring translation or transcoding.

With the present invention, the same WAN services may be intelligently managed and controlled for simultaneous voice, video, and data traffic.

The computer/processor supports a variety of applications, such as remote configuration, management and back-up, bandwidth allocation and control, least cost routing, voice over Internet Protocol (or "voice over IP"), as well various telephony related applications. In certain preferred embodiments, audio/video data streams, including such as H.320 and H.323 data streams, also are intelligently managed and controlled. In certain preferred embodiments, management applications (such as the SNMP protocol) enable the system to be remotely monitored and configured via a web browser-type access.

In accordance with particular preferred embodiments of the present invention, language support for such systems is accomplished by way of a program/data structure so that additional language support may be readily implemented by a non-software coder using grammar and voice prompt files, which are preferably located in a predetermined directory in the system. Thus, in the example of the need to add a language/language variant to a particular system, grammar and voice prompt files may be created by a person (or persons) with appropriate knowledge in the particular language/language variant, without requiring the development of specific software (by a software programmer, etc.) to implement such additional language/language variant.

In accordance with the present invention, various telephony and data functions useful in offices and other settings may be more conveniently and efficiently performed, and various methods for performed telephony and data functions are provided in accordance with various preferred embodiments of the present invention.

Accordingly, it is an object of the present invention to provide simultaneous voice, video and data communications with a single, integrated system.

It is another object of the present invention to provide an intelligently controlled and managed processor bridge between one or more TDM buses and one or more packet buses.

It is yet another object of the present invention to provide an integrated PBX, router and hub to support such simultaneous voice, video and data communications.

It is still another object of the present invention to provide a multi-protocol buffer/framer and switch/multiplexer in order to provide multi-protocol routing and intelligent time slot mapping to the TDM bus, preferably including DSP resources coupled to the buffer/framer.

It is an object of the present invention to provide systems and methods allowing a broad set of services and functions to co-exist in the same system, and leveraging shared resources while providing a high level interface and intelligence that allows for the shared resources to be dynamically allocated and re-allocated.

It is an object of the present invention to provide various methods of performing telephony and data functions in novel and more efficient ways, particularly in combination with the various preferred embodiments of systems in accordance with the present invention.

Finally, it is an object of the present invention to provide improved methods for implementing language capabilities in such systems, including providing language support for such systems by way of a program/data structure so that additional language support may be readily implemented by a non-software coder using grammar and voice prompt files, which are preferably located in a predetermined directory in the system.

Other objects, features and advantages of the various embodiments of the present invention described herein will be apparent to those skilled in the art.

BRIEF DESCRIPTION OF THE DRAWINGS

The above objects and other advantages of the present invention will become more apparent by describing in detail the preferred embodiments of the present invention with reference to the attached drawings in which:

FIG. 16B illustrates a window for configuration of T-1 channels of a particular communications system in accordance with preferred embodiments of the present invention;

FIG. 16C illustrates a window for configuration of station ports of a station card in accordance with preferred embodiments of the present invention;

FIG. 16E illustrates a window for configuration of frame relay type WAN resources in accordance with preferred embodiments of the present invention;

FIG. 17B illustrates a window for providing a trunk monitoring function in accordance with preferred embodiments of the present invention;

FIG. 17C illustrates a window for providing a link monitoring function in accordance with preferred embodiments of the present invention;

FIG. 17D illustrates a window for providing a station monitoring function in accordance with preferred embodiments of the present invention;

DETAILED DESCRIPTION OF THE PREFERRED EMBODIMENTS

Although various preferred embodiments of the present invention will be disclosed for illustrative purposes, those skilled in the art will appreciate that various modifications, additions and/or substitutions are possible without departing from the scope and spirit of the present invention.

The present invention is particularly directed at methods of implementing language capabilities in systems having voice mail and similar functionality. The present invention has been discovered to particularly advantageously utilized in systems such as those disclosed in PCT/US99/07587, which is hereby incorporated by reference. After a discussion of various attributes, features and advantages of such systems, particular aspects of methods of implementing language capabilities in accordance with preferred embodiments of the present invention will then be described.

Figure 2:
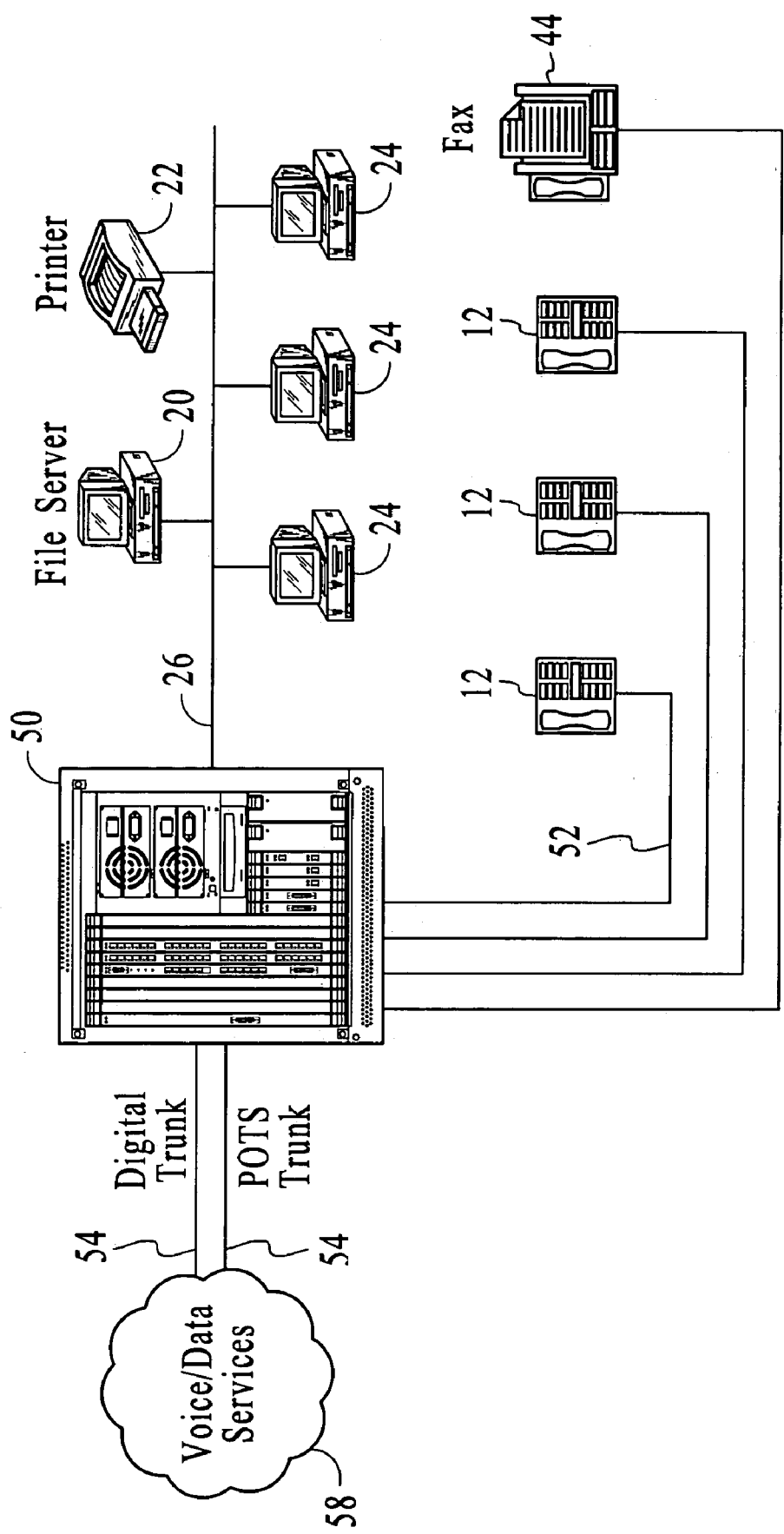
FIG. 2 provides an overview of an office communications system in accordance with preferred embodiments of the present invention.

In accordance with preferred embodiments of the present invention, systems and methods are provided to enable voice, data, video and other communications to occur in an efficient and integrated manner, intelligently allocating and utilizing available communications resources. FIG. 2 provides an overview of such a system in accordance with one preferred embodiment of the present invention.

Communications system 50 provides an integrated system for controlling and managing communications such as in an office. Communications system 50 communicates over ports 26 to file server 20, printer 22 and one or more computers 24. Ports 26 typically includes a packet bus such as Ethernet, "fast" Ethernet, ATM or other LAN technology (in other embodiments, LAN technology, such as token ring, may be coupled to an appropriately configured port). Communications system 50 includes devices for controlling ports 26, including controllers such as what are known as a network interface controller (NIC), which may integrate a media access controller (MAC) for control of and interface to ports 26. Connected to ports 26 may be a variety of devices, such as one or more file servers 20, computers 24, printers 24 and other computing, peripheral or similar devices suitable for interconnection with ports 26. Other network devices, such as routers, switches, bridges and the like also may be connected to ports 26. In a one preferred embodiment, ports 26 is an Ethernet-type LAN to which is connected to a variety of devices as determined by the needs of the particular office/work environment. The present invention effective integration of the packet data LAN and router-type functions with the telephony and server functions, which enables unique operations and the initiation or completion of calls or transactions or the like, without having access to traditional, dedicated devices, peripherals and communications services.

It will be appreciated that communications system 50 also may implement hardware and software for additional network functions, which are included in alternative embodiments. Such network functions include, but are not limited to: name server, such as DNS (Domain Naming System, which is used in the Internet for translating names of host computers into addresses) or WINS (Windows Internet Name Service, which is a name resolution service that maps or resolves Windows networking computer names to IP addresses particularly in a routed environment); firewall (as is known in the art, a firewall is a hardware/software implement that limits the exposure of a computing system such as communications system 50 or computers coupled thereto to access from a computer external to the system, which may include a network level firewall or packet filter that examines data traffic at the network protocol packet level, or an application-level firewall that examines data traffic at the application level, such as FTP or file transfer protocol, email, etc.); proxy server (as is known in the art, a proxy server is a type of firewall that uses a process known as address translation to map internal user IP addresses to the IP address associated with the proxy server firewall in order to provide extra security, etc.); DHCP (Dynamic Host Configuration Protocol, which is a protocol which allows a server to assign dynamically IP addresses to particular computers in real time, etc., which may support manual, automatic and/or dynamic address assignment, which may be used to verify a particular computer's identify, temporarily assign it an IP address for a particular period of time, and reclaim the IP address later for reassignment at the expiration of the particular period of time, etc.); and/or email server or gateway (which, as is known in the art, may be used to send and receive emails and/or send and receive faxes for the computers connected to the LAN or LANs, etc.).

Communications system 50 includes the functionality of what is known as a PBX (as will be described further). In preferred embodiments, communications system 50 is connected to a plurality of telecommunication devices, such as telephones 12, facsimile 44 and other suitable telecommunications devices and access and server functions (such as private voice mail, recording devices, WAN service interface cards, etc.). What is important is that communications system 50 include interfaces for a plurality of telecommunications devices for the particular and complete office/work environment and infrastructure.

Communications system 50 is coupled to WAN voice/data services network(s) 58 through trunks 54. Voice/data services network(s) may include private line, local or long distance carrier networks, Internet, intranet and/or any other current or future WAN-type network services. Trunks 54 may consist of high, medium or low speed digital and/or analog lines, either public or private, and in certain preferred embodiments consist of high speed dedicated resources such as what are known as T-1, PRI (Primary Rate ISDN), ATM, VDSL, HDSL, ADSL, DDS (Dataphone Digital Service, also called Digital Data System), wireless, cascade, proprietary and/or twisted pair analog lines from a local telephone company. What is important is the communications system 50 is coupled to WAN services, trunks and the like in a manner that the user, service provider, administrator and/or algorithm has determined will provide adequate or required resources, on a cost-effective basis, for the particular office/work environment and operating conditions.

Figure 1:
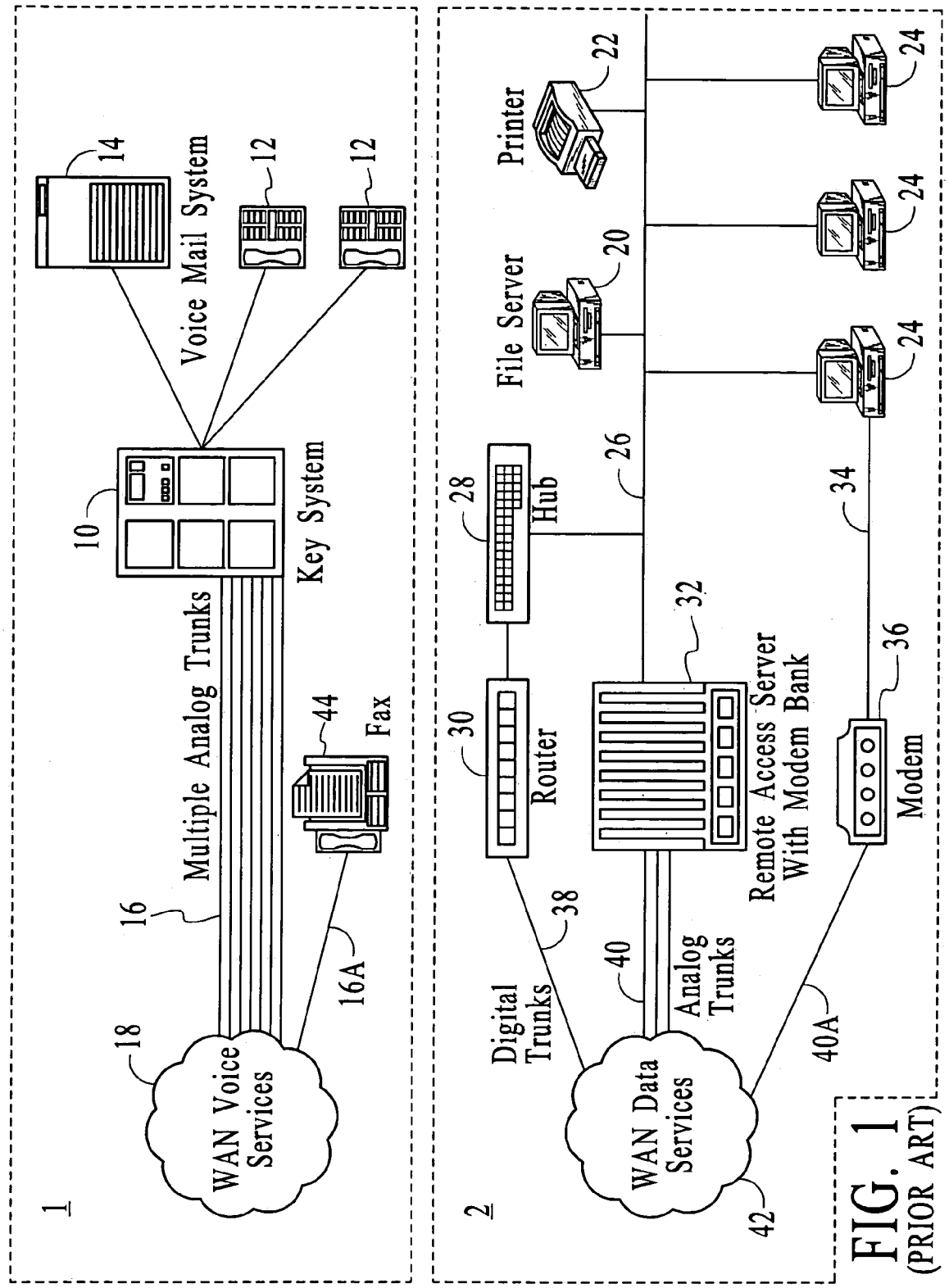
FIG. 1 illustrates a typical, conventional office communications configuration.

In contrast to FIG. 1, the communications system of FIG. 2 provides an integrated solution for voice and data communication services, to which may be connected the WAN network services and telecommunications, computing and other devices as determined by the particular office/work environment.

Figure 3:
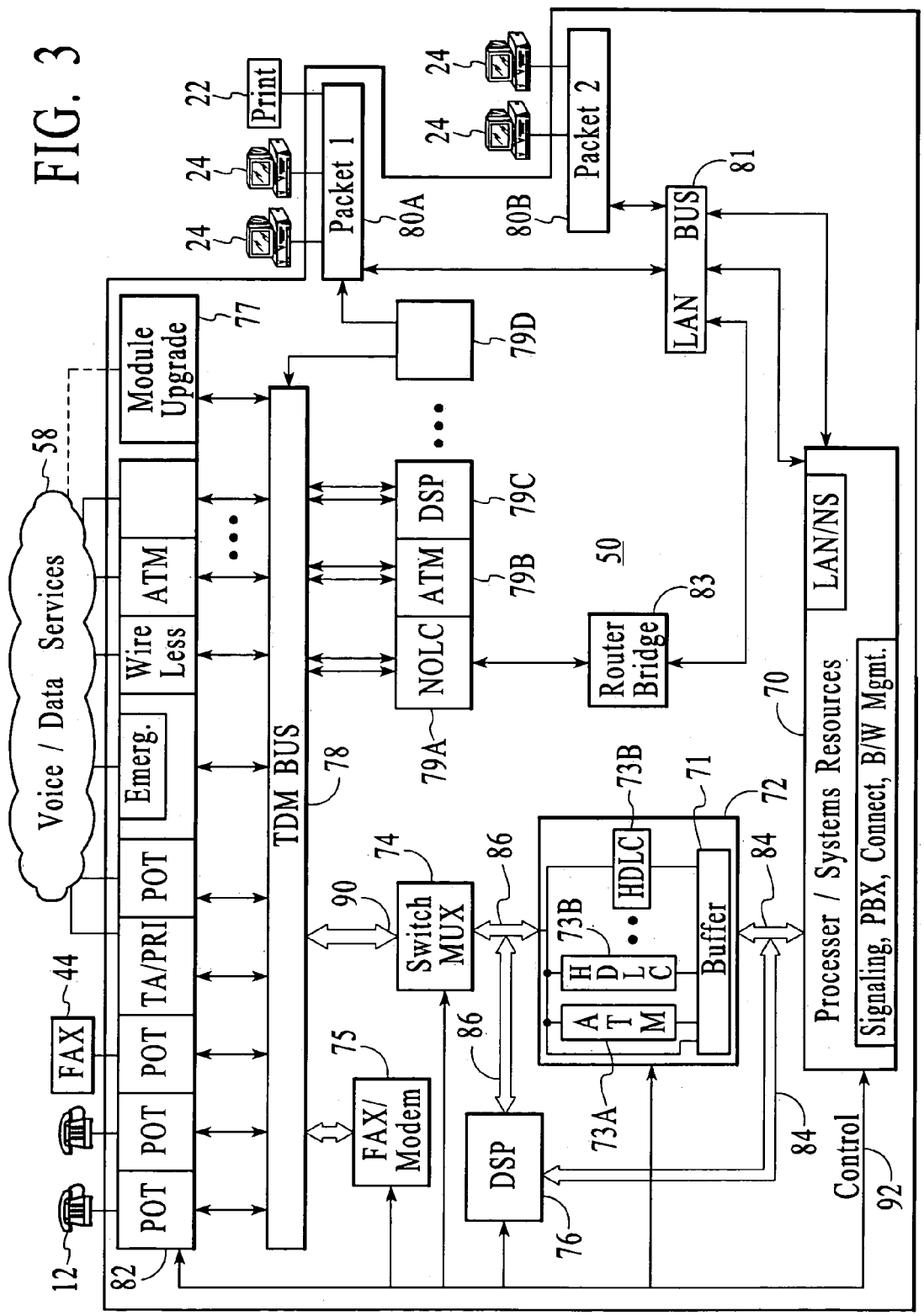
FIG. 3 is a block diagram illustrating preferred embodiments of the present invention.

Referring to FIG. 3, various subsystems, components, buses and the like of preferred embodiments of communications system 50 will be described in greater detail.

Communications system 50 is controlled by host processor/system resources 70, which in preferred embodiments include a computer powered, for example, by a commercially available or other microprocessor and an embedded and/or commercially available operating system What is important is that processor/system resources 70 provide sufficient processing power, memory and storage resources (RAM, ROM, hard disk, magnetic or other storage, etc.), bus and other resources in order to control the various subsystems and components as will be described. In particular, computer/system resources 70 enables automatic internal negotiation, control and enabling of services and applications. Although not expressly shown, processor/system resources 70 also may include other components of a relatively high-end personal computer, workstation or server, such as a display device, keyboard, serial ports, parallel ports, power supply and the like. The various subsystems and components of communications system 50 are intelligently controlled, managed and monitored by processor/system resources 70. Processor/system resources 70 provides system and server management software and the like, and a platform for various server applications as described herein.

Host processor/system resources 70 is coupled to buffer/framer 72 via bus 84, which in preferred embodiments consists of a computer bus such as what are known as a PCI bus or ISA bus (in other embodiments, other suitable computer-type buses are utilized, which may include proprietary local buses). Buffer/framer 72 includes buffer 71 and preferably includes a plurality of multi-protocol framing/deframing engines, such as for what are known as asynchronous transfer mode (ATM) or high-level data link control (HDLC) protocols, which may be synchronous or asynchronous. In other embodiments, other communication protocol framers/deframers are provided, as may be desired by the particular office/work environment. Buffer/framer 72 in certain preferred embodiments includes, for example, one or more ATM framers/deframers 73A and one or more, and preferably a plurality of HDLC framers/deframers 73B. Although not expressly shown, buffer/framer 72 includes other controlling circuits (such as a slot mapping memory, multiplexers/demultiplexers, arbitration, control and other circuitry) such as, for example, described in U.S. Pat. No. 5,533,018 to DeJager, et al. for "MULTI-PROTOCOL PACKET FRAMING OVER AN ISOCHRONOUS NETWORK," which is hereby incorporated by reference. As will be described in greater detail, buffer/framer 72 includes the capability to transfer raw or protocol-processed data, which may be mapped to particular slots of TDM bus 78 and made available on different ports. Buffer/framer 72 is controlled by processor/system resources 70 as diagrammatically indicated by control line(s) 92 (control line(s) 92 may be implemented as part of a bus structure, such as bus 84). In preferred embodiments, processor/system resources 70 includes redundant disk or other storage, redundant power supplies and data back-up to magnetic or other media in order to enhance fault tolerance of the system.

Processor/resources 70 also may be connected to DSP 76. DSP 76 preferably consists of a single digital signal processor or multi-digital signal processor resource pool, which serves to provide a variety of functions within communications system 50. In preferred embodiments, DSP 76 generates dial tones (such as for telephones 12), DTMF digit detection and decoding, echo cancellation, coding/decoding functions, voice conferencing, voice compression, voice recognition and the like. In other embodiments, DSP 76 performs data compression, transcoding, processing for voice communications using an Internet protocol ("IP") or other voice over other network protocol or the like. In general, DSP 76 provides a set of processing and memory resources to support the various voice/data services controlled and managed by processor/resources 70. As illustrated by bus connection 84A, DSP 76 alternatively may be coupled directly to TDM bus 78.

Switch/multiplexer 74 communicates bidirectionally with buffer/framer 72 and preferably from DSP 76, as illustrated, over bus 86. Switch/multiplexer 74 also communicates with TDM bus 78, as illustrated, over bus 90. TDM bus 78 preferably is a time division multiplexed bus as is known in the art (such as, for example, what is known as an MVIP or multi-vendor integration protocol type bus, or what is known as an SCSA-type bus (SCSA is an acronym for Signal Computing System Architecture)), and provides in certain preferred embodiments 256 channels/slots per TDM frame (the present invention is not limited to a single TDM bus; in alternative embodiments, more than one TDM bus or other types of TDM buses are utilized). TDM bus 78 allows communication between devices on the bus by way of circuit switching techniques. This type of switching allows for simple and inexpensive communication of voice through, for example, what are known as pulse code modulation ("PCM") techniques. Switch/multiplexer 74 preferably is implemented with one or more switching/serial time division multiplexing circuits, such as, for example, described in U.S. Pat. No. 5,541,921 to Swenson, et al. for "ISOCHRONOUS SERIAL TIME DIVISION MULTIPLEXER," which is hereby incorporated by reference. Switch/multiplexer 74, under control of processor/system resources 70, provides the capability for various voice/data signals to be controllably switched to desired slots of TDM bus 78.

Coupled to TDM bus 78 are line, station, trunk, or other interface cards 82. Cards 82 provide CODEC, line interface, off-hook detect and other functions as are known in the art to support various telecommunication devices (such as telephones 12 and facsimile 44) and WAN-type network services (such as voice/data services 58) that are communicating with communications system 50 via TDM bus 78. In preferred embodiments cards 82 provide points of termination for a plurality of telephones 12, one or more facsimiles 44, and various T-1, PRI, ATM, analog and/or other WAN-type network services as determined by the particular office/work environment. Cards 92, under control of processor/system resources 70, may include points of termination for emergency or backup telephone services and the like, such as in the event of a power-failure or to provide analog services in the event a dedicated resource such as a T-1 is unavailable for some reason.

Communication system 50 also may include fax modem 75, which, under control of processor/system resources 70, may process incoming/outgoing facsimile transmissions. In the preferred embodiment, fax modem 75 is coupled to TDM bus 78 as illustrated, although in other embodiments fax modem 75 may be coupled in alternative arrangements, such as to switch/multiplexer 74 and/or DSP 76.

Communication system 50 also may include available card slots on TDM bus 78 for one or more module upgrade 77. Additional resources and/or functionality may be added to communication system 50 as needed by way of module or line card upgrade(s) 77, or by, for example, the addition of one more cards such as ATM controller 79B and DSP 79C. Through the use of such module upgrades or additional cards, etc., one or more minimal configurations of communication system 50 may be provided, with additional resources and/or functionality added by the insertion of additional cards to TDM bus 78. Further aspects relating to upgrade and reconfiguration-type functionality of such line cards are described below in reference to FIG. 21. In accordance with preferred embodiments of the present invention, software upgrades for processor/system resources 70, or for other resources in the communications system, also may be applied.

Processor/system resources 70 also is coupled to one or more packet buses, such as packet buses 80A and 80B, which may be through a bus such as LAN bus 81. Effectively, packet buses 80A and 80B provide multiple hubs or switches to intercommunicate between one or more packet networks, which in preferred embodiments are Ethernet networks. It should be noted that the bus configuration of FIG. 3 may be considered "logical", and in preferred embodiments the physical bus configuration may be such that TDM bus 78 and packet buses 80A and/or 80B are part of the same physical bus. In such embodiments, packet buses 80A and/or 80B also can intercommunicate directly with central resources (such as processor/system resources 70) as well as station cards and WAN cards (or any other cards) coupled to the TDM bus (this is illustrated in FIG. 3 by card 79D, which is a card simultaneously inserted into/coupled to both TDM bus 78 and packet bus 80A and which may comprise, for example, a combined LAN interface/functionality and central office (or other WAN interface) card. Such a combined interface card, which may support both LAN and WAN functions (such as described elsewhere herein), enables substantial advantages over conventional systems.

Coupled to packet buses 80A and/or 80B are a variety of computing-type devices, such as computers 24, printer 22, other computers, file servers, backup or storage resources, other networks and the like. Processor/system resources 70, in software and/or hardware, provides a LAN/network subsystem, which includes routing and other related functions to support data communications to and from packet buses 80A and/or 80B and TDM bus 78, etc., through several paths or methods.

In preferred embodiments, a more direct connection between packet bus 80A and/or 80B may be established by way of embedded router or bridge 83. Router/bridge 83 includes a CPU, TCP/IP controller, router, stack, Ethernet interface or other functionality as may be desired to couple LAN bus 81 to, for example, one or more HDLC controllers 79A. Through the use of router/bridge 83, communications between packet buses 80A and 80B may be accomplished while consuming minimal resources of processor/system resources 70.

Figure 21:
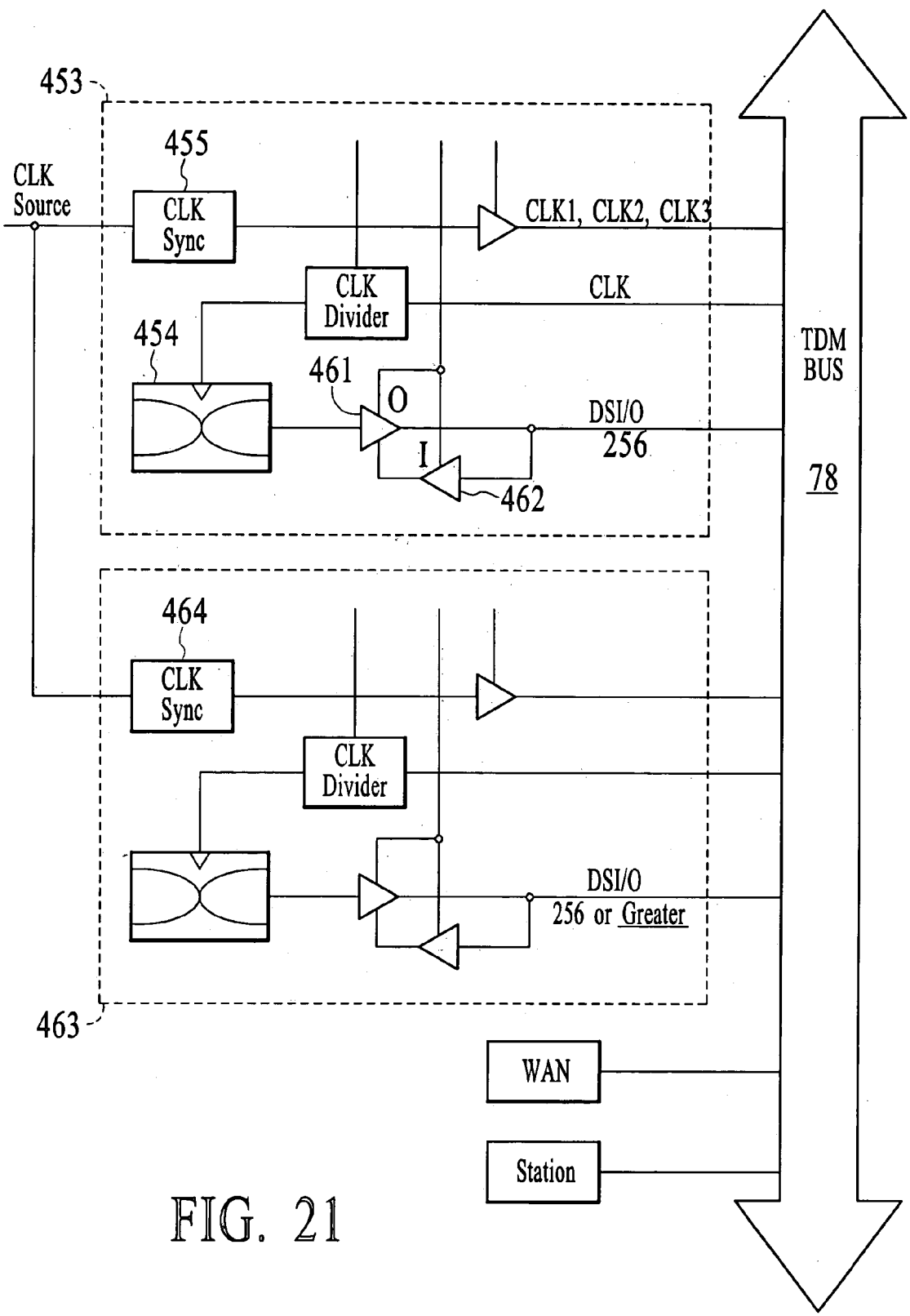
FIG. 21 illustrates a reconfigurable TDM clock source in accordance with preferred embodiments of the present invention.

Referring now to FIG. 21, additional aspects of preferred embodiments of the present invention will now be described.

One such aspect relates to the upgradeability of TDM bus 78 switch circuitry or "fabric," via software (e.g., RAM based firmware), and via hardware upgrade (e.g., adding new line cards with upgraded switch fabric to a TDM bus containing existing legacy line cards). TDM bus 78 is driven by a clock sync 455 in a first line card 453. This line card is equipped with additional circuitry, e.g., flip-flop 454 and tri-state drivers 461 and 462 that allow the isolation of the clock sync 455 from TDM bus 78 upon installation of a higher performance second line card 463 with a second clock sync 464. This example illustrates that the switch fabric of TDM bus 78 can be upgraded to a higher performing bus driven by a different clock sync 464, while still enabling the use of older first line card 453. Thus, first line card 453 may still use TDM bus. 78, but with an insulated clock sync 455, while the TDM bus 78 is driven by the improved clock sync 464, and thus enabling a higher performing bus to second line card 463. Through this aspect of this preferred embodiment, additional features and functionality are possible. Due to the firmware basis for this switch fabric afforded by the use of tri-states (e.g., firmware control of the state of tri-state drivers/buffers such as drivers 461 and 462, such as by writing configuration or control data to a register or other location for controlling such tri-state devices, etc.) to effect the relationship between the clock source and TDM bus 78, the reconfigurable nature of the switch fabric on TDM bus 78 can be controlled via software, e.g., performance upgrade or for increasing fault tolerance. With multiple clock sources located on cards connected to TDM bus 78, the particular clock source that is driving the bus can be selected under software control to adjust for faults, e.g., framing errors and the like. This redundant aspect to such a TDM bus structure in accordance with such embodiments ensures greater fault tolerance and better overall performance. Additionally, because the switch fabric is controllable via software, the remote control of these features is possible, e.g., in a client/server context, such as described elsewhere herein. While the present embodiment is illustrated with reference to an improved clock source located within the second line card, it will be apparent to those skilled in the art that other improved features within a second line card can be incorporated to reconfigure the characteristics of TDM bus 78 (e.g., a first line card with a first set of features, and a second line card with a second set of features or functions, may be incorporated into the system and coupled to TDM bus 78; under software or firmware control such as described above, the system may be remotely configured such as by selectively enabling or disabling, such as by tri-state isolation from TDM bus 78, some or all of the features/functions of the first or second line cards, etc.).

Figure 3A:
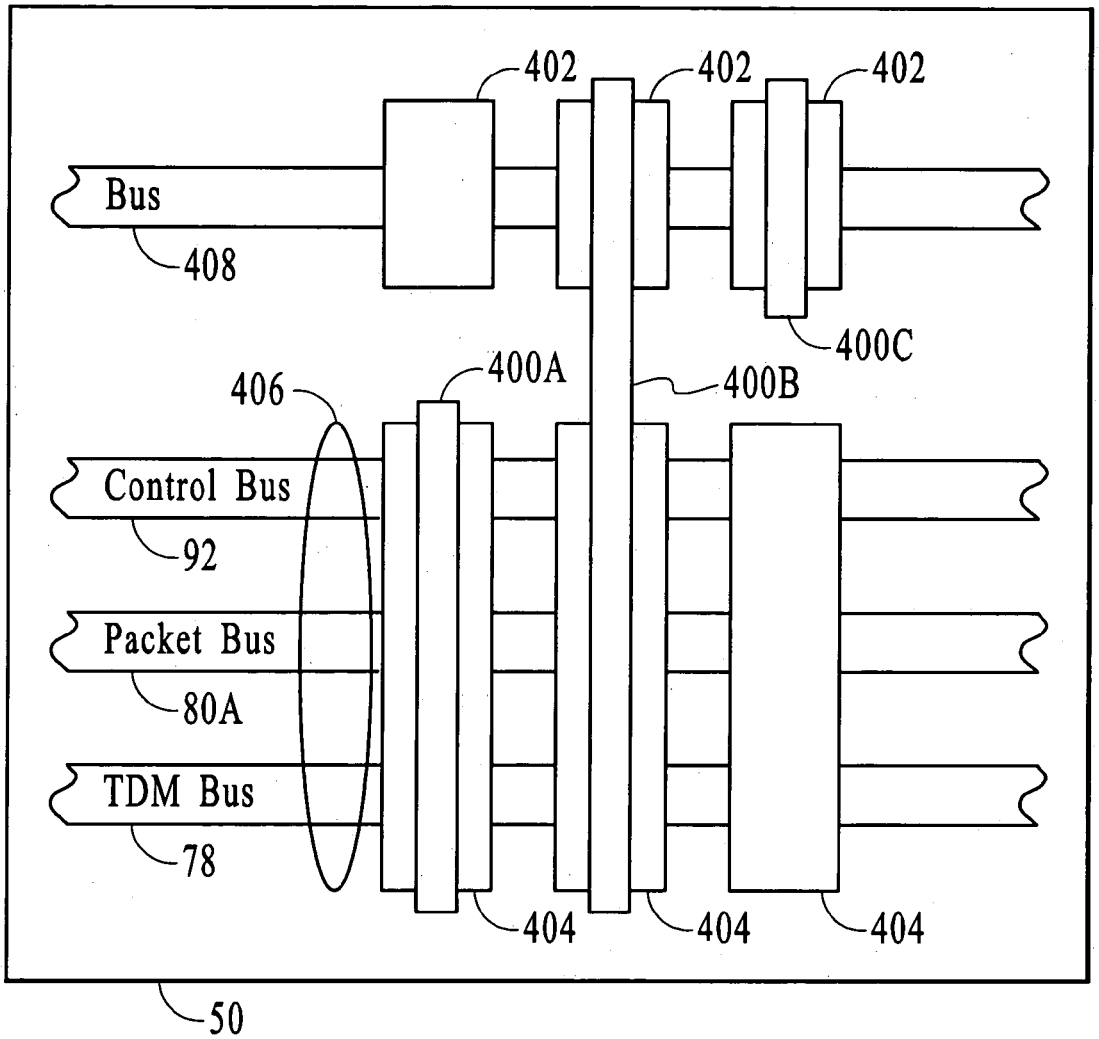
FIG. 3A illustrates communications buses in accordance with preferred embodiments of the present invention.

Referring now to FIG. 3A, additional aspects of preferred embodiments of the present invention will now be described.

As discussed in reference to FIG. 3, communications system 50 includes at least three (3) separate types of busses, e.g., TDM bus 78, packet bus 80A (or 80B), etc., and control bus 92, etc. In arranging such different busses, preferred embodiments of the present invention utilize an arrangement that desirably configures such busses into a passive backplane that may be used to plug in various printed circuit boards, cards, etc.

As illustrated in FIG. 3A, busses 92, 80A and 78 are physically arranged as part of system bus 406. Bus 408 is provided, for example, to serve as a bus for a computer backplane, such as a personal or other computer included in processor/system resources 70 (e.g., a computer system bus, such as what are known as PCI or ISA buses, etc.). Various boards or cards, etc. 400A, 400B and 400C may be physically plugged into sockets 402 and 404. Sockets 402 are provided for making electrical connection to bus 408, and sockets 404 are provided for making electrical connection to bus 406. It should be noted that, preferably, two rows of sockets 402 and 404 are provided, with at least certain of sockets 402 being positioned adjacent to and aligned with sockets 404. In this manner, boards such as board 400A may be coupled to bus 406 through one of sockets 404, board 400B may be coupled to both bus 406 and bus 408 via one each of sockets 404 and 402, and board 400C may be coupled to bus 408 through one of sockets 402. In accordance with such embodiments, bus 406, which includes control bus 92, packet bus 80A, and TDM bus 78, may be coupled to boards that couple only to bus 406 and also boards that couple to both bus 406 and bus 408. As will be appreciated, a plurality of sockets and boards may be provided, with one or a plurality of boards similar to board 400A, one or a plurality of boards similar to board 400B, and/or one or a plurality of boards similar to board 400C may be desirably provided in communications system 50.

It also should be noted that, in preferred embodiments, bus 92 is similar in form to a standard ISA or PCI bus (although preferably modified/optimized for the particular implementation of communications system 50) and provides desired control to the various components and subsystems of communications system 50 (as described elsewhere herein). In addition, TDM bus 50 may consist of, for example, 256 channels at 64 K bits/second. Packet bus 80A may support one or a plurality (e.g., 3, 4, 5 or more) of ethernet or other packet buses, such as 100 M bit, full duplex ethernet capability or similar functionality (although only one such bus in illustrated in FIG. 3A).

In accordance with such embodiments, boards may be conveniently coupled to bus 406 and/or 408, which facilitates manufacture, upgrade, maintenance, etc. of communications system 50. It also should be noted that bus 408 may be, for example, an industry standard bus, such an ISA or PCI or similar bus, thereby enabling ready connection of available PC-type boards to communications system 50 if so desired for the particular application. Such a multi-backplane construction provides significant advantages in accordance with the present invention.

Figure 4:
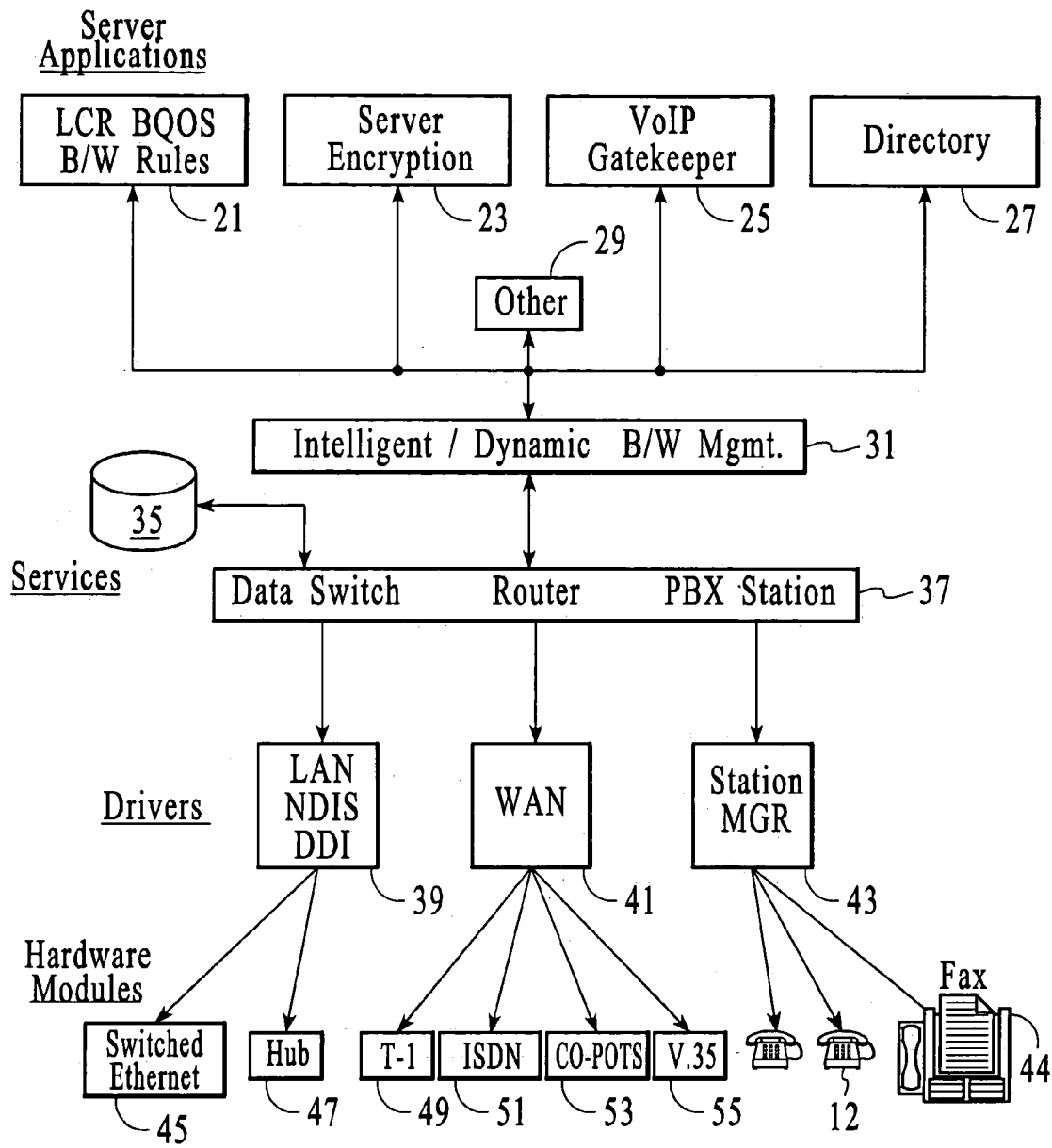
FIG. 4 provides a software/hardware overview of an office communications system in accordance with preferred embodiments of the present invention.

FIG. 4 provides a software/hardware overview of an office communications system in accordance with preferred embodiments of the present invention. It should be noted that the preferred embodiment of FIG. 3, with appropriate software in processor/system resources 70, may provide the software/hardware described in connection with FIG. 4, as will be appreciated by those skilled in the art.

At the server applications level, various software applications may be provided for operation in conjunction with the hardware illustrated, for example, in FIG. 3. Such software applications may include what are know as least cost routing ("LCR"), best quality of service ("BQOS") and bandwidth ("B/W") rules 21. LCR, BQOS and B/W rules 21 provide tables, information, rules and/or algorithms by which data and voice communications may be allocated and/or controlled with respect to, for example, the various types of voice/data network services that are available to communications system 50. Such information may include the current cost of utilizing various resources (based on time of date, amount of usage, integrated amount of usage over some period of time, etc.), and also priority rules for the various types of communications provided by communications system 50. For example, phone calls may be assigned a priority 1, facsimile calls a priority 2, VoIP calls a priority 3, facsimile over IP calls a priority 4, category 1 data communications a priority 5, and other data communications a priority 6. In preferred embodiments, the priority assignments may change by time of day or month, and/or the priority assignments may be different with respect to different network resources and the like.

Server encryption applications 23 may be provided in order to provide encryption or similar coding or processing of voice/data communications processed by communications system 50. VoIP gatekeeper 25 may be provided to service and control voice over Internet protocol ("VoIP") communications. As more specifically described below, various types of VoIP communications may be effectively managed and controlled in accordance with preferred embodiments of the present invention, such as, for example, a determination that acceptable conditions exist on the Internet for such communications. Directory 27 may be provided in order to make various types of directory information available to users of communications system 50. Directory information provided by directory 27 may include names, telephone extensions, address or other personal or work information regarding persons or departments, etc., serviced by communications system 50. Directory 27 also may include similar directory type information for persons or departments, etc. in a remote or other locations, such as may be accessed through voice/data services 58.

In general, with the present invention other applications 29 may be provided to support various types of communications in accordance with preferred embodiments of the present invention.

Intelligent/dynamic B/W, service and resource management 31 is provided to effectively and efficiently control and allocate and de-allocate services and communications resources, such as in accordance with LCR, BQOS, B/W rules 21 (e.g., rules to enable lowest cost, highest quality or otherwise desirable management and control of network or other resources, etc.) or other applications 29 or the like. B/W management 31 also receives as inputs information indicating the total number and types of network resources (of voice/data services 58, for example) that are available to communications system 50, and their status and availability at any given point in time. B/W management 31 may receive as an input, or may generate internally, information indicating how much of a measured usage resource may be available at a given point in time (for example, "frame relay," "private virtual channel" or other network services may be provided on the basis of a predetermined amount of data transmission per fixed time period for a fixed price, with additional charges for usage in excess of the predetermined amount, etc.). As more fully described below, based on the currently available and currently utilized services and resources, B/W management 31 may allocate and de-allocate such services and resources in a desired and/or cost efficient manner.

Additionally, other aspects of such embodiments with regard to service and resource management will now be described. Specifically, the use of realtime bandwidth and protocol statistics to assist in the administration of services and resources will now be described. With the example of a T1 connection, this aspect of such embodiments involves the collection and reporting of performance data statistics according to established specifications, e.g., RFC 1406, AT&T TR 54016, and ITU G.821, the documentation and specifications of which are hereby incorporated by reference. In this example, the statistics can be derived from registers adapted for storing information for the following: CEC (CRC Error Count), FEC (Framing Error Count), CSS (Controlled Slip Second), CVC (Code Violation Counter), and LOFC (Loss of Frame Count). Under control of, for example, processor/system resources 70, such registers may be read at predetermined intervals (or by locally generated or remote requests, etc.), and the following exemplary statistics of performance data or other statistics may be made available:

Errored Second (ES): Preferably a second consisting of a CRC error or a framing error or a controlled slip. Preferably, not counted during unavailable seconds.

Bursty Errored Second (BES): Preferably, framing=ESF (1<CEC<320). Preferably framing=D4 (1<CVC<1544). Preferably not counted during unavailable seconds or severely errored seconds.

Severely Errored Second (SES): Preferably framing=ESF (CEC>=320) or an out of frame error. Preferably framing=D4 (CVC>=1544) or an out of frame error. Preferably not counted during unavailable seconds.

Severely Errored Framing Second (SEFS): Preferably a second containing one or more framing errors (FEC).

Unavailable Second (UAS): Preferably incremented by one every second the driver is in the unavailable signal state. Preferably an unavailable signal state is declared when 10 consecutive SESs are detected and cleared when 10 consecutive non-SESs are detected; when declared any ES, BES, and SES errors that occurred during the 10 seconds are subtracted from the counters and the UAS counter is incremented by 10; when cleared any ES and BES seconds that occurred during the 10 seconds are added to the counters and the UAS counter is decremented by 10. Preferably, if the 10 second transition occurs over an interval boundary, both intervals are adjusted accordingly.

Such statistics, and others similar to these, can be used to analyze each protocol to assist in B/W allocation and management, as well as overall administration, such as described elsewhere herein. Such information can be stored within the system and/or displayed on a user's screen via a direct LAN/WAN connection such as described herein, including through the use of HTML and widely available web-browsing software. Those skilled in the art will recognize that it may be desirable to monitor other kinds of real time protocol and bandwidth statistics in other environments.

Services 37, which may be supported by database storage 35 (which may be provided as a part of processor/system resources 70), include data switching services, router services and PBX station services. In general, in accordance with preferred embodiments of the present invention, and utilizing resources such as described in connection with FIG. 3, various communication-related services may be advantageously supplied by communications system 50.

For example, data switching services may be provided such as by LAN/NDIS/DDI drivers 39 (LAN, NDIS and DDI being exemplary) through hardware modules such as switched Ethernet 45 and hub 47. Routing services may be provided such as through WAN drivers (specific network services such as PRI and T-1 being exemplary) through hardware modules such as T-1 module(s) 49, ISDN module(s) 51, central office-plain old telephone service (CO-POTS) module(s) 53, V.35 module(s) (it should be understood that various hardware modules may be utilized in accordance with preferred embodiments of the present invention, as desired to implement the various data switching, routing and other communications connections as may be determined by the needs of the particular office/work environment. PBX station services, such as automated attendant, reception, voice mail and the like, may be provided through station manager 43. Station manager 43 provides hardware for connection to various telecommunications devices, such as phones 12, facsimile 44, etc. In general, station manager 43 provides sufficient interface hardware in order to connect to the various devices that may be determined by the needs of the particular office/work environment).

Additional features particularly of hardware components of such embodiments involving detection operations incorporating or utilizing DSP resources such as are included in preferred embodiments will now be described (DSP resources included in such embodiments are described, for example, in connection with FIG. 3. A technique for determining characteristics of an analog line is to send a known signal (preferably a known tone or combination of tones or frequencies of known energy, etc.) down a line, and convert a predetermined frequency (or frequencies) of a returned signal from the analog line to a voltage or to otherwise process the returned signal; characteristics of the analog are determined based on the voltage or otherwise from information extracted from the returned signal. In preferred embodiments the returned signal is processed by DSP resources (see DSP 76 of FIG. 3) in order, for example, to perform a Fast Fourier Transform ("FFT") or other signal processed on the returned signal. As example, particular frequency bands in the returned signal could be evaluated to determine whether a phone is physically connected to the line (e.g., an analog phone typically presents a 10 K ohm impedance to the line in an on-hook condition, the presence of which could be determined by evaluation of the returned signal. In preferred embodiments, DSP resources could evaluate the returned signal energy, again preferably with an FFT, and the presence and/or type of telephone device physically attached to the line could be assessed/determined, and still preferably an assessment of the quality of the particular line could be made based on such an analysis of the returned signal.

Such signal processing could be done periodically or upon detection of errors, start-up or reboot, or upon initiation of a diagnostic or maintenance routine. With remote administration and configuration capabilities as described elsewhere herein, such phone presence detection, line quality assessment, etc., could be conducted from a remote location (such as enabling a central system administration to "map" the presence of phones to particular lines in a remotely located system In accordance with such embodiments, such capability enables a similar functionality to the link status indicators that may be available on network ports. Such link status information for analog telephones can be incorporated into a visual representation of the system, easily viewable remotely via an HTTP link over the Internet, for example (such remote viewing of the physical status of a system, i.e., "chassis view," is described elsewhere herein). It should be understood that this approach to obtaining line status and information can easily be applied to other aspects of telephone lines. For example, the line condition, or suitability for high speed data transfer, or perhaps the highest speed available on a particular line (e.g., "speed grading" or "speed characterization" of individual lines) can be measured.

In still other embodiments, applying such techniques (i.e., sending a known signal down a line and analyzed a return signal, etc.) information pertaining to the Central Office can be obtained, for example, information about the Central Office battery (voltage of 20–50 volts) can be measured that indicate the distance to the Central Office as well as its presence, etc. Other aspects of such analog line or other detection can easily be realized through this method and beneficially used in other applications. For example, specific capabilities of the line and/or the device at the other end (including a Central Office, etc.) of the line can be detected, during on-hook and off-hook conditions, all of which may be initiated in a remote manner, viewed graphically, etc., as described elsewhere herein.

Figure 5:
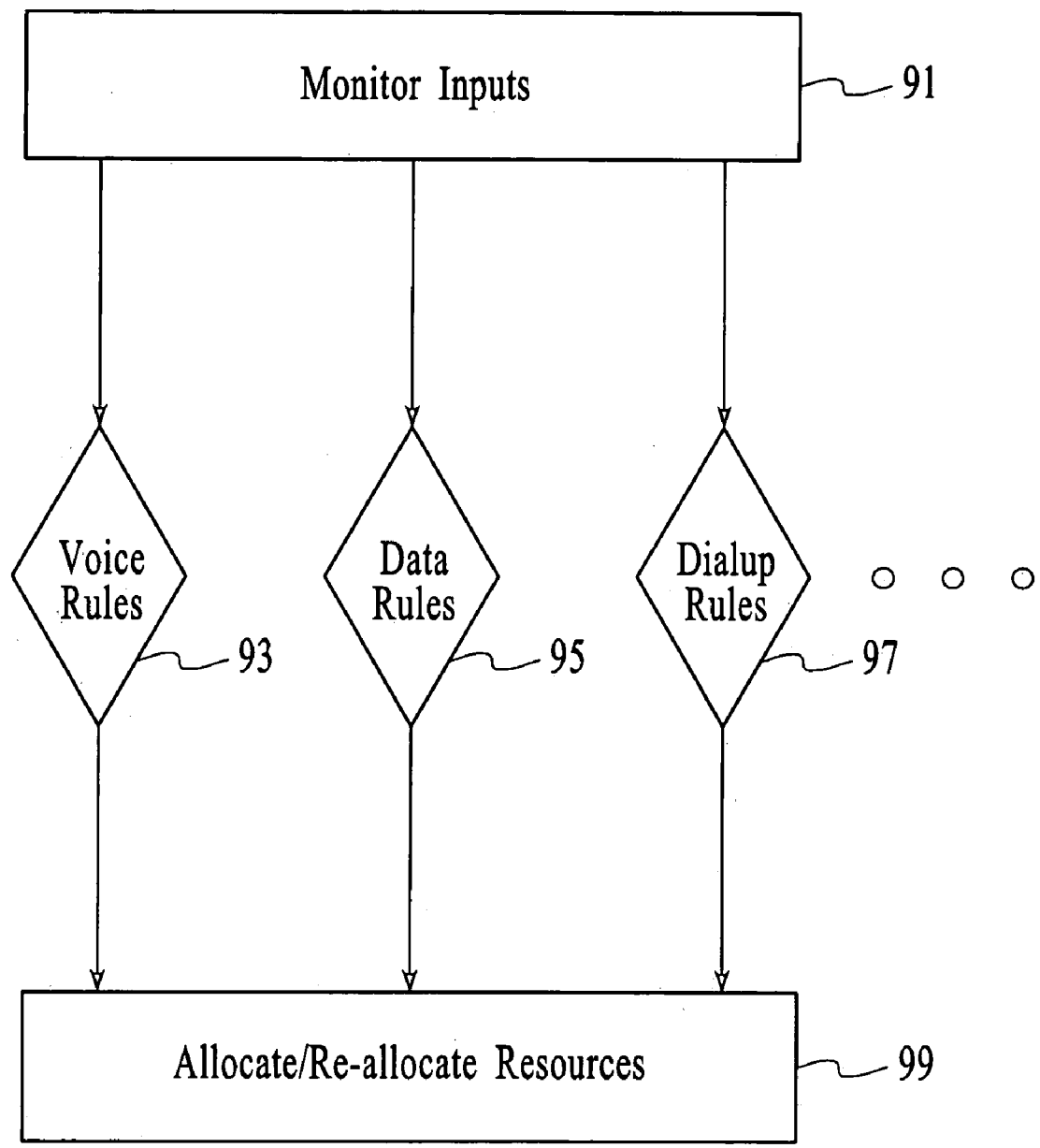
FIG. 5 illustrates the use of services/bandwidth allocation rule table(s) in accordance with preferred embodiments of the present invention.

Referring now to FIG. 5, a general flow chart will be described for illustrating the use of services/bandwidth allocation rules in accordance with preferred embodiments of the present invention.

Server applications, such LCR, BQOS, B/W rules 21, may be considered to have various rule sets, such voice rules 93, data rules 95 and dial-up rules 97 (other rule sets may be provided). Communications system 50 monitors inputs (illustrated as monitor input block 91 of FIG. 5), and based on such inputs and the overall service/network resources available, and in accordance with voice rules 93, data rules 95 and dial-up rules 97, allocates and de-allocates resources (illustrated as allocate/re-allocate resources block 99 of FIG. 5).

Exemplary operations of such preferred embodiments will now be described.

In the event a user picks up one of telephones 12, an off-hook condition is detected by the appropriate card 82, which signals processor/system resources 70 of the off-condition. Processor/system resources 70 controls switch/multiplexer 74 to couple the appropriate card 82 to DSP 76, which generates a dial tone that is coupled to the appropriate telephone 12. The user hears the dial tone and may then proceed to place the desired call. DSP 76 detects the digits of the telephone number of the desired call and provides the detected digits to processor/system resources 70. For an internal call, processor/system resources 70 directs that the called internal telephone receive a ring signal from the appropriate card 82. Upon pick-up of the called internal telephone, the telephone connection between the internal phones is established by way of TDM bus 78 and the appropriate cards 82.

For an external call, processor/system resources 70 attempts to establish the desired connection through the appropriate cards 82 and available voice/data services 58. In attempting to establish such a voice communication connection, processor/system resources preferably follows the general flow illustrated in FIG. 5. Namely, in accordance with available resources (such as of voice/date services 58) and rules such as voice rules 93, data rules 95, dial-up rules 97, etc., an external voice communication may be established by, for example, a POTS line connection, an ISDN B channel, a VoIP connection, etc. In accordance with the present invention, resources may be allocated for the processing of such an external call based on the available resources at the particular time and applicable rules (which may include time of day, priority of call, etc.)

Incoming calls are detected by the appropriate cards 82 and signaled to processor/system resources 70. Connections of voice incoming calls to telephones 12 are established under control of processor/system resources 70 over TDM bus 78.

Still additional operational advantages and features in accordance with still additional preferred embodiments of the present invention will now be described.

PBX and Telephony-Related Functions

With the hardware of preferred embodiments as illustrated in FIG. 3, various novel and/or improved or more efficient communications functions may be obtained. As noted in FIG. 2, with the present invention a plurality of workstations or computers 24 may be connected to communications system 50. Although only a single LAN is illustrated in FIG. 2, as illustrated in FIG. 3 two or more LANs may be coupled to communications system 50, with a plurality of computers coupled to each of the two or more LANs, etc.

In accordance with preferred embodiments of the present invention, one or more of computers 24 may execute a PBX/telephony control application software program. In accordance with the PBX/telephony control application, hereinafter referred to as the "office attendant type" program, control of the telephony and related functions of communications system 50 may be intelligently managed and controlled. With such an arrangement, one or more computers on the LAN may be used to control incoming and outgoing calls of the office using the computer in a natural and intuitive manner. A telephony headset or telephone preferably is associated with the particular computer that will be running the office attendant type program to enable traditional voice communications with incoming callers, etc.

Figure 6:
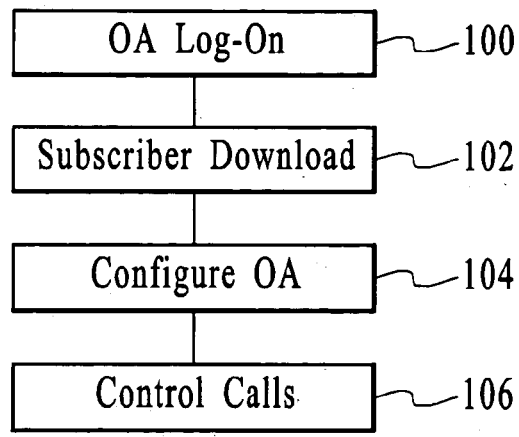
FIG. 6 illustrates a general flow chart for controlling incoming and outgoing calls in accordance with preferred embodiments of the present invention.

As illustrated in FIG. 6, a party desiring to control the incoming and outgoing calls and/or station to station calls of the office ("attendant 1") may log-on and run the office attendant type program from one of the computers connected to the LAN connected to communications system 50. At step 100, attendant 1 may be required to enter an appropriate user name/ID and password in order to recognize attendant 1 as an appropriate user to assume control of the telephony functions of the office. A network or systems administrator may set up password control for parties authorized to run the office attendant type program. At step 102, in preferred embodiments the computer running office attendant type program has downloaded to it the current telephone subscriber directory such as over packet bus 80A or 80B of FIG. 3 (e.g.: a complete listing of the telephone subscribers; extensions; status information such as do not disturb, forward and forwarding information, forward to voice mail, hunt group information, etc.) from communications system 50. In this manner, the computer or computers running the office attendant type program may locally contain current subscriber information for controlling the incoming and outgoing calls of the office. In preferred embodiments, communications system 50 automatically determines when subscriber information changes, e.g., a subscriber has been added to or deleted from the telephone directory, or an extension has changed, or a subscriber's status information has changed, or any state associated with communications system 50, etc., in order that updates may be timely made available. In such embodiments, computers running the office attendant type program may be updated promptly and automatically by communications system 50 so as to contain current subscriber information on an ongoing basis to more efficiently control telephony operations of the office. It also should be noted that in preferred embodiments the subscriber information also may include other information, such as the email address and extended directory information including personal information manager ("PIM") information of the particular subscriber and network identification for a computer associated with the particular subscriber. With such information, net messages or other communications with particular subscribers may be facilitated as more fully described herein.

It also should be noted that this subscriber download concept is applicable in various forms to all computers coupled to communications system 50. For example, communications system 50 includes information regarding all users registered in the PBX (i.e., all users having a telephone extension and/or computer coupled to communications system 50 such as over the LAN or WAN). Thus, in the event of a subscriber directory change, communications system 50 may "broadcast" updated subscriber directory information to all computers coupled to communications system 50, or, in alternate embodiments, communications system 50 sends a net message, email or other message to such computers coupled to communications system 50 that prompts the users of such computers to the availability of the subscriber directory update (e.g., the remote computers received a message indicting the availability of the subscriber directory update, which preferably includes an "accept" icon and a "reject" icon, thereby enabling the user to receive or not receive the update as he/she may desire).

This concept may be extended to system speed dial buttons (as described elsewhere herein), and other information that may be desirably controlled and distributed in/from a central location (e.g., communications system 50) in a particular office setting. For example, a company organization chart, financial reports, informational reports, etc. may be centrally stored, etc., which may include being maintained by a system administrator-type person for communications system 50. In accordance with such embodiments, centrally-controlled information may be broadcast to all users, or a selected subset of such users (communications system 50 also preferably accesses/stores information regarding the registered users, such as title, department, position within the company; e.g., Vice President, engineering department, sales and marketing department, etc.). Thus, a centrally-maintained document/file, such as a company organization chart, financial report, etc., may be conveniently distributed to computers coupled to communications system 50. Preferably, communications system 50 records which computers receive such information (for example, a record of those computers logged-on and receiving the information at the time it is first distributed), and thereafter may distribute the information to other computers at a later time (for example, at a later time when the users of such computers log-on to communications system 50). As described previously, such embodiments also may prompt the individual users whether they wish to receive the information, and thereafter provide the information to those computers whose users affirmatively indicate that they desire to receive the information.

In step 104, the computer running the office attendant type program optionally may run a configuration routine to more optimally configure the office attendant type program on the particular computer for control of the telephony operations. At step 106, the computer running the office attendant type program is in a ready condition for processing incoming or outgoing calls or the like.

Figure 7:
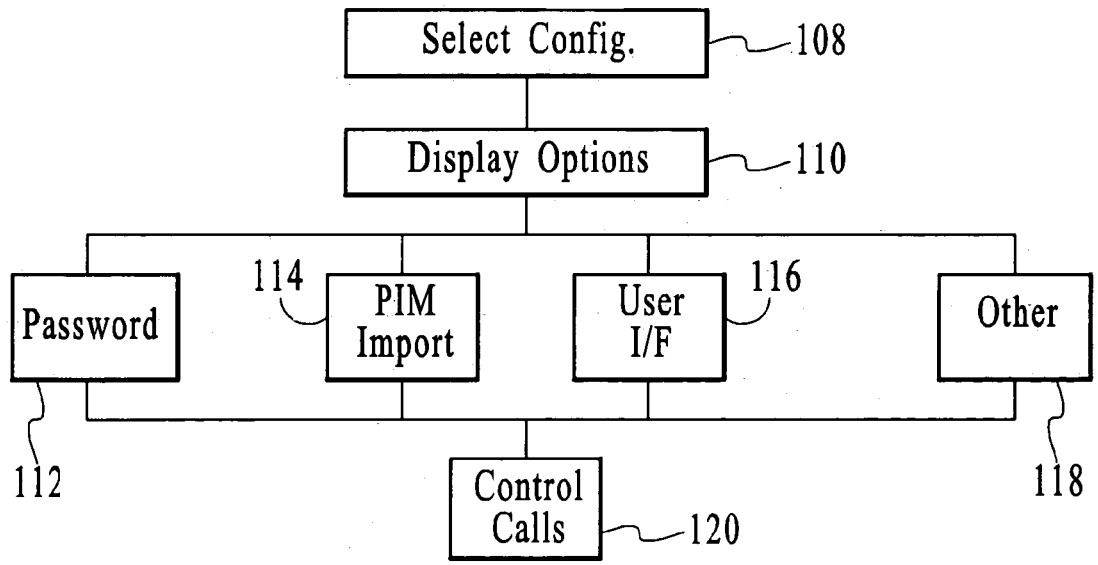
FIG. 7 illustrates an exemplary configuration algorithm for an office attendant type program in accordance with preferred embodiments of the present invention.

Referring to FIG. 7, an exemplary configuration algorithm for an office attendant type program will now be described. At step 108, the user selects a configuration icon or otherwise initiates a configuration command on the computer running the office attendant type program. At step 110, the office attendant type program displays a choice of configuration options. FIG. 7 illustrates options such as password change option 112, contact or personal information manager ("PIM") import option 114, user interface configuration option 116 and other option 118 (other option 118 indicates other configuration options that may be presented to the user to more optimally configure the office attendant-type program for the particular user or operating environment, etc). At step 120, the computer running the office attendant type program has completed the configuration process and is in a ready condition for processing incoming or outgoing calls or the like.

Figure 7A:
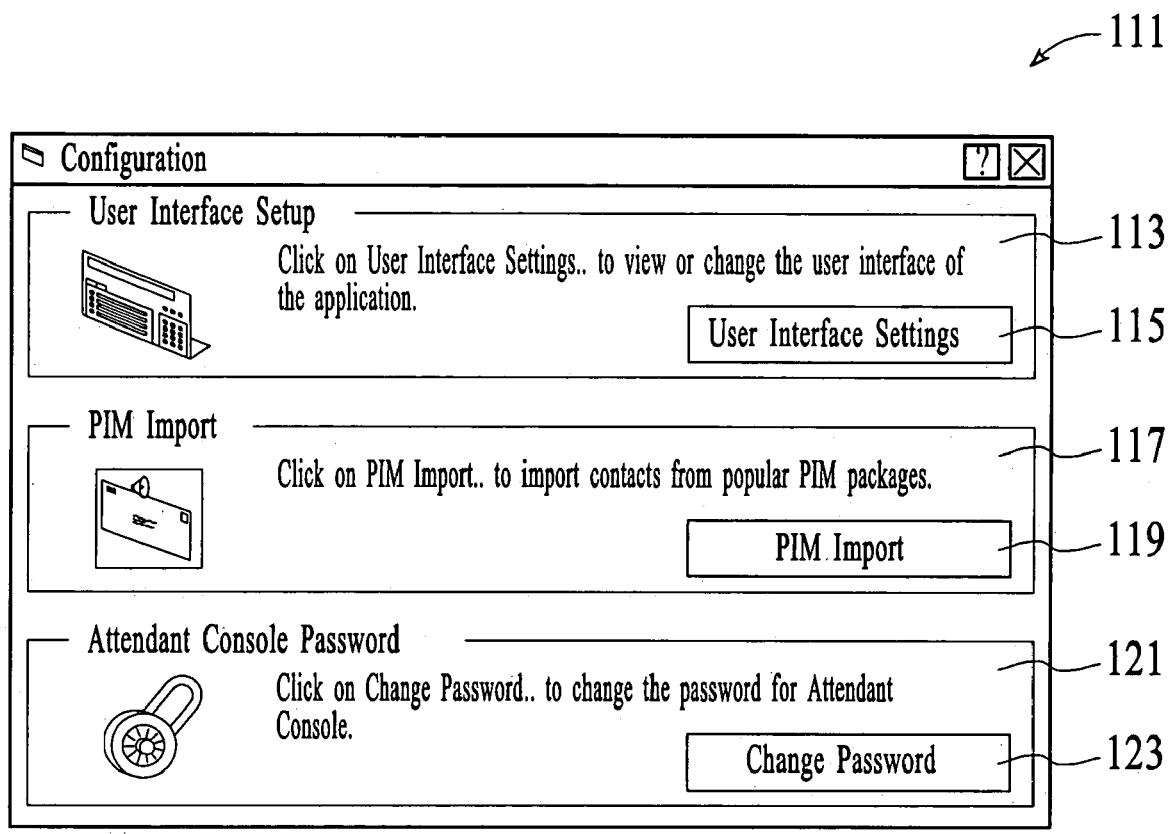
FIG. 7A illustrates an exemplary arrangement of configuration options of the present invention.

An exemplary arrangement of configuration options for such a configuration algorithm is illustrated in FIG. 7A. As illustrated, by configuration window 111, a user may be presented with configuration windows such as user interface configuration window 113, contact or PIM import window 117 or password control window 121. As an illustrative example, user interface window 113 may include icon 115 for displaying menus or windows for tailoring the user interface for the particular user and operational parameters; exemplary user interface options include user selectable tones, sounds, or volumes for indicate incoming calls, line status conditions, programmable call capacity before routing calls to another computer running an office attendant-type program or to an automated call answering algorithm of communications system 50, visual display options to vary the computer display (such as size, color of icons or background, etc.) of the screens of the particular office attendant type program, etc. What is important is that a particular user running an office attendant-type program on a particular computer may configure user interface-type attributes to more optimally configure the computer that the user will use to control the incoming and outgoing calls of the office, etc. It should be noted that, although other computers coupled to communications system 50 may simultaneously be running an office attendant-type program, each such computer in preferred embodiments may be independently configured to be more optimum for the particular computer users.

Other configuration windows illustrated in FIG. 7A include contact or PIM import window 117 and password control window 121. PIM import window 117 may include icon 119 for displaying menus or windows for importing contact information from a PIM-type software program or database. In accordance with such embodiments, contact information to be used by the user running the office attendant type program may be readily imported from a PIM-type information database or contact list (which may be resident on the particular computer, in communications system 50 or on another computer coupled to a LAN), thus saving the time from entering contacts from a manual or electronic list. Password control window 121 may include icon 123 for displaying menus or windows for enabling the user to change his/her password. In preferred embodiments, the office attendant-type program(s) used to control telephony functions of communications system 50 utilizes password protection to prevent database tampering and the like and also to prevent unauthorized use of the Office Attendant-type program(s).

Figure 22:
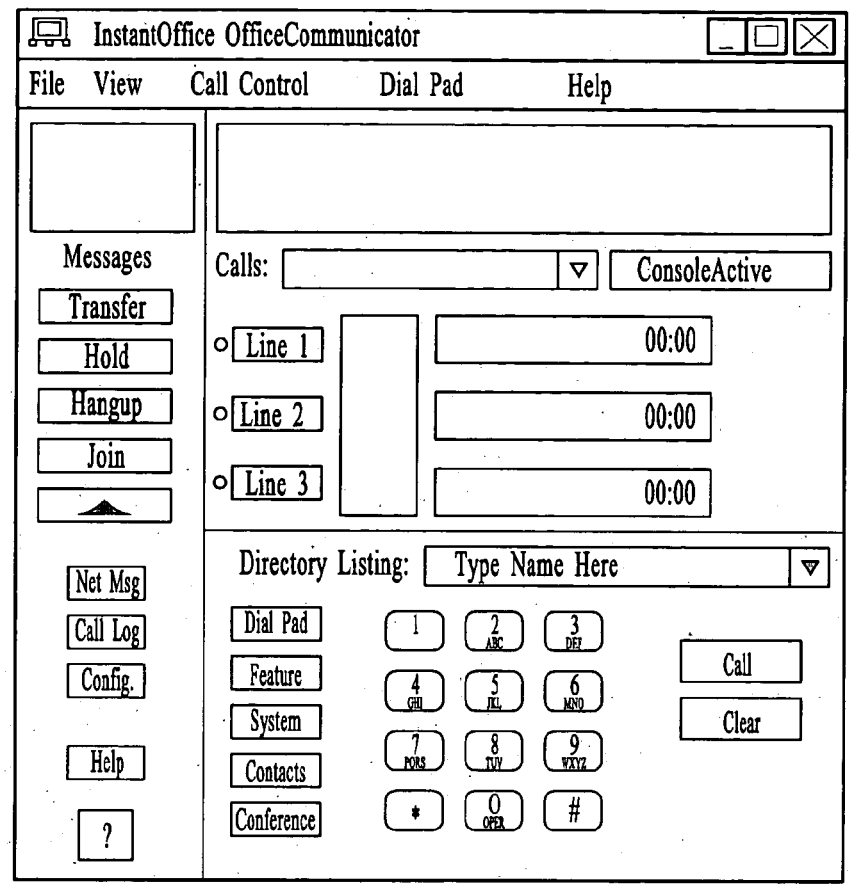
FIG. 22 illustrates an exemplary main window in accordance with preferred embodiments of the office communicator-type programs in accordance with the present invention.
Figure 23:
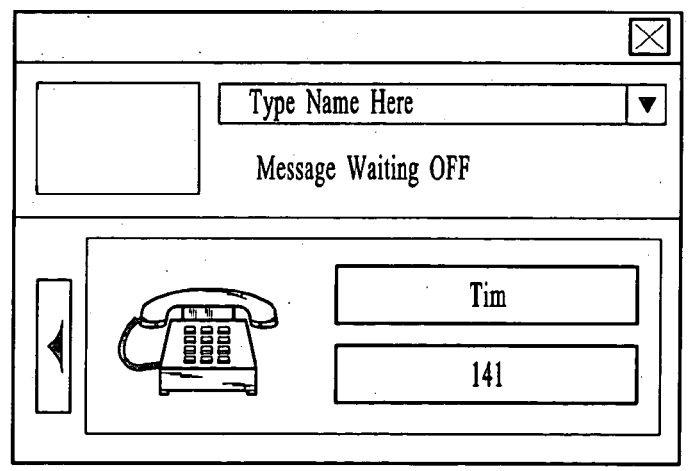
FIG. 23 illustrates an exemplary screen pop window in accordance with preferred embodiments of the office communicator-type programs in accordance with the present invention.

Referring now to FIGS. 22 and 23, additional aspects of these embodiments relating to office communicator-type programs (running on/in connection with processor/system resources 70, etc.) will now be described. These types of programs can be used in connection with the office attendant-type programs described elsewhere herein. Office communicator-type programs typically differ from office attendant-type programs in the types of functions they are optimized to perform. For example, the users of office communicator-type programs typically initiate and terminate calls, whereas the users of office attendant-type programs typically also route calls. FIG. 22 illustrates an exemplary main window of an office communicator-type program, and FIG. 23 illustrates an exemplary screen pop up window for such a program.

Referring to FIG. 22, the Main Window preferably includes a small appearance GUI footprint including three low profile line status indicators. Office communicator-type programs preferably do not include a 'Calls in Queue' or a 'Calls on Hold' indicator. Alternative views of this window can be sized and displayed to take up less physical space on the screen for the end user. Such feature buttons allow additional functionality to be added into the program, for example, multiple call parking features can be added. In this example, there are two types of park: Self-Park and System Park. Self-park preferably parks the call at the extension of the person parking the call. Hence, if an outside caller calls extension x125 and the user at x125 answers and self parks the call, then the user at x125 can page and announce "Pick up x125". System park returns a parking address, or slot number of a predetermined number of parking spaces that the system allocates for such call parking. Hence, if an outside caller calls extension 125 and the user at x125 system parks the call, then the display on ext 125's office communicator-type program will read: "Call Parked on <slot number>", e.g. "Call Parked on 2". Then the user at x125 can page, and announce "Pick up 2".

Referring now to FIG. 23, such an office communicator type program that is optimized for general telephone and computer use, can include a screen pop window as illustrated. The main user interface illustrated in part in FIG. 22 preferably consists of a three-line display. However, this main user interface is not intended to be maximized at all times. When an incoming call arrives, the screen pop illustrated in part in FIG. 23 will slide out and occupy a small portion of the screen to let the user know that there is an incoming call, and provide caller information to the user. In addition, such a screen pop may incorporate a visual signal, e.g., a rotating telephone icon, to help indicate that a call is trying to get through. When there are new messages at the extension, the screen pop will also appear to indicate (via an appropriate icon or other indicia, preferably rotating or otherwise moving in order to attract visual attention, etc.) that there is a message waiting. For making outbound call and other simple/more frequent call control operation, a toolbar with basic call control functions preferably is provided to the user. Other visual and operational variations suitable for other working environments will be apparent from the above discussion.

Referring to FIGS. 22 and 23, additional exemplary preferred features of such embodiments will now be described.

A user can answer incoming calls by point-and-click using the mouse, by using the keyboard or by using the phone. The user is notified of an incoming call by both visual and/or audible effects. Users can make outbound calls either using the mouse, by using the keyboard or by using the phone.

When an incoming call arrives, if the phone is in TAPI mode and the phone is off-hook with no dial tone, the user can answer the call via the software application (e.g., mouse click on an appropriate icon, etc.). When an incoming call arrives and the user is already on another call, the user will be signaled of the incoming call on both the application and the handset (e.g., beep). Users preferably are notified of the caller id on the screen by the application, and he can answer the call by the application or by the phone (e.g., hitting the Flash).

The user preferably may initiate a call from the application. If the phone is on-hook, preferably the phone would ring to indicate that the user has to pick up the handset to dial out. Once the handset is picked up, the call may then be made. The user preferably then hears ring-back on the handset. Alternatively, if the phone is already in TAPI mode, the call would be made immediately and the user would hear ring-back on the handset.

The user preferably may also initiate a call from the phone. The user would pick up the phone and hear dial tone. He or she can then dial the number from the phone set. When the user is already on another call and he wants to make another call by the application, he can choose to put the current caller on hold and dial the number, or the application would automatically put the current caller on hold when he dials the number. When the user is already on another call and he wants to make another call by the phone, he can put the current caller on hold by hitting 'FLASH' on the phone and dial the number.

The user can put a current call on hold using the mouse, by using the keyboard or by using the phone. By making an outbound call, or answering another call from the application, the current call can automatically be put on hold by the application. The user can put the current call on hold from the phone, for example, by hitting 'FLASH' on the phone set.

The user can transfer the current call to another extension or to an offsite number by using the mouse, the keyboard or the phone. The application supports two types of transfer i.e. Blind and Consultation. Blind transfer is transferring the caller to the destination number without talking to the person at the destination. Consultation transfer is transferring the caller to the destination number after talking to the person at the destination. The application would support both type of transfer with a single user interface to maintain the simplicity of usage.

The user can transfer the current call to another extension or to an offsite number from the phone by hitting 'Flash'. The user will then hear the dial tone. The user will then enter the transfer destination phone number. For blind transfer, the user hangs up the phone before the destination answers to complete the transfer. For consultation transfer, the user talks to the transfer destination, and hangs up the phone to complete the transfer.

The user can join two calls on the extension by using the mouse, the keyboard, or the phone. By hanging up the handset when there are two calls on the extension would join the two calls together.

The user can create a conference call with many attendees including the user by using the mouse, the keyboard, or the phone. The user can add conference attendees to the conference from the application by using the mouse or the keyboard. The conference attendees can already be on hold at the extension, or the user can dial out to the conference attendees to invite them to conference. The user can also add conference attendees by using entering the feature codes on the phone set. Regardless of how the conference is initiated (either by phone or by application), the user preferably may add additional attendees by using either the phone or the application.

For removing conference attendees, the attendees can hang up their phone voluntarily. If it is desired for certain attendee to drop out of the conference, the conference master can use the application to selectively drop the attendee. The user can also drop the conference call and allowing other attendees to continue with the conference call if he or she is the conference master.

When there are new voicemail messages on the extension, there will be a message waiting indication both on the phone set (e.g., a blinking LED), and the application (e.g., a rotating mailbox icon). On the application, the message waiting indication will be on the main user interface as well as the screen pop.

NetMessage is a feature preferably provided on the application. NetMessage can be initiated and received by any computers running office communicator-type programs or office attendant-type programs. The application provides two types of NetMessage i.e. transferring a call or leaving a text message.

Transferring a Call

During the transfer of a call, if the destination extension is on the phone or on DND (Do Not Disturb), the application preferably presents 3 options to the user. The user can put the caller on hold, sent the caller to the voicemail of the destination, or send a NetMessage to the destination's computer. On the receiving end of the NetMessage, the user would see a dialog box on his machine with the text message and 2 options i.e. accepting the call or ignore the call. If the user chooses to accept the call, the call automatically transfers from the originated extension to the destination. If the user chooses to refuse the call, the application will notify the originated user that the call was refused.

Leaving a Text Message

Anyone that is running either an office attendant or office communicator-type programs can initiate a NetMessage anytime. NetMessage in this scenario is just a text message posted on the destination machine. The receiver has the option of replying to the message.

PIM Integration

The user can import the contacts that have been stored in any of the supported PIM software. The user can then choose to put them in any folder he wants. After importing, he can then organize the contacts into different folders. The user can export the contacts that he has stored in the personal folders to any of the supporting PIM software format.

Office communicator-type programs provide the user with a screen pop which will appear on the screen when an incoming call arrives. The screen pop can do a lookup to a PIM database for records matching the caller id information of the call, and display this information even while the call is still ringing. This feature can be used in a variety of useful ways. For example, the end user can see customizable database information connected to the caller that could assist the end user in deciding how to (or even whether to) answer the call.

Off-Site Call Forwarding, Trunk to Trunk Transfers & Conferences

Off-site call forwarding (OSCF): In this scenario, an internal or external call (call 1) terminates on the target station directly or via AA (auto attendant). The target station has configured the user forward number to an external number (i.e.: 9-555-1234). The system places an outgoing call to the external number and connects call-1 to this trunk. This results in a trunk to trunk or station to trunk call depending on the source of call-1.

Trunk to Trunk Transfer (TTT): In this scenario an incoming external call-1 terminates on station via either DID, DIL, AA. The user answers call-1 putting the connection from incoming trunk to internal station in the connected state. The user flashes and transfers call-1 to an offsite number (9-555-1234) or transfers call-1 to an extension that is forwarded off-site (off-prem forwarding).

Trunk to Trunk Conference (TTC): In this scenario an incoming external call-1 terminates on station via either DID, DIL, AA. The user answers call-1 putting the connection from incoming trunk to internal station in the connected state. The user flashes putting call-1 on hold and dials (call 2) an offsite number (9-555-1234) or extension that is forwarded off-site (off-prem forwarding). Once call-2 is connected the user flashes and completes the conference. The user (conference master) then hangs up which allows call-1 and call-2 to stay connected via trunk to trunk.

The above, of course, are merely illustrations, and many other useful variations will be apparent to skilled artisans from the present teachings for answering calls, PIM integration, transferring calls, etc.

Figure 8A:
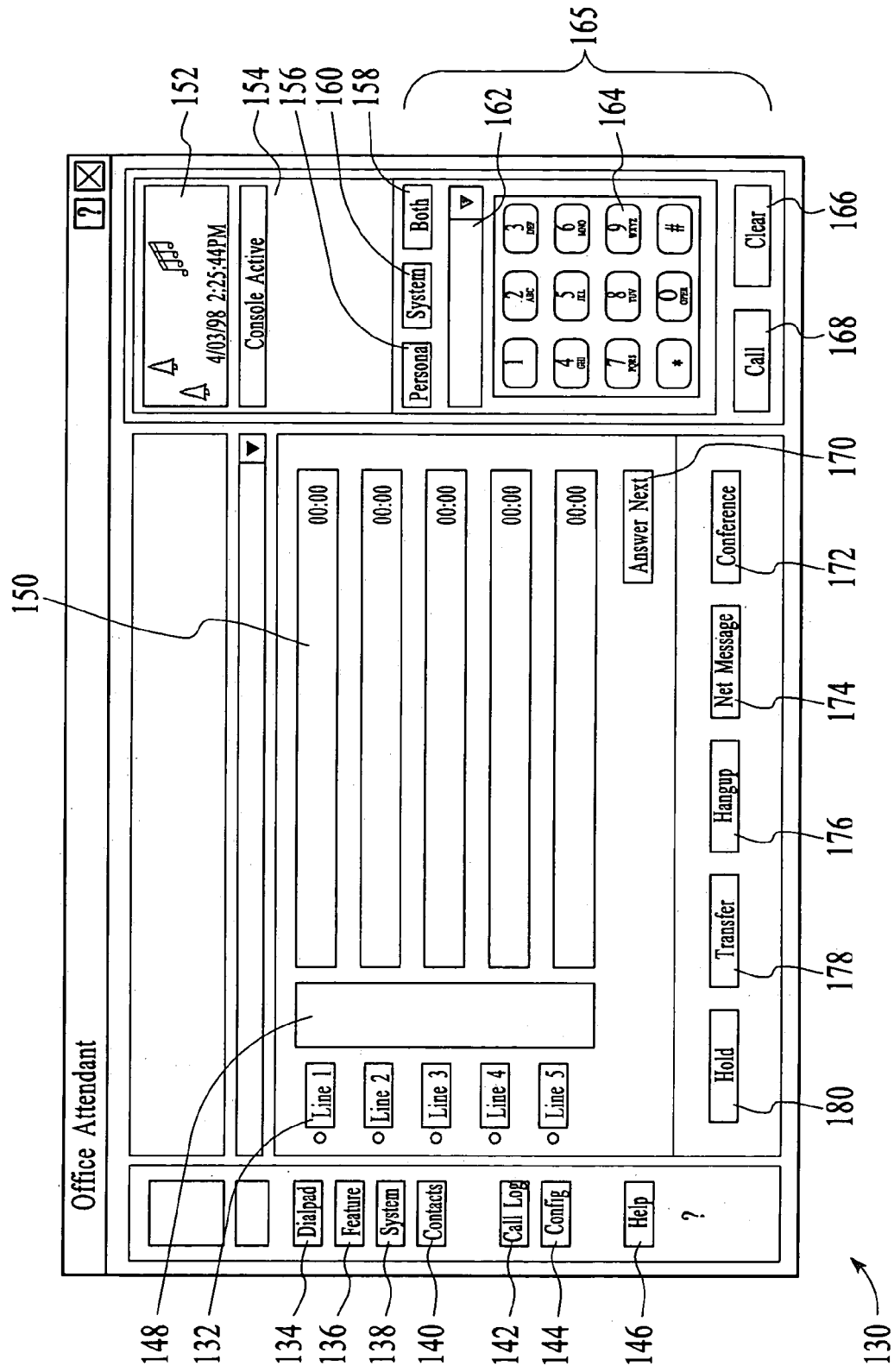
FIGS. 8A to 8D illustrate exemplary windows in accordance with preferred embodiments of the office attendant-type programs in accordance with the present invention.

Referring now to FIGS. 8A to 8D, exemplary windows from illustrative preferred embodiments of office attendant-type programs in accordance with the present invention will now be described. As illustrated in FIG. 8A window 130 includes one or more line displays 132 (five are shown in FIG. 8A for illustrative purposes) for indicating various telephone lines available in the particular application of communications system 50. The number of telephone lines, of course, may be tailored for the particular application. Preferably positioned adjacent to line displays 132 is call/line status display 148 for displaying symbols adjacent to each line indicative of the status of the line, such as idle, phone ringing, active call in progress, call on hold, hold recall alert, etc. Status display 148 provides a ready visual indicator to the user of the office attendant-type program of the status of the various telephone lines that are being monitored. Also adjacent to the line displays (as illustrated adjacent to status display 148) are user identification displays 150, which serves to display the name and/or extension or telephone number of one or both parties to a call. In certain embodiments, caller ID type information may be obtained by communications system 50 from an appropriate interface card (see interface cards 82 of FIG. 3) and also displayed on displays 150. Displays 150 also may display a clock indicating the duration of a call on a particular line.

In preferred embodiments, window 130 also includes calling feature buttons or icons such as dialpad icon 134, feature icon 136, system icon 138 and/or contacts icon 140. Other icons may include call log icon 142 and/or configuration icon 144. Dialpad icon 134 preferably results in the display of a dialpad, such as dialpad window 165 in the lower left corner of window 130. Feature icon 136 preferably results in the display of a set of feature buttons as will be described in connection with FIG. 8B. System icon 138 preferably results in the display of a set of system buttons as will be described in connection with FIG. 8C. Contact icon 140 preferably results in the display of a list of contacts/contact folders as will be described in connection with FIG. 8D. Call log icon 142 preferably results in the display of one or more windows displaying log-type information for incoming or outgoing calls controlled by the office attendant type program. Call log information may be retained on the particular computer running the office attendant type program and/or centrally stored by communications system 50. Configuration icon 144 prompts one or more configuration windows, examples of which have been described elsewhere herein. Help icon 146 also may be provided in order to display help information to the user of the office attendant-type program.

In accordance with preferred embodiments of the present invention, hold icon 180 is provided to enable a caller to be readily put on hold by the office attendant type program user. Transfer icon 178 is provided to enable a caller to be readily transferred by the office attendant type program user (transfer are discussed in more detail in connection with FIGS. 9A through 9C). Hangup icon 176 is provided to enable a caller to be readily disconnected by the office attendant type program user. Net message icon 174 is provided to enable a net message to be sent by the office attendant type program user (net messages are discussed in more detail in connection with FIGS. 10A and 10B). Conference icon 172 is provided to enable conferences to be established by the office attendant type program user (conferences are discussed in more detail in connection with FIGS. 11A through 11E). Answer next icon 170 is provided to enable the office attendant type program user to sequentially answer calls, such as, for example, in a situation in numerous calls have come in a short period of time, and the user wishes to sequentially access such calls. Preferably, the answer next icon prioritizes calls on hold higher than new calls, although in preferred embodiments the priority of hold calls versus new calls may be programmed into communications system 50.

Dialpad window 165, accessed in response to activation of dialpad icon 134, displays a visual keypad, much like a traditional telephony keypad with buttons 164, and also preferably includes other buttons such as call button 168 (for initiating calls), clear button 166 (for clearing number or information, such as subscriber information, displayed on display 162 (display 162 also may used to input numeric or character information such as for a subscriber, and also may have a menu pull-down icon as illustrated to display a menu of, for example, subscriber information)), personal button 156 (which may be used, for example, to make personal contact or PIM information available in display 162), system button 160 (which may be used, for example, to make system contact information available in display 162), or both button 158 (which may be used, for example, to make both personal contact or PIM information and system contact information available in display 162).

Figure 8B:
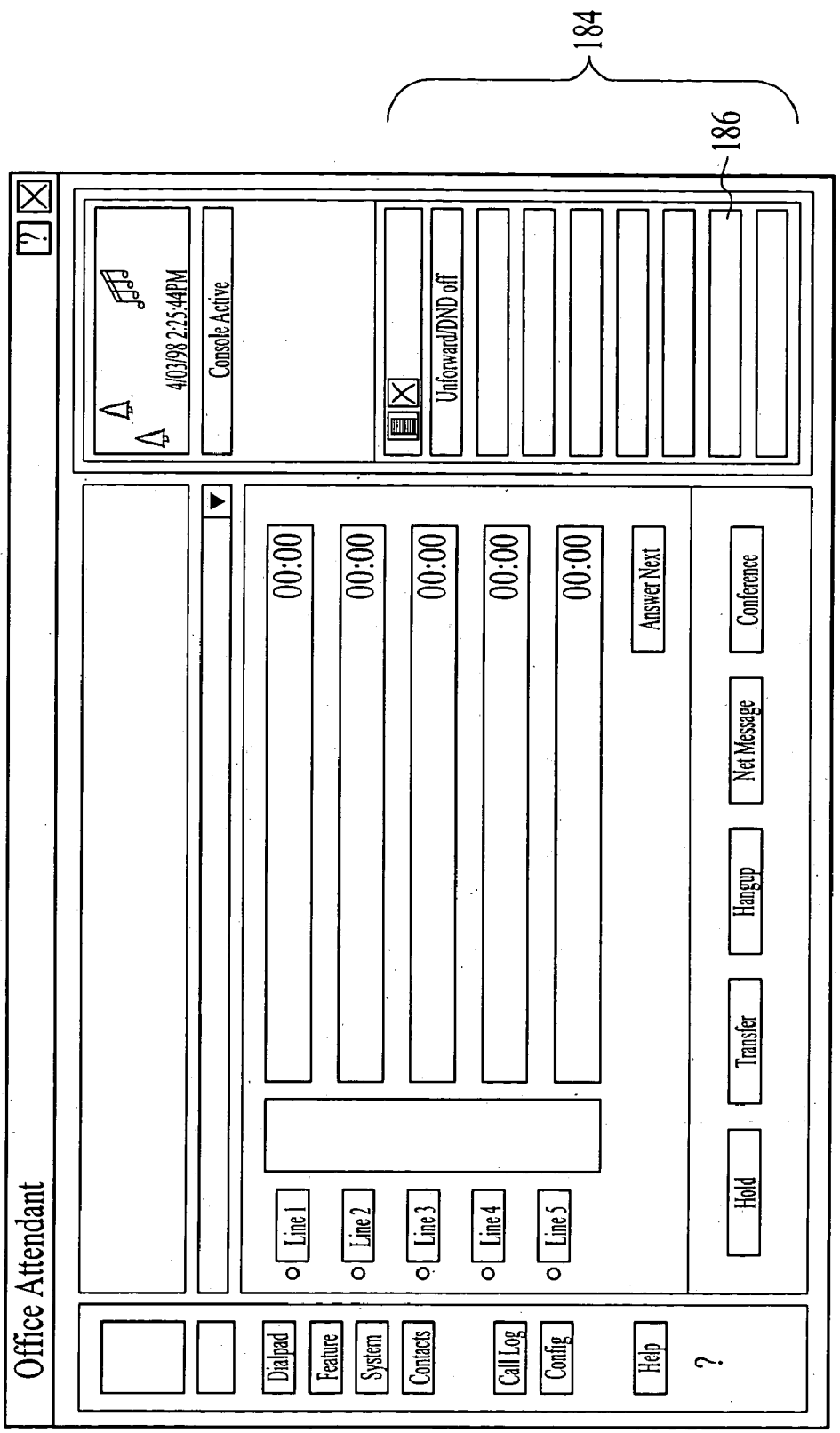

Referring now to FIG. 8B, window 182 is illustrated with feature box 184 shown, which may be displayed through the use of feature icon 136. Feature box 184 includes one or more configurable feature buttons 186. Such feature buttons enable a configurable environment for the office attendant type program user, by enabling particular tasks to be configured for particular feature buttons. As illustrative examples, such task/features may include dialing particular calls, forwarding calls to another extension, transferring calls to another extension, unforwarding calls, setting do not disturb for particular extensions, dialing international or special toll calls or the like, or other tasks that a particular user may find desirable to have accessible with a single or very few clicks of the computer mouse or pointer. The particular feature buttons preferably include textual information descriptive of the particular feature or task associated with the displayed button. In preferred embodiments, feature buttons may be added or deleted as desired by the particular user.

Figure 8C:
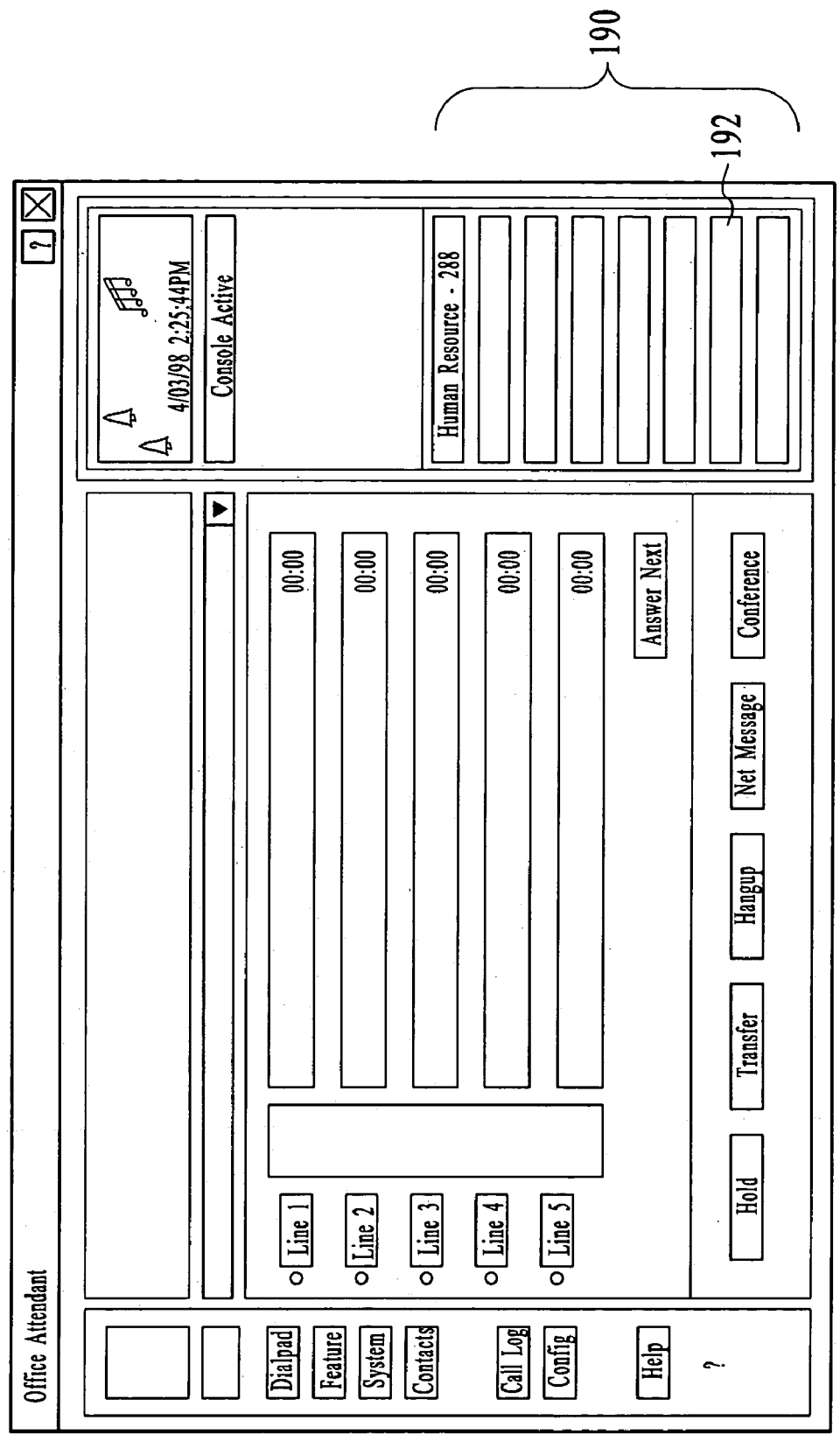

Referring now to FIG. 8C, window 188 is illustrated with system box 190 shown, which may be displayed through the use of system icon 138. In preferred embodiments, system box 190 includes a plurality of system buttons 192, which provide essential contacts, such as emergency numbers (e.g., police or fire or building security), the numbers particular to departments or officers in the particular company, branch office numbers, etc. With the use of system box 190, a user may have readily displayed the numbers of essential or important contacts, which may be connected with a single click of the computer mouse or pointer. The numbers or contacts associated with particular system buttons may be programmed by the user, but more preferably are programmed by the administrator of communications system 50 and downloaded in a manner similar to the subscriber information as previously described.

Figure 8D:
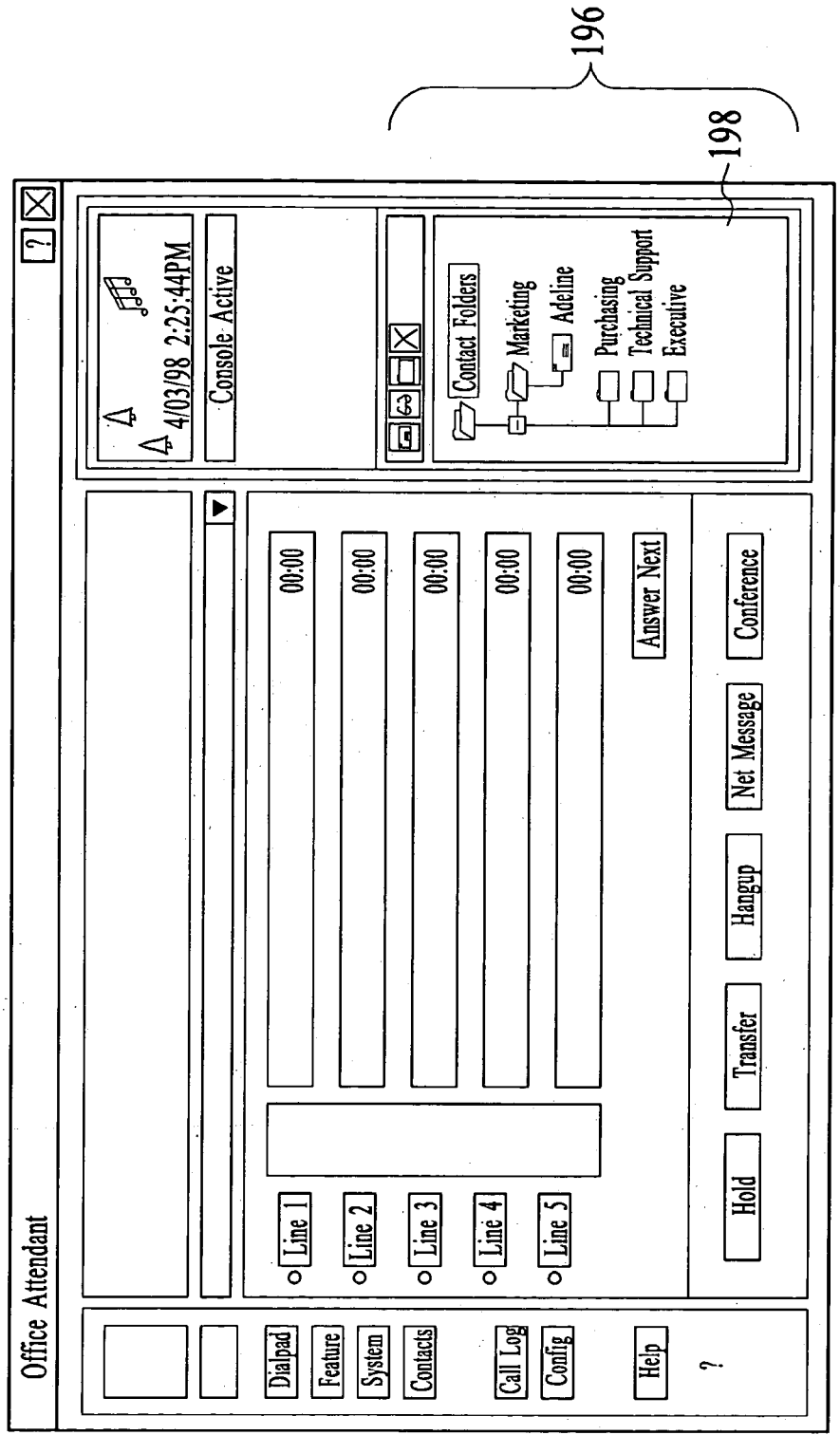

Referring now to FIG. 8D, window 194 is illustrated with contacts box 196 shown, which may be displayed through the use of contacts icon 140. Contact box 196 preferably includes a directory of contacts for the company of the user (illustrated generally as folder and contact tree 198), and also preferably contact or PIM-type information that may be obtained by importing from a PIM-type program or database resident in communications system 50 or on one or more of the computers coupled to communications system 50. Through the use of contacts icon 140 and contact box 196, contact information may be quickly provided to the office attendant type program user with a single or very few clicks of the computer mouse or pointer. In alternative embodiments, caller ID information is available to communications system 50, which may be made available to the office attendant-type program. In such embodiments, the office attendant-type program or a companion program may associate a contact with the caller ID information, and thereafter display contact information to the user.

In preferred embodiments, calls may be directed to the computer running the office attendant type program because a main number has been directed to this computer (and its associated telephone or headset), or because calls have been forwarded to the office attendant type program, or because a called party is on the phone, has indicated the called extension is "do not disturb," etc. In such situations, the office attendant type program user may need to transfer calls to other extensions, either inside the office or outside the office.

Preferably, persons in the office have a computer running a program in companion with the office attendant-type program. Such windows may include, for example, an animated icon, caller ID information, etc., and may include one or more icon the clicking of which causes the call to be answered. In such preferred embodiments, the office attendant type program may cause one or more windows to appear on the computers of particular persons in the office, such as a person to whom a call is being directed. As an illustrative example, a call may come in through WAN services network 58 (see, e.g., FIG. 3) and be directed to a main telephone number, which may be designated to be forwarded to a telephone associated with a person running the office attendant type program on a particular computer 24, and may be so directed by way of TDM bus 78 and switch/multiplexer 74, under control of processor/system resources 70. The computer 24 running the office attendant type program may be used to transfer the incoming call to a particular extension, which may be readily accomplished by way of transfer icon 178 (see FIG. 8A).

Figure 9A:
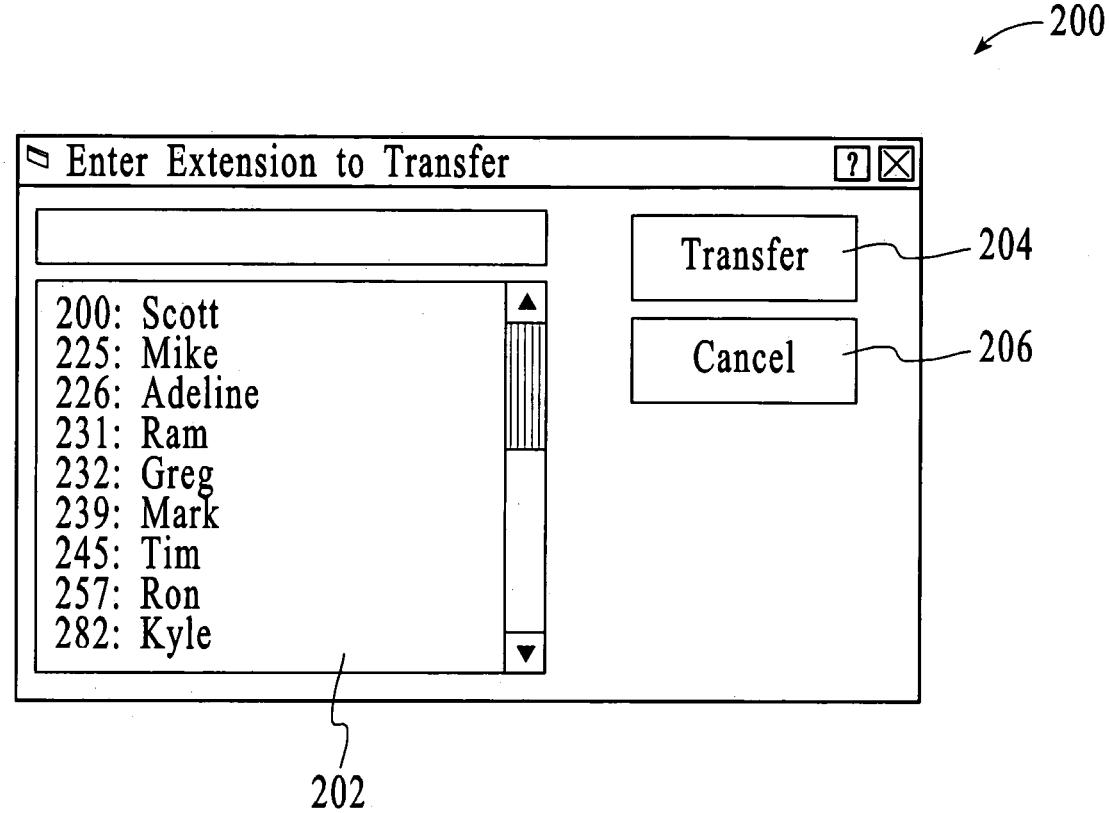
FIGS. 9A to 9C illustrate windows for illustrating additional features/functions in accordance with preferred embodiments of the present invention.

FIG. 9A illustrates window 200, which may provide a list of subscribers and extensions 202. By selecting a particular subscriber with a mouse or pointer, the transfer may be readily completed with a simple click of the mouse or pointer on transfer icon 204. Alternatively, the transfer operation may be canceled by a click of the mouse or pointer on cancel icon 206. It should be noted that, because the current subscriber information has been downloaded by communications systems 50 (as described elsewhere herein), more reliable transfer of calls may be achieved in accordance with the present invention.

Figure 9B:
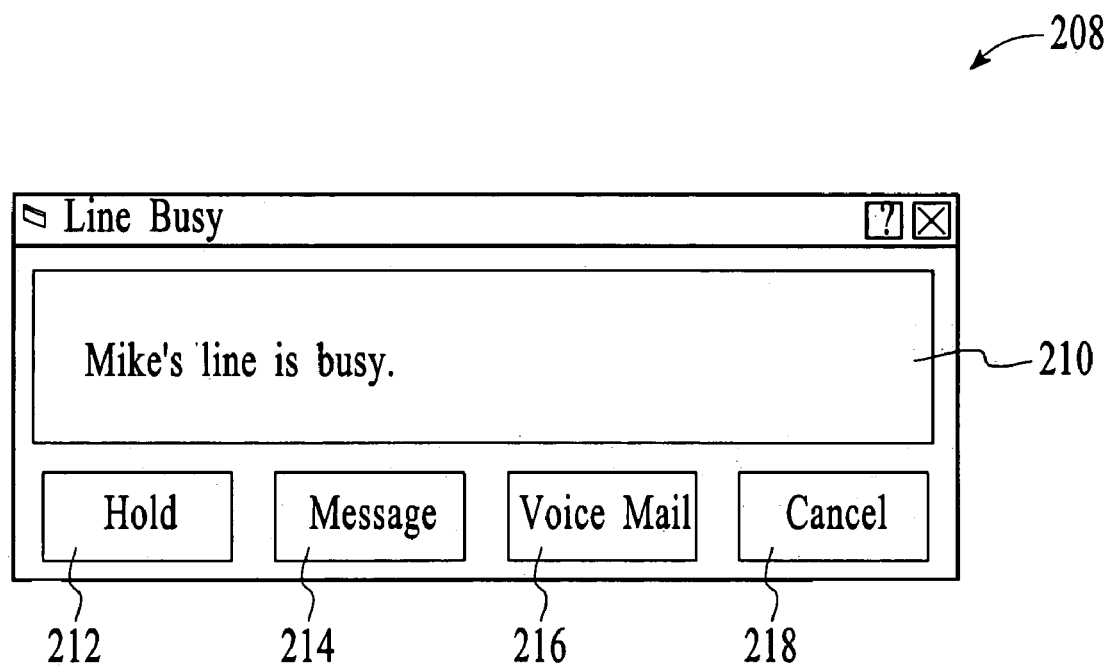

In accordance with preferred embodiments of the present invention, in the event of a failed transfer, for example in case the extension to which the call is being transferred is busy, a window preferably is automatically displayed on the computer running the office attendant type program. An exemplary window 208 is illustrated in FIG. 9B. As illustrated, display 210 may display a descriptive message, such as "line busy," "do not disturb," etc. Preferably, a number of icons also are simultaneously displayed to aid the office attendant type program user in processing this call. Hold icon 212 may be used to place the caller on hold. Message icon 214 may be used to initiate a net message to the party to whom the call is to be transferred. Voice mail icon 216 may be used to direct the call into the voice mail of the party to whom the call was to be transferred. Cancel icon 218 may be used to cancel the transfer operation. With such an automatically generated window 208, the office attendant type program user is presented with options to more quickly process such calls, again preferably with a single or very few clicks of the mouse or pointer.

In certain embodiments, activation of hold icon 212 automatically "parks" the call on the extension of the party to whom the call is to be transferred. In certain embodiments, particular subscribers may have the option to program their extension so that calls parked on their extension may or may not be automatically connected once the called party has completed its current call. In such embodiments, it may be desirable to have the called party informed that a call is being held. Preferably in such embodiments, the office attendant type program may be configured to automatically send a message (over a packet bus, as described earlier) to the computer of the party to whom the call is to be transferred, such as is illustrated by window 220 in FIG. 9C. In such embodiments, window 220 may contain message box 222, which may contain a message such as "call holding" or "call holding from Mike at extension 226, " or "call holding; outside caller, number xxx," etc. What is important is that message box 222 display a message that a call is holding, with appropriate information identifying the caller displayed to the extent possible or desired. It should be noted that in certain embodiments caller ID information is displayed, and in some such embodiments a directory or library of names or other identifying information may be contained in communications system 50 and/or one or more of the computers connected to the LAN so that names or other identifying information may be associated with the caller ID information and displayed in message box 222. Preferably, the computer of the called party plays an audible tone or sound.

In such embodiments, the called party may decide to terminate his/her existing call and accept the call from the party being transferred, such as by clicking on accept icon 224. Alternatively, the called party may decide to have the call from the party being transferred wait, such as by clicking on wait icon 226. The particular user being called preferably has the option to configure his extension to accept parked calls or to not accept parked calls. The particular user also preferably has the option to select an allowed parking time before the call is returned to the user running the office attendant type program. Thus, a transferred call may be temporarily parked, with an appropriate message displayed on the computer of the called party, with the parked call either accepted by the called party clicking on accept icon 224, returned to the user running the office attendant type program or forwarded to voice mail after a parking time out time has elapsed, or the call held longer than the allowed parking time by the called party clicking on wait icon 226. In certain embodiments, clicking on wait icon 226 enables the call to be parked indefinitely, while in other embodiments a second, longer and preferably user configurable parking time is enabled (thus preventing a called from being held for an indefinite period of time). If a time out time is exceeded, preferably the call is returned to the user running the office attendant type program or forwarded to voice mail, and still preferably an audible tone or sound is periodically emanated from the computer of the called party while the call is parked, thereby providing a subtle reminder of the existence of the parked call. In certain embodiments, users have the ability to mute or lower the volume of the reminder sound, such as by way of an additional icon in window 220. In all preferred embodiments, users have the ability to configure and select the particular options described herein that the particular users may desire.

It should be noted that a window 208 may be displayed in response to a transferred call being returned to the user running the office attendant type program, or it or a similar window may be displayed in response to the user running the office attendant type program "looking ahead" to the status of the extension to which the call is to be transferred. What is important is that the user running the office attendant type program determine that the transfer may not be accomplished, and then optimally be provided with options for processing the call in an expedient manner, such as described elsewhere herein.

Figure 9C:
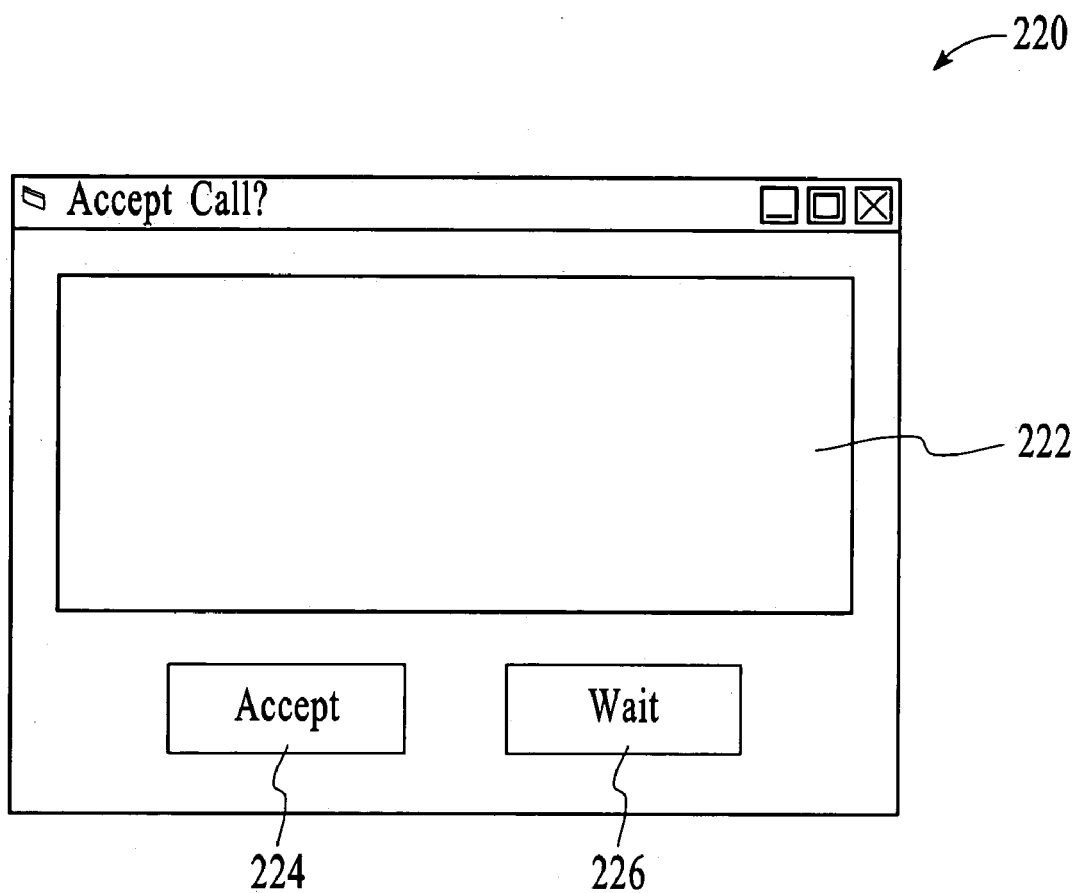

It should also be noted that, in the event of a particular user extension being dialed directly without going through the office attendant type program, a window such as window 220 of FIG. 9C may be displayed on the computer of the called party, either automatically for all calls, or only in the event that the called party has put his telephone on do not disturb, but has configured his extension to receive a message notification of calls, or in the event that the called party is on the line. In such embodiments, communications system 50 may generate such a window by a suitable message sent over by packet bus to the user's computer. In such embodiments, communications system 50 may simultaneously ring a user's extension and notify the user of the call with a net message, with the called being accepted, parked or forwarded to voice mail such as described earlier. Of course, in the event that a user previously configured his extension to be automatically forwarded to another extension or location or to voice mail or the like, then communications system preferably takes the programmed action directly. As an illustrative example, a user may configure his extension so as to route all calls to another extension or to a local or long distance telephone number. Such a user also may configure his extension so as to route all calls as voice over IP ("VoIP") call. In the later situation, processor/system resources 70 and/or DSP 76 may process the incoming voice information (received through the appropriate station card 82 and via TDM bus 78, etc.) into appropriate IP packets, which may then be routed, for example, through an HDLC framer/deframer 73B, through switch/multiplexer 74, over TDM bus 78 and out over a designated IP connection via WAN services 58, etc.

Figure 10A:
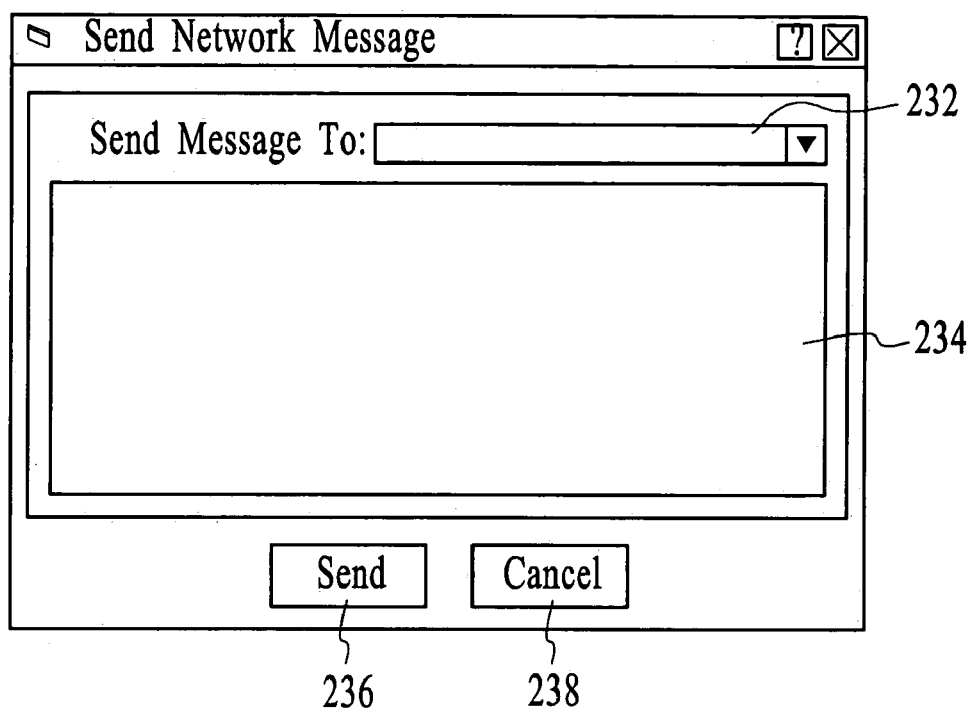
FIGS. 10A to 10B illustrate preferred embodiments of the net message windows in accordance with preferred embodiments of the present invention.

As previously described in connection with FIGS. 8A and 9B, a user running the office attendant type program preferably is presented with icon 174 (FIG. 8A) and icon 214 (FIG. 9B) for generating net messages, such as to send a net message to a user to whom a call is to be transferred, or to otherwise send a net message to a particular user, etc. FIG. 10A illustrates window 230 as an exemplary net message window that may be generated in response to clicking icon 174 or 214. As illustrated, window 230 preferably includes box 232 to identify the recipient of the intended net message, which may be automatically selected by the office attendant type program in the event of a failed call transfer situation. Otherwise, the recipient may be selected by pull-down menu as illustrated, or by direct entry of a name or extension number, etc. In preferred embodiments, as letters of the name is typed, the office attendant type program automatically scrolls through the subscriber directory in order to more arrive at the desired net message recipient.

Box 234 is provided in order for the office attendant type program user to type a desired net message. In alternative embodiments, a list of pre-generated net messages are available via a pull down menu or window opened with an icon or the like (such pre-generated messages may include whole or partial messages, greetings, etc. that are frequency utilized, thereby saving the user from having to type a repetitive message, etc.). The net message may be sent by clicking on send icon 236 or canceled by clicking on cancel icon 238. It should be noted that the net message recipient may be a user physically located in the same office and receive the net message by way of packet bus 80A or 80B (see FIG. 3), or alternatively, the net message may be sent as Internet or other message by way of TCP/IP through modem 75 or through the WAN services network 58 (e.g., a T1 connection) by passing through an HDLC framer 73B, such as was described with reference to FIG. 3. Thus, in the situation in which a particular user is "off-premises," calls may be forwarded off-premises (by appropriate programming of the particular user's extension, as described elsewhere herein), and net messages likewise may be forwarded off-premises.

Figure 10B:
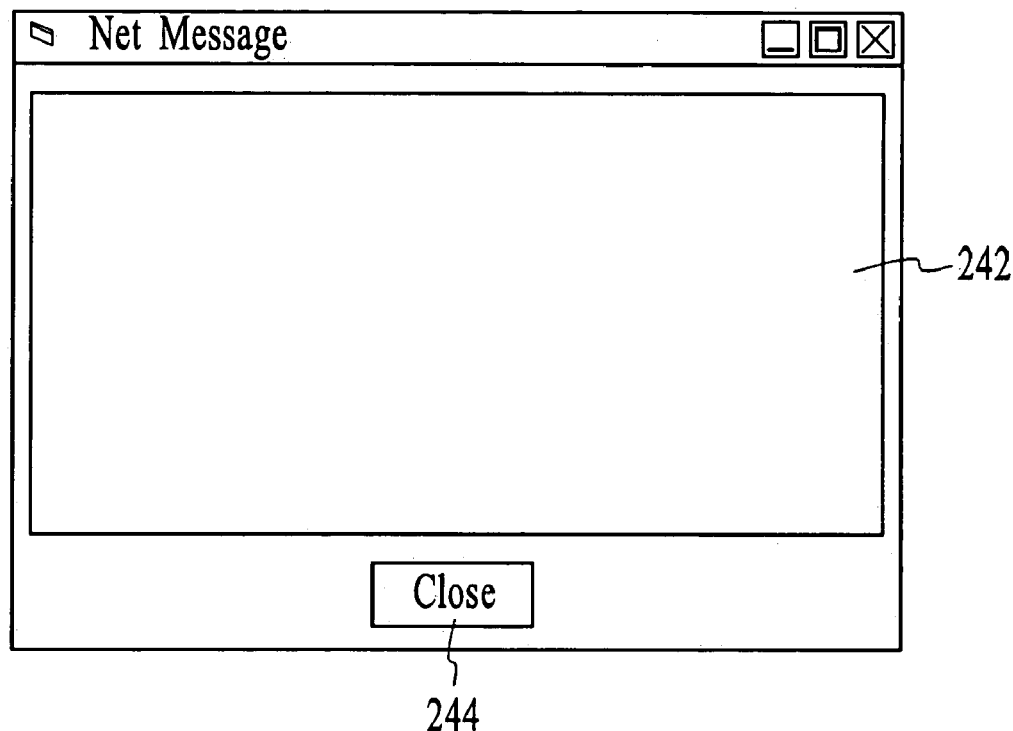

FIG. 10B illustrates net message window 240 that may appear on the computer of the recipient. The recipient is presented with the net message in window 242, and may close the net message by clicking icon 244. Alternatively, net messages may be stored for archival purposes or later viewing, and in alternative embodiments net messages also include a reply icon which may be clicked in order to bring up a window in which a reply message may be typed. In such embodiments, an office attendant type program user may inform the recipient, for example, of a particular caller, and the recipient may inform the office attendant type program user, for example, that the caller should be directed to a particular individual or department or processed in a particular way (directly to voice mail, call terminated, etc.). With such embodiments, packet bus or other messages may be readily exchanged in a manner to more readily facilitate telephony management etc.

In alternate embodiments, net messages may be sent from a computer running an office attendant-type program or a companion program, to any other computer coupled to communications system 50, either by way of the LAN or WAN; etc. In such embodiments, for example, if the user to whom a message is directed is logged onto communications system 50, the net message may be sent (preferably via communications system 50) either as a net message as previously described, or in the form of a visual "pink slip," "yellow sticky note," etc., which preferably appears in a small window on the screen of the user/message recipient. Still preferably, such "pink slip" or "yellow sticky note" messages include icons for options such as reply, delete, file/store, minimize, etc.; preferably, after a reply, delete, and/or file/store command, the message window automatically disappears. In certain embodiments, if a plurality of such messages are received and have not been processed so as to disappear, then such messages automatically stack up, with a visual representation of stacked messages presented to the user (e.g., showing a third dimension of a stack of messages, etc.). In such embodiments, the user preferably sees the most recently received message on top, and also has the option to freeze/hold the updating of the message stack such as by selecting a suitable icon (e.g., if the user is reading a particular message, he/she may command that the message being read is not replaced by a subsequently received message), scroll through the stack of messages, etc. Still preferably, the user may select (again my suitable icon) that a particular message be forwarded to himself/herself as email, or to another person either as a similar message or email, etc. In preferred embodiments, communications system 50 automatically stores and sends as email all such messages that are not processed in a definitive manner by the user (e.g., if the user logs off without having replied, deleted, stored, etc. such messages, then communications system 50 processes such unclosed messages as emails to the particular user or users, etc.).

It also should be noted that a sender of a net message may be prompted that a particular user to whom a net message is being directed is not logged on. In such embodiments, the sender may then be prompted (such as with a suitable information display and icon) to convert the net message to an email message, etc.

As illustrated in FIG. 8A, conference icon 172 may be utilized to initiate a conference call in accordance with certain preferred embodiments of the present invention. Certain conferencing preferred embodiments of the present invention will be described with reference to FIGS. 11A through 11E.

As indicated, conference icon 172 may be utilized to initiate a conference call in accordance with the present invention. Alternatively, in other preferred embodiments the conference call may be initiated by a click and drag operation. For example, an icon indicating a received call or the status of a received call (such as described earlier) may be clicked and dragged over the opened dialpad (see, e.g., FIG. 8A). The office attendant type program recognizes this click and drag operation as a request to open a suitable conference window, and the office attendant type program thereafter automatically opens the conference window.

Figure 11A:
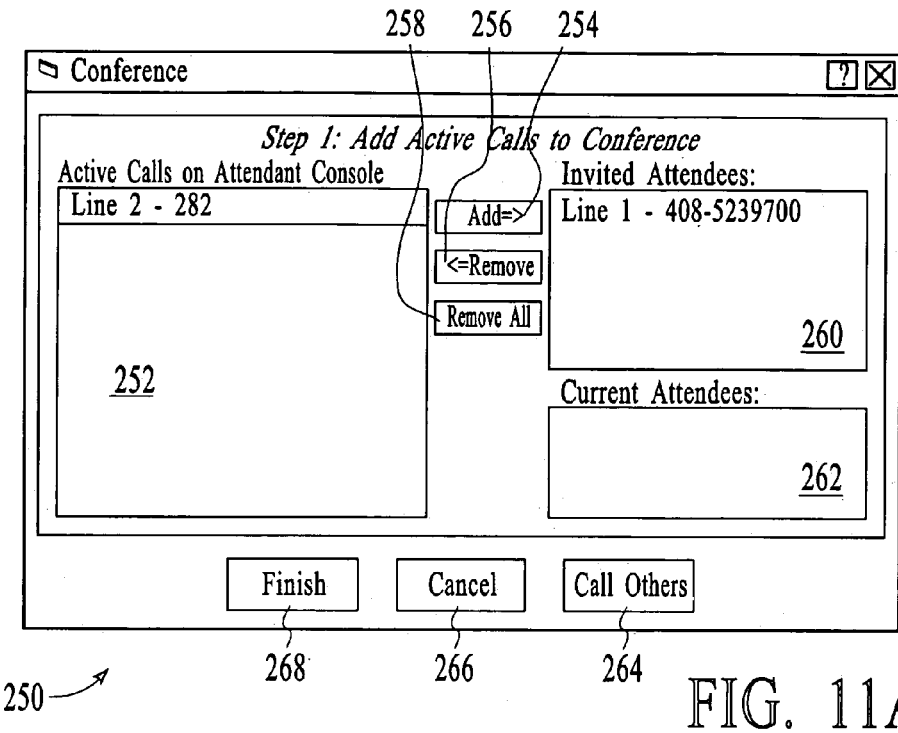
FIGS. 11A to 11E illustrate various embodiments of the conference windows in accordance with preferred embodiments of the present invention.

FIG. 11A illustrates one embodiment of such a conference window 250. As illustrated, conference window may include box 252, which may serve to indicate what calls, if any, are presently displayed on the office attendant type program "console" (e.g., windows 150 of FIG. 8A). In the event that calls are present on the console, such calls may be added to the conference through the use of add icon 254. Attendees invited to join the conference may be displayed in window 260. Through the use of icon 256 one or more particular attendees may be selected with the pointer or mouse and removed from the conference call attendee list, and through the use of icon 258 all attendees may be removed from the conference call attendee list. Window 262 may serve to display attendees current participating in the conference call in the event that window 250 is opened while a conference call is in progress. Icon 264 may be used to call other parties in order to invite such parties to participate in the conference call, and icon 266 may be used to cancel the add conference call attendees operation (i.e., close window 250). Icon 268 may be used to finish the add conference call attendee operation and preferably initiate or continue the conference call; in FIG. 11A icon 268 is illustrated as not active given that multiple invited attendees are not present and no conference call is on-going (and thus the conference cannot be initiated or continued).

Figure 11B:
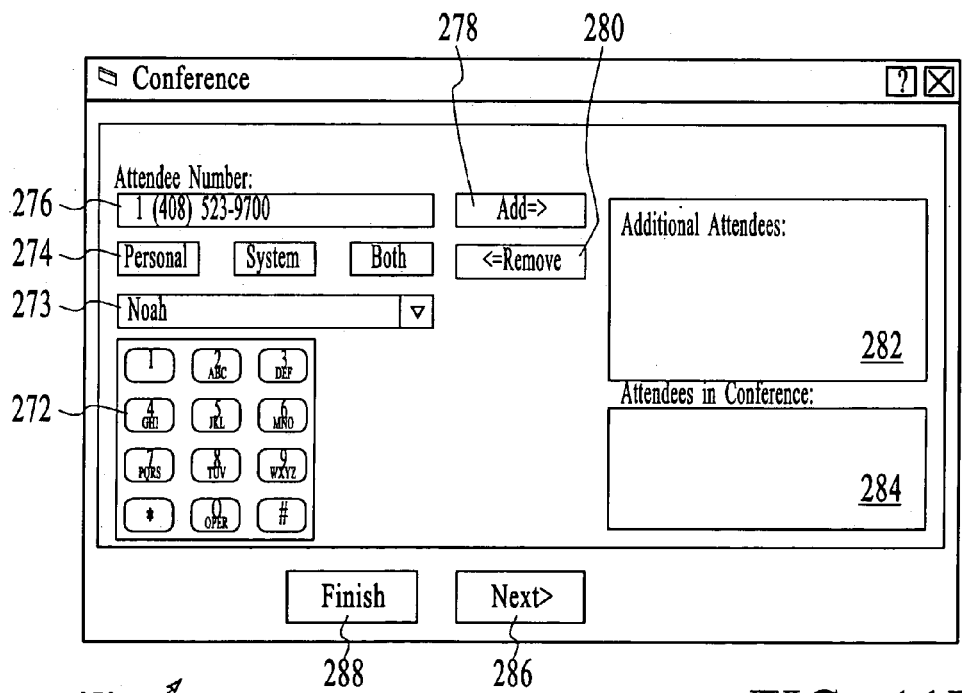

In the event that icon 264 is selected, a call others operation may be initiated. FIG. 11B illustrates one embodiment of window 270 for calling additional attendees. As illustrated, window 270 preferably includes dialpad 272, which may be utilized to dial the extension or telephone number of a party to be added to the conference, which may be a party either on premises or off premises. Window 274 may be used to access either personal or system contact information, or both personal and system contact information, such as previously described. The names of particular subscribers may be entered or displayed in window 273, and the extension or number of a particular party to be added to the conference may be entered or displayed in window 276. Additional attendees may be added with icon 278 or removed with icon 280, with the additional attendees identified in window 282, with attendees in the conference identified in window 284. The next icon 286 preferably may be used to proceed to a dialog box from which the additional attendees may be called to join the conference. Selecting the finish icon 288 preferably results in the conference commencing or continuing without proceeding to a call dialog box.

Figure 11C:
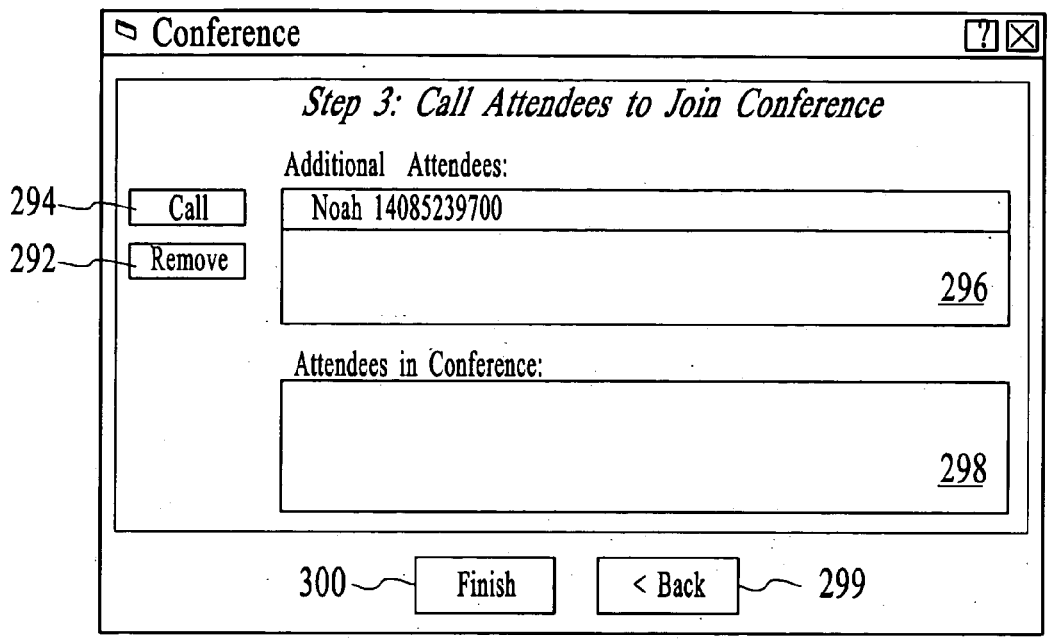

In the event that next icon 286 is selected, a call attendee dialog box preferably appears, with an exemplary dialog box illustrated in FIG. 11C. As illustrated, window 290 includes call icon 294, which may be used to initiate a call to a particular selected additional attendee (who may be selected with the mouse or pointer in a conventional manner).

Remove icon 292 may be used to remove additional attendees from window 296. Preferably, each additional attendee is called and informed that they are being added to the conference call; if the additional attendee agrees to be added to the conference call, the call preferably is placed on hold; otherwise the caller may hang up or be processed in some other desired manner. Once all additional attendees have been contacted and placed on hold as desired, finish icon 300 may be selected to initiate or continue the conference with the additional attendees. Back icon 299 may be use to return to the window illustrated in FIG. 11B in order to add additional attendees, etc.

Figure 11D:
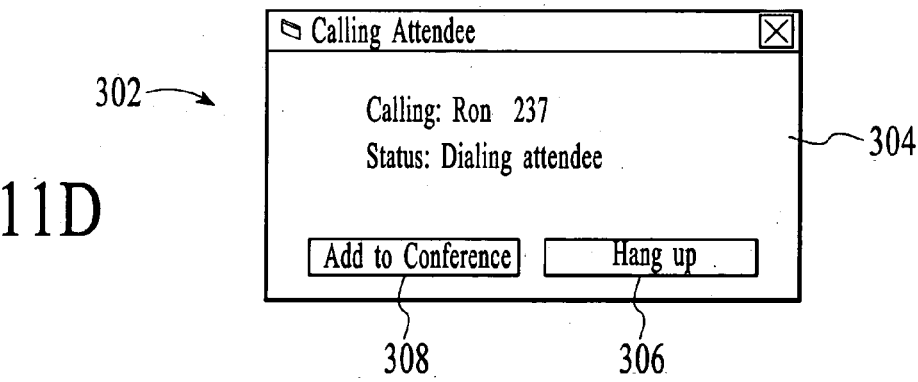

Preferably, as additional attendees are called, window 302 appears as illustrated in FIG. 11D. As illustrated, window 302 includes information display 304, which preferably displays the name and/or number of the additional attendee being called, as well as the status of the call. Icon 306 may be used to hang up or terminate the call, while icon 308 may be used to add the additional attendee to the conference call. Still preferably, an add conference attendee window is invoked, for example, if one call has been added to the conference and no other call is active on the console, etc.

Figure 11E:
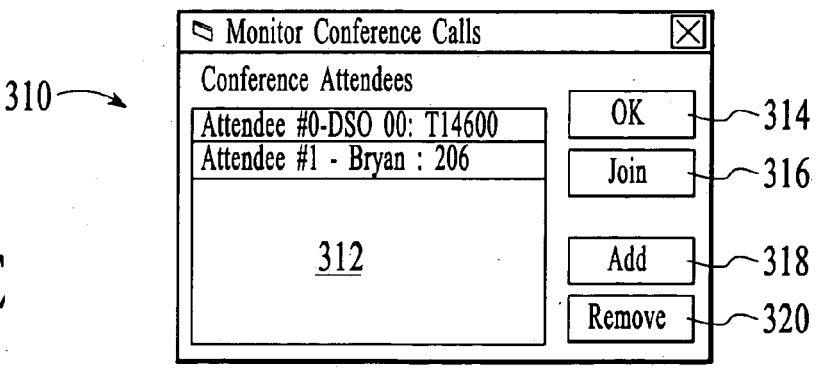

Still preferably, conference call monitor window 310 may be displayed by the office attendant type program, as illustrated in FIG. 11E. As illustrated, window 310 may include window 312 for displaying an identification of all attendees participating in the conference call. From window 310 additional parties may be added to, or removed from, the existing conference call. Icon 314 may be used to confirm that the existing list of conference participants is acceptable. Icon 316 may be used to allow the party running office attendant to join as a party to the conference call. Icon 318 may be used to add additional parties to the conference call, such as a call that is existing on the console as illustrated in FIG. 8A (as an example, a call is received by the office attendant program while the conference is in progress), or by adding an additional attendee. Such operations to add additional attendees preferably may be achieved as described earlier in connection with FIGS. 11A through 11D. Icon 320 may be used to remove attendees from the conference call.

What should be noted is that, in accordance with the present invention, easy to use and intuitive graphical interfaces are provided to initiate, maintain and monitor conference calls in accordance with preferred embodiments of the present invention. Such embodiments preferably are implemented utilizing communications system 50 as illustrated, for example, in FIG. 3, which provides a exceptionally desirable platform for managing voice and data communications while allowing a user to more optimally manage and/or participate in such conference calls.

Figure 12:
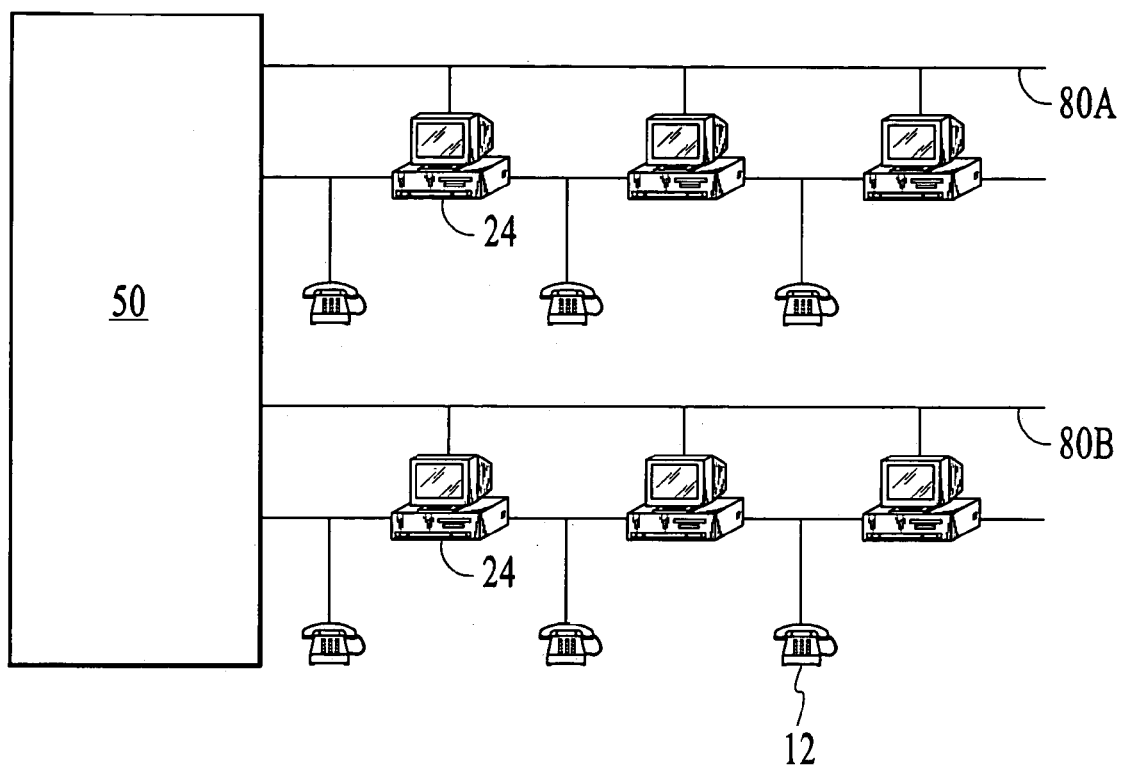
FIG. 12 illustrates another preferred embodiment of the present invention.

Still other features in accordance with preferred embodiments of the present invention will be described with reference to FIG. 12. As illustrated in FIG. 12, communications system 50 (which preferably may be implemented as described in connection with FIG. 3) is coupled to one, two or more packet buses (such as packet buses 80A and 80B), connected to which may be a plurality of computers 24. One or more computers 24 may run an office attendant-type program, or alternatively a companion program to the office attendant-type program, such as described elsewhere herein. As previously described, such computers running an office attendant-type program may be advantageously utilized to manage and control incoming and outgoing calls in the office. In accordance with the present invention, for example, a first computer 24 at a first physical location in the office (e.g., coupled to communications system 50 over a packet bus, for example) may be designated as the telephony control station for managing the incoming and outgoing calls. A second computer 24 at a second physical location in the office (e.g., coupled to communications system 50 over the same or a different packet bus, for example), may be designated as a secondary telephony control station. If the first telephony control station exceeds a designated call capacity (such as described earlier), or the first telephony control station goes off-line such as to due to a local failure or due to the user of the first telephony control station logging off, etc. (such as going to lunch, going home for the day, etc.), the second telephony control station is ready to immediately assume control of managing the incoming and outgoing calls of the office. In accordance with such embodiments, control of the telephony functions of the office may effectively be passed from computer to computer along the same packet bus or from a first computer connected to a first packet bus to a second computer connected to a second packet bus. Thus, telephony control may be efficiently transferred from computer to computer in a flexible and desirable manner, which may include computers at different locations within the office.

It also should be noted that an office attendant-type program also may be run from a location remote from communications system 50, such as on a computer coupled to WAN services network 58 of FIG. 3. In such embodiments, a remote computer coupled to communications system 50 over a WAN network connection may run the office attendant-type program and remotely control the telephony functions of the office, in a manner such as described previously herein. Thus, control of telephony functions may be effectively performed in the office or remotely from the office, with control passed from computer to computer in an efficient and desired manner. Additionally, the user of the remote computer may run an office attendant-type program or a companion program as described elsewhere herein, and from such remote location be coupled to communications system 50 and remotely reconfigure the telephony and/or voice mail settings for the particular user. As an example, the remote user may use the remote computer in order to direct telephone calls to his/her extension to voice mail, or alternatively to have such calls forwarded to another extension or to a remote telephone number. With such embodiments, particular users may remotely access communications system 50 and, for example, control the forwarding of calls to an internal or remote location. As a particular example, a user using a notebook computer or PDA, etc., may couple to the Internet or WAN, etc. from a remote location, and direct that telephone calls to his/her office extension be forwarded in a desired manner (e.g., off-premise call forwarding, etc.). With the user able to access communications system 50 and remotely set and store PBX-type settings remotely, a variety of desired reconfiguration options are presented to the user.

Additional advanced PBX/telephony-type functions in accordance with other embodiments of the present invention will now be described.

In preferred embodiments, communications system 50 may dynamically associate physical telephones 12 with particular user extension numbers. In certain respect, this may be considered like a "DHCP" (described elsewhere herein) for physical telephones. For example, a system administration may run a configuration/administration program (such as described elsewhere herein) and configure an extension number (e.g., 200) for a particular user, including associated parameters for such user, such as telephony and voice mail options (e.g., user forward settings, including off premise call forwarding, busy forward settings, ring-no-answer forward settings, time of day forward settings, display name for telephones displaying caller names, etc., whether the telephone is configured to be a telephone for a user running an office attendant-type program, etc.). At this time, the system administrator may or may not assign a physical telephone to that extension. Thereafter, the system administrator may notify the user that his/her extension number is 200. The system administrator also has the ability to enable and/or assign physical telephones. In the event that the system administrator has not assigned a physical telephone to that user, the user preferably has the ability to assign a physical telephone to his/her extension. For example, the user may pick up a telephone that has been enabled, and preferably does not have an extension assigned to that telephone, and the user enters a special code, e.g., numbers that communications system 50 recognizes as a request to assign a physical telephone. In certain embodiments, communications system 50 audibly informs (such as using DSP 76) the user of the status of that physical telephone (e.g., enabled or disabled, presently assigned to an extension, etc.). Thereafter, the user preferably is prompted audibly to enter his/her extension number. Optionally after a confirmation prompt, communications system 50 then assigns that physical telephone to the particular user. Still optionally, if the particular user extension is already assigned to another physical telephone, then communications system 50 un-assigns the other physical telephone at the time a new physical telephone is assigned to the particular user/user extension.

As will be appreciated, with such embodiments a special code also may be provided to un-assign physical telephones from particular user extensions, which preferably is implemented with password protection for particular users to ensure that the user's extension may not be assigned or re-assigned to physical telephones without the user's authorization or control (e.g., after entry of the extension number, communications system 50 prompts the user for a password associated with that user extension, and only allows assignment of a physical telephone to that extension if the correct password is entered, etc.). Thus, a user may assign his extension to a physical telephone by picking up that telephone and entering appropriate commands via the telephone keypad, and may un-assign his/her extension from that physical telephone by similarly picking up the physical telephone and entering appropriate commands via the telephone keypad (or by assigning the extension to a different physical telephone, as previously described), etc. In accordance with such embodiments, various office telephony arrangements may be implemented, such as an office arrangement in which a plurality of cubicles, offices or other physical spaces are provided with physical telephones but are not assigned to particular users. In accordance with such embodiments, particular users may be assigned an extension, and may occupy an available physical space and assign the physical telephone in that physical space with the user's extension. At the end of time for occupying that physical space, the user may un-assign his/her extension from that physical telephone, and then re-assign the extension to another physical telephone when the user later occupies another physical space, etc.

Additionally, as previously described communications system 50 may serve as an email server or otherwise serve to distribute email to particular computers (such as computers 24) coupled to communications system 50. Thus, communications system 50 can store information indicating that a particular user or users have received email. In such embodiments, communications system 50 preferably provides a visual or audio indication to the user that he/she has email. As illustrative examples, a special dial tone or message may be generated (such as with DSP 76) and presented to the user's telephone so that, when the user picks up his/her telephone, the special dial tone or message alerts the user that he/she has email (which also may include a special tone or message indicating that the user has voice mail). As one example, the tone or message may be a particular sound, but preferably is an audible message such as "you have email," or "you have voice mail and email" or "you have voice mail," etc. In the event that communications system 50 is implemented with telephones 12 having message indicator lamps, a particular lamp or blinking sequence may be used to indicate that the user has email, voice mail or both, etc. In all such embodiments, users may be desirably informed that they have email and/or voice mail with their telephony device (e.g., telephone).

As described elsewhere herein, communications system 50 may serve to provide email services to particular users with telephone extensions associated with communications system 50, etc. In addition, communication system 50 also provides a platform (such as with processor/system resources 70) on which various management, administration or other types of applications may be run (exemplary such applications are described elsewhere herein). In one embodiment, various WAN and other information is provided using an what is known as a SNMP-type protocol (as is known in the art, SNMP stands for Signaling Network Management Protocol, which is a protocol/method by which network management applications can query or request information from a management agent (such as are implemented in the present invention with processor/system resources 70 and appropriate software, etc.). A novel aspect of such embodiments of the present invention is that the voice mail system of communications system 50 also is implemented in a manner to provide voice mail related information in an SNMP-type form Thus, in accordance with such embodiments of the present invention, communications system 50 stores a variety of information relating to voice mail, such as information relating to the status of the voice mail system, failure or alarm-type information, usage statistics, etc. In such embodiments, any tool or application that is SNMP compliant can access and view such voice-mail related information. Exemplary voice-mail-related information that may be made available via SNMP to an SNMP compliant tool or application is set forth in Table 1. With such embodiments, network (WAN and LAN, etc.) and PBX information along with voice mail-related information may be desirably provided using SNMP to a variety of SNMP tools and applications.

TABLE 1

| Label | Where | Description |
| --- | --- | --- |
| InCalls | TUI | Number of incoming calls answered (all types) |
| MsgCreate | MSS | Number of messages created |
| MsgSent | IMDA | Number of messages sent successfully |
| MsgSendFail | IMFSA | Number of message send failures caused by an error in the Msg Subsystem |
| MsgDelete | MSS | Number of message deleted |
| MbxLogon | MSS | Number of times users logged on successfully |
| MbxLogoff | MSS | Number of times users logged off their mailbox (versus abandoned) |
| TooManyErrors | TUI | Number of times callers were dropped because they made too many errors |
| TooShort | TUI | Number of times messages recorded were too short |

TABLE 1-continued

| Label | Where | Description |
|---|---|---|
| Restart | TUI | Number of times the AA/VMS application was restarted/reloaded |
| MWIOn | MSS | Number of requests to turn MWI On |
| MWIOff | MSS | Number of requests to turn MWI Off |
| MWIFail | MSS | Number of MWI (On/Off) requests that failed |
| TMOOper | TUI | Number of calls transferred to Operator because of TMO |
| ZeroOper | TUI | Number of calls transferred to Operator because caller dialed "0" |
| ErrorOper | TUI | Number of calls transferred to Operator because of too many errors |
| ErrorPassword | TUI | Number of calls dropped because of too many password errors. |
| DiskFull | MSS | Number of times disk was too full to take a message |
| ExtDirInCall | TUI | Number of direct external (trunk) calls into AA/VMS |
| ExtFwdInCall | TUI | Number of external calls forwarding into AA/VMS |
| IntDirInCall | TUI | Number of direct internal (station) calls into AA/VMS |
| IntFwdInCall | TUI | Number of internal calls forwarding into AA/VMS |
| NewMsg | TUI | Number of "new" messages recorded and sent by logged on users |
| FwdMsg | TUI | Number of "forwarded" messages recorded and sent by logged on users |
| ReplyMsg | TUI | Number of "reply" messages re-corded and sent by logged on users |
| MultAddress | TUI | Number of messages sent that had more than one address |
| NameRecord | TUI | Number of times a Name message was recorded |
| GreetRecord | TUI | Number of times a Greeting message was recorded |

Video Conferencing Type Applications

In accordance with preferred embodiments of the present invention, advanced video conferencing capability may be readily provided in a variety of office environments. Certain such preferred embodiments will be described with reference to FIGS. 13A through 13C. Such embodiments may also be more readily understood by also referencing previously described figures, such as FIG. 3, etc.

Figure 13A:
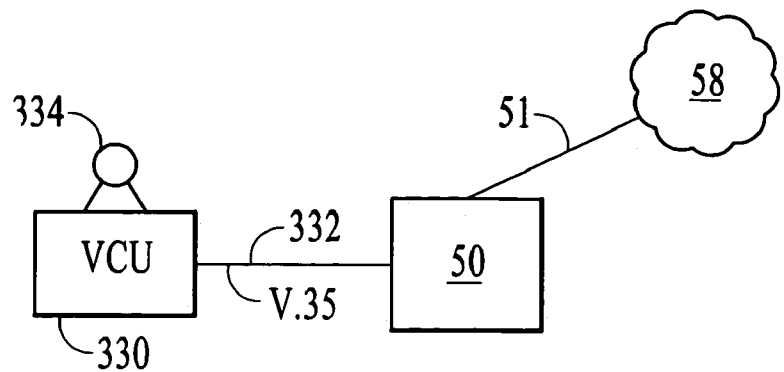
FIGS. 13A to 13C illustrate preferred embodiments of video conferencing in accordance with the present invention.

With reference to FIG. 13A, video conferencing in accordance with a first embodiment will be described. As illustrated in FIG. 13A, communications system 50 is coupled to video conferencing unit or VCU 330. VCU 330 may be a video conferencing system or a higher end computer or the like that preferably includes camera 334 and is coupled to communications system 50 over bus 332, which preferably is a high speed serial or other interface trunk, such as, for example, what is known as a V.35, V.36 or V.37 interface trunk. In such embodiments, cards 82 of communications system 50 include an appropriate interface card for the particular interface trunk and preferably enable a direct and compatible interface with VCU 330. In such embodiments, video information from camera 334, and audio information, as appropriate, from VCU 330, are coupled to communications system 50 over bus 332. Still preferably, the data stream from VCU 330 is in a form compatible with transmission over, for example, a T-1 line. In such preferred embodiments, the data stream from VCU 330 is coupled to TDM bus 78 via station cards 82, and then coupled to switch/multiplexer 74, and then redirected via switch/multiplexer 74 to, for example, T-1 line 51 that is coupled to WAN services network 58 (of course, one or more additional compatible VCUs preferably are coupled to WAN services network 58 in order to complete the video conference). In such embodiments, video conferencing may be achieved efficiently with a data stream coupled from VCU 330 to communications system 50 to, for example, a T-1 line via TDM bus 78 and switch/multiplexer 74.

Figure 13B:
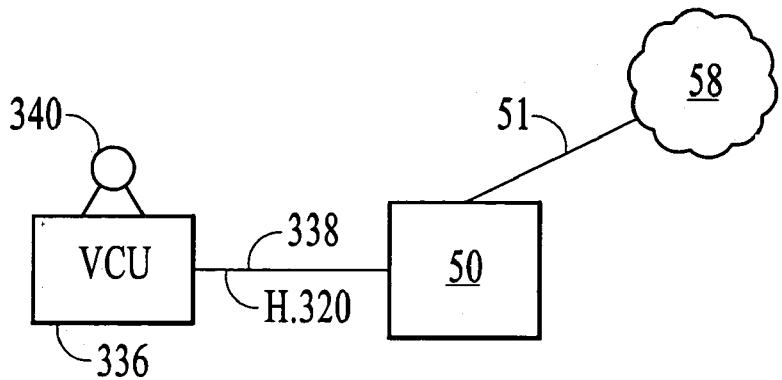

FIG. 13B illustrates VCU 336 with camera 340 (which may be previously described) coupled to communications system 50 over bus 338, which in this embodiment in an ISDN or T-1 type interface that supports, for example, a H.323 video conferencing standard. In such embodiments, a data stream (e.g., video and audio) from VCU 336 is coupled to communications system 50, coupled via an appropriate ISDN/T-1 compliant station card 82 to TDM bus 78 and to switch/multiplexer 74. Thereafter, from switch/multiplexer 74 the data stream may be coupled via an appropriate station card 82 to outgoing T-1 line 51 to WAN services network 58.

Figure 13C:
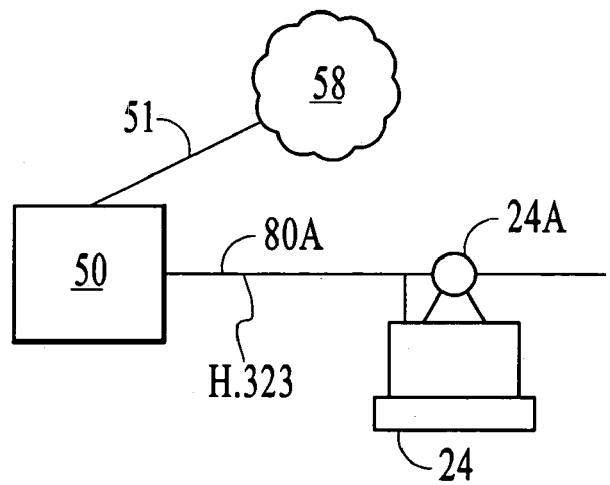

Yet another embodiment of video conferencing in accordance with the present invention is described with reference to FIG. 13C. As illustrated, computer 24 is coupled to communications system 50 over packet bus 80A (see, e.g., FIG. 3). Computer 24 includes camera 24A and preferably a microphone and speaker. Video and audio information preferably are coupled between communications system 50 and computer 24 through an appropriate packet standard, for example what is known as H.323. Referring again to FIG. 3, in such embodiments packetized video information is provided from computer 24 to communications system 50 over packet bus 80A Processor/system resources 70 processes the packetized data stream (e.g., de-packetizes the data stream), which preferably now is in a suitable form/protocol (such as TCP/IP) for transmission to a remote computer running a compatible video conferencing program. As illustrative examples, the video data stream may be directed by processor/system resources 70 to fax modem 75 and coupled to a remote computer, or the video data stream may be directed by processor/system resources 70 to an HDLC framer/deframer 73B, to switch/multiplexer 74, to TDM bus 78, to an appropriate station card 82 and to WAN services network 58 via trunk 51 to which is coupled one or more remote computers for completing the video conference. It also should be understood that one or more such computers desiring to establish a video conference also may use an Internet connection established with the aid of what is known as an ILS (or Internet locator service) dynamic directory, a real time directory server component, which serves to aid "user to IP mapping" for establishing desired point-to-point connections for video conferencing.

It also should be noted that such video streams from computer 24 may be directed to one or more other computers on the same packet bus 80A (using the hub feature of communications system 50), or to one or more other computers on a different packet bus (using the router feature of communications system 50), such as previously described.

It should be noted that the documentation for particular video, telephony and other standards, such as T-1, ISDN, V.35, H.320, H.323, etc. are publicly available, and such standards documentation is hereby incorporated by reference.

As also described elsewhere herein, in preferred embodiments VoIP communications may be readily enabled. Referring again to FIG. 3, voice from a telephone 12 may be coupled via station cards 82 and TDM bus 78 to switch/multiplexer 74. From switch/multiplexer 74, the voice data stream may be directed to DSP 76, which directly or in conjunction with processor/system resources 70, produce appropriate IP packet data (in effect, DSP 76 and/or processor/system resources 70 serve as, for example, a TCP/IP processor). After IP packeting, the voice data maybe directed to WAN services network 58 via an HDLC framer/deframer 73B (such as described elsewhere herein), or may be directed to one or more packet buses/LANs, also as previously described. It should be noted that, with DSP 76, which may be configured to provide substantial processing resources, voice data may be IP processed effectively with minimal or no consumption of the resources of computer/system resources 70, thereby helping to prevent an undesirable loading of computer/systems resources 70.

It also should be noted that such embodiments have been described with reference to VoIP applications. It should be noted that such embodiments also may be used with other network protocols that may carry voice-type information. Thus, in accordance with the present invention, a network protocol (such as IP) may desirably be used to efficiently carry voice-type information, thereby providing more efficient communications services to office utilizing communications system 50.

It also should be noted that, with communications system 50 implemented such as illustrated in FIG. 3, data, voice and video streams may be converged over a common T-1 trunk. Thus, a user may more readily be able to efficiently use a T-1 type of WAN resource with an integrated system that intelligently manages and bridges voice, data and video data streams and processes.

While the various windows, buttons and icons illustrated herein are not limitative of any particular aspect of the present invention, such features and combinations of features have been determined to provide advantages to users of such an office attendant-type program, particularly when used with embodiments of the present invention as illustrated in FIG. 3 and the other drawings and related description.

In accordance with the foregoing description and embodiments, a variety of communications systems and data, voice and video processes may be desirably implemented. An exemplary communications system and the features of such an exemplary communications system will now be described.

Communications system 50 delivers comprehensive communications support including PBX voice capability, full LAN/WAN data connectivity, and a suite of communications applications in a unified platform designed for scalability, reliability, and ease of use. Communications system 50 integrates standards based communications hardware and software with switching technology in a single system to meet the needs of different size offices. Unlike other complex central site products that are difficult and expensive to manage, communications system 50 of the present invention is optimized for use by an office of 5 to 100 users.

Communications system 50 increases the efficiency of office communications and provides businesses a competitive edge by integrating the following voice, data, and communications functions into one remotely manageable platform: PBX; Voice mail; Automated attendant; Computer-telephony applications server; Channel bank; Router; CSU/DSU; LAN hub; Remote access server; and Modems.

Communications system 50 architecture allows the user to combine one or more of the above referenced components into a single, easy-to-use, easy-to-manage system. Because the Communications system 50 seamlessly interfaces with legacy voice and data equipment, the user can purchase only those capabilities that is needed to create a comprehensive communications solution suited to user's business. As described earlier, an office attendant type program can be utilized assist communication system 50 to perform all of the above mentioned tasks.

Communications system 50 supports today's mission-critical communications applications, while providing a natural migration path for new applications enabled by the convergence of voice and data. At the core of the platform are system resources designed for voice and data integration, including time division multiplexing 78 (TDM) and switching, high-speed packet switching 74, a multiprotocol framing engine 72, LAN/WAN interfaces 82, and digital signal processors 76 (DSPs). These resources are complemented by software services as illustrated in FIGS. 7A to 11E such as advanced call control, messaging services, a database management system, and routing services.

Based on an embedded Windows NT operating system, communications system 50 applications use standard application programming interfaces (APIs) such as NDIS, TAPI, COM, and WinSock. With these APIs and communications system 50 TAPI Service Provider (TSP), applications developed by independent software vendors, including advanced CTI applications, can be easily deployed on the system Communications system 50 system also eliminates the complexity inherent in today's multivendor piece-part alternatives. Instead of requiring installation and ongoing management of multiple boxes from multiple vendors that were not designed to work together, this integrated system delivers sophisticated voice and data solutions that are easy to install, administer, and use.

Communications system 50 is a purpose-built, dedicated platform architected to ensure high availability. Some features include the "always-on" software architecture with subsystem isolation, SNMP-based management, fault monitoring, life-line communications, and remote diagnostics and fix capabilities. Also, fault-tolerance options include redundant power supplies and redundant hard disk drives.

With communications system 50, the user can dramatically reduce the cost of acquiring, operating, and managing business communications. Communications system 50 delivers the cost reductions of integrated WAN services and eliminates the need for the additional resources and personnel required by today's multivendor communications alternatives. The unified management console and tools provide a cost-effective method to remotely manage the entire customer premise.

Communication system 50 includes many features and benefits such as being a fully integrated, adaptable, reliable, and high performance system, while being a system that is easy to install, manage and use. By utilizing a fully integrated system, communication system 50 includes, among other features, integrated suite of applications, digital trunks 54, and a unified management console. Integrated suite of applications in communication system 50 provides an ideal platform for deploying future business-transforming Internet/voice applications while at the same time increasing productivity and customer satisfaction by cost-effectively deploying integrated voice and data applications.

Referring back to FIG. 2, digital trunks 54 lowers telecommunications costs by integrating voice and data traffic on the same access trunk. Digital trunks 54 also allows a user to cost-effectively deploy high-bandwidth trunks to the smallest of offices. Finally, communication system 50 significantly reduces cost of deployment and ongoing management associated with legacy technologies, and reduces training time by using a single graphical user interface.

A further benefit of communication system 50 of the present invention is its adaptability to communications needs of the user. Communications system 50 includes a modular architecture that allows an office to pay only for the communications interfaces and options the office presently requires and also provides the flexibility to add hardware interfaces or remotely load software applications as the office needs change.

Communication system 50 in the preferred embodiment is a standards based system. This ensures interoperability with existing communications infrastructure for seamless deployment and provides access to the latest third-party applications and technology. Communications system 50 is also adaptable to new technologies; thus, this protects an office's investment with an architecture designed to accommodate future technologies.

Another feature of communication system 50 of the present invention is its reliability. Some of communication system 50 features that allow it to be reliable are the following: complete integration and extensive testing for hardware and software; embedded Windows NT operating system; redundant, load-sharing power supplies; independent fault monitoring; life-line phone support, and RAID-1 disk mirroring. The benefits of these features are the following: virtually eliminates expensive downtime that results from incompatible hardware and applications; provides a single point of contact for fault isolation; ensures maximum application availability by isolating application subsystems; increases security by preventing unauthorized access; prevents interruption of service due to power supply failure; ensures maximum system availability by providing an independent watchdog service; keeps the user informed of system status through notification of system problems, no matter where the user is; ensures phone service, even during a power failure; and prevents downtime due to hard disk drive failure.

The multiple-bus architecture, application prioritization and isolation, and automatic route selection adds to the performance of communication system 50. These features ensure high-grade voice quality by keeping voice and data in their native environments, allow conversion between the voice and data environments to support services such as voice over IP (VoIP), maximize investment by making community resources, such as DSPs and WAN/LAN interfaces, available to both voice and data applications, keep mission-critical communications systems functioning under heavy load by ensuring they receive required system resources, provide flexibility in routing calls, and least-cost routing saves money by dynamically selecting trunks based on criteria selected.

Communication system 50 is easy to install, manage, and use. Some of the features making communication system 50 easy to install, manage, and use are it is web-based management for remote configuration, diagnostics, and health monitoring, remote software upgrades, rapid installation, customizable management levels, and full SNMP instrumentation for voice and data. These features simplify management tasks by using a single, consistent management interface for your voice and data infrastructure, reduces personnel costs by leveraging centralized technical resources to manage remote offices, minimizes downtime and on-site visits through extensive tools for remote troubleshooting and diagnostics, ensures system integrity by flexibly addressing different access requirements for system administrators, enables a user to reduce support costs by distributing simple, repetitive tasks such as moves, adds, and changes to office personnel, leverages your existing SNMP infrastructure to manage both voice and data capabilities on the communication system 50, allows the user to save money by performing software upgrades from a central location, and saves valuable time and money because the system can be installed and configured quickly.

Next, the specifications for the communications system 50 in the preferred embodiment will now be described. As it will be apparent to one skilled in the art, it is important to note that a different configuration and/or additional or reduced number of components can be used with communication system 50 without altering the scope and spirit of the present invention. In a preferred embodiment of communication system 50 of the present invention, a resource switch card (standard with every chassis) includes the following: 12 10Base-T Ethernet hub ports; 12 analog phone ports; 6 analog trunk ports (including 2 life-line ports); communications switch engine and other system resources; 2 internal 56 Kbps fax/modems (V.90 and K56);fault monitor; connectors: RJ-45 (Ethernet), 50-pin RJ-21x (phone), 3.5 mm phono (line-in, line-out), 15-pin VGA; and Indicators: System status; link and activity for each Ethernet port.

The Optional expansion interfaces of communication system 50 includes the following components: (1) Analog trunk modules, with 4 and 8-port versions available; Loop start and ground start; REN: 0.65 B; Impedance: 600 ohms; Compliance: FCC Part 15 Class A, FCC Part 68, UL 1950, DOC, CSA; Connector: 50-pin RJ-21x; and Indicators: System status; (2) T1 trunk modules—1- and 2-port versions available; Line rate: FT1 and T1 (64 Kbps-1.544 Mbps); Framing: ESF, SF/D4; Line code: AMI, B8ZS; Integrated CSU/DSU; Compliance: FCC Part 15 Class A, FCC Part 68, UL, CSA, ANSI T1.101 (MTIE), ANSI T1.403-1995, AT&T TR62411; Connector: RJ-48C, dual bantam (monitor jack); and Indicators: System status; red and yellow alarms for each T1 port. (3) 10Base-T Ethernet hub cards—12- and 24-port versions available; Layer 3 segmentation option: Traffic is routed between cards; Full SNMP instrumentation; Compliance: FCC Part 15 Class A, FCC Part 68, UL, CSA, IEEE 802.3, ISO/IEC 8802-3; Connector: RJ-45; and Indicators: System status; link and activity for each Ethernet port. (4) Analog station cards—12- and 24-port versions available; Supports standard and enhanced analog phones with features such as enhanced caller ID display and message-waiting lamp; Operating voltage: Onhook—48V, Offhook—24V; REN: 3 B; On-board ringing power supply; Audio frequency response: 300 to 3500 Hz; Compliance: FCC Part 15 Class A, FCC Part 68, UL, CSA; Connector: 50-pin RJ-21x; and Indicators: System status; (5) Fault-resilient options—Redundant hard drive for disk mirroring (RAID-1); and Redundant power supply.

The following table describes an interface summary according to the present invention.

|  | Part Number | Phone Ports | Ethernet Ports | Analog CO POTS | T1 |
|---|---|---|---|---|---|
| Resource Switch Card | Standard | 12 | 12 | 6 |  |
| Analog Station Card | IO-12AS-C | 12 |  |  |  |
|  | IO-24AS-C | 24 |  |  |  |
| Ethernet Hub Card | IO-12EH-C |  | 12 |  |  |
|  | IO-24EH-C |  | 24 |  |  |
| Analog Trunk Module | IO-4AT-M |  |  | 4 |  |
|  | IO-8AT-M |  |  | 8 |  |
| T1 Trunk Module | IO-1T1-M |  |  |  | 1 |
|  | IO-2T1-M |  |  |  | 2 |
| Chassis (maximum) |  | 84 | 84 | 22 | 2 |

Next, the chassis specifications will be described for the preferred embodiment of the present invention. The following are the physical specifications of communication system 50 of the present invention: (1) Height: 23.125 in (58.74 cm); (2) Width: 17.5 in (44.45 cm); (3) Depth: 18 in (45.72 cm); and (4) Weight: 88 lbs (40 kg), maximum configuration. Next, the mounting options will now be described: (1) Rack-mount (standard EIA 19-inch rack) and (2) Stand-alone. The power requirements are as follows: 95–132 VAC, 47–63 Hz, 5.0 A; 190–264 VAC, 47–63 Hz, 2.5 A; Inrush current (one power supply): 40 A maximum (115 VAC), 80 A maximum (230 VAC); and Optional second hot-swappable and load-sharing power supply. The environmental ranges are as follows: Operating temperature: 32° to 104° F. (0° to 40° C.);Operating humidity: 85% maximum relative humidity, noncondensing; and Operating altitude: Up to 10,000 ft (3,050 m) maximum.

Communications system 50 PBX and office attendant type program CTI Application provide sophisticated call control and handling.

The PBX capabilities will now be described. Communications system 50 PBX provides a full-featured, nonblocking digital PBX with sophisticated call control capabilities. These capabilities are delivered using standard analog telephones connected to your existing phone wiring. In addition, communications system 50 supports advanced call control capabilities over IP-based networks, for applications based on the Microsoft Telephony Application Programming Interface (TAPI) standard. TAPI allows the communication system 50 to optionally provide virtual digital telephones, delivering advanced call control features over inexpensive standard analog phones.

Figure 24:
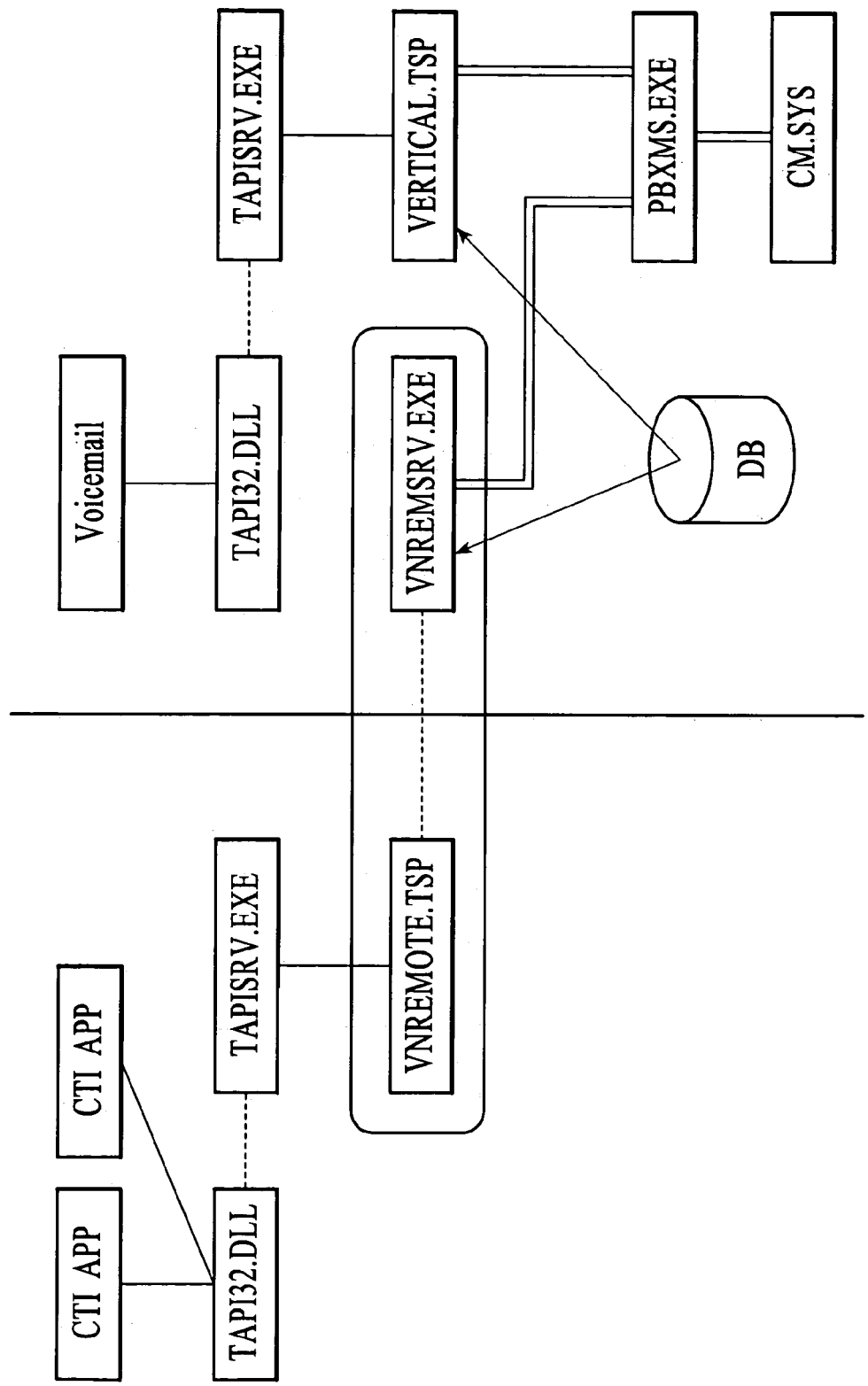
FIG. 24 illustrates additional TAPI functionality in accordance with preferred embodiments of the present invention.

Referring to FIG. 24, additional TAPI related functionality in accordance with additional preferred embodiments will now be described.

One of the main purposes for providing TAPI support is to allow CTI applications to control telephony ports over the network. Although Microsoft provides this functionality via TAPI 2.1 and remote.tsp, this solution has the following limitations: the TAPI Service (TAPISRV) is required to have a user ID and password on the domain, which could be viewed as intrusive on a network and raises unnecessary security concerns. Also, with the Microsoft approach, the configuration application that maps telephony ports to workstations does not have an exposed API. This means that it is not easily possible to configure TAPI clients using a remote administration system.

An improved approach is to use Windows Sockets to communicate between the client and server, and to use a database to do the association of TAPI lines to client machines. By using Windows Sockets we eliminate the requirement for the TAPI service to have a domain account, and by using our database for the TAPI configuration we eliminate the requirement to do configuration through Microsoft's TCMAPP tool, which is only accessible on the server itself. Thus configuration can be done from anywhere in the client/server network.

This TAPI solution consists of two new components. VNREMOTE.TSP is the new TSP that resides in the client and will accept TAPI requests and route them to the server if necessary, and to process messages coming from the server. VNREMSRV.EXE is a service on the server that is the "hands, eyes and ears" for VNREMOTE.TSP inside the server. It will process the requests passed on by VNREMOTE.TSP and send events back to VNREMOTE.TSP. The configuring of Windows Sockets is well-known in the art, and accordingly any suitable variation that accomplishes such functions consistent with the present teachings can be utilized. Office attendant type program computer-telephony application will now be described. Communications system 50 Office attendant type program is an easy-to-use application that places powerful telecommunications capabilities directly on the desktop. It provides comprehensive call handling functionality for operators and administrators, making them more efficient through an intuitive graphical user interface (GUI).

Communications system 50 application expedites routine tasks such as answering and transferring calls. It also simplifies more complex tasks such as setting up and managing conference calls. Office attendant type program leverages advanced Microsoft TAPI over TCP/IP technology that allows communications system 50 to replace the traditionally expensive, immobile, and hard-to-use attendant console.

Communications system 50 PBX and Office attendant type program specifications are now shown below. PBX features for call features include the following:Call forwarding, Off-premise call forwarding, Transfer on busy and no answer, Time-of-day call forwarding, Call hold, Call toggle, Call waiting, Consultation call, Consultation transfer, Blind transfer, Conference call, Call pickup, Public address system support, and Do not disturb. The features for calling and called party identification are as follows: support for enhanced caller ID phones, and Extension-to-extension identification.

The System features and management flexibility are the following: Class of Service profiles, Uniform dialing plan, Time-of-day dialing policy, Digit insertion, Automated route selection (ARS), least-cost routing, Trunk groups, Hunt groups for intelligent call distribution, including linear, circular, and ring all, Direct inward dial (DID), Message notification: lamp and stutter dial tone, Individual user profiles, Call detail recording, Phone set relocation, Music on hold.

The following are the office attendant type program features: (1) System—Standard Windows application; Call control over IP; Software-based console that is easy to relocate; Drag-and-drop dialing and conferencing; Virtual line appearances; Interface indicators signal call status; Caller ID display; Calls in queue display; Company telephone directory; Lookup-as-you-type dialing; Personal call log; Account number entry; Personal information manager; Conference manager; System speed-dial buttons; Programmable feature buttons; Most recently used numbers list; Login security; CTI link test button; Context-sensitive help; and Contact database importing; (2) Call handling—Dial pad; Hang up; Transfer with look-ahead; Hold; Answer next; Call forwarding; Do not disturb; (3) Installation requirements—66-MHz 486 PC with 16 MB of RAM (Pentium recommended); and Windows 95 or Windows NT 4.0.

PBX and the office attendant type program application are an integral part of the communications system 50. Other Communications system 50 software components include the following: Data Communications Services; Voice Mail and AutoAttendant applications; Remote Management System.

With Communications system 50, higher productivity with voice mail and automated attendant services can be achieved. Communications system 50 Voice Mail and AutoAttendant services help an office increase productivity by allowing people to share information without time or distance constraints. Customers can leave messages at any time of day or night, with the assurance that the messages will be delivered. Whether an office personnel is in the office or on the road, any office personnel can access messages instantly from any phone in the world.

In addition, Communications system 50 Voice Mail services allow a user to access the user's voice mail messages via the user's favorite e-mail application. The Communications system 50 Voice Mail application is built with full support for open industry standards—including IMAP4 e-mail application compatibility for remote voice mail retrieval, and WAV sound file format for ubiquitous message playback using the most popular operating systems.

The Communications system 50 AutoAttendant application economically processes inbound calls 24 hours a day-answering each call, providing customized instructions based on the time of day or day of week, and routing callers to the person best able to help them. Callers can use the intelligent call distribution feature to reach a particular person or department, without requiring an operator or direct inward dial (DID) services. For companies that use DID, AutoAttendant is ideally suited for assisting a live operator by handling common requests for information such as directions and mailing addresses.

The following are the Communications system 50 Voice Mail and AutoAttendant Specifications. Voice Mail features include the following: Up to six concurrent voice mail sessions; Approximately 67 hours of storage; No additional hardware required; Interruptible prompts; and Password protection. The voice message handling feature includes: New message retrieval; Save messages; Listen to deleted messages before you hang up; Hear message time stamp and duration; Forward message; Reply to message; Skip message; Go to end of message; Backup and forward 5 seconds; Pause/resume listening; and Pause/resume recording.

The versatile message notification features include: Stutter dial tone; Lamp indication; and IMAP4 e-mail retrieval. Next, the AutoAttendant features include: Customizable greetings; Time, day-of-week, and holiday scheduling; Automated call routing (individual extensions and hunt groups for departmental routing); Audio-text mailboxes; Dial by name; Multilevel menus; and Single-digit menus.

The Voice Mail and AutoAttendant applications are an integral part of communications system 50. Other communications system 50 software components include: PBX services; office attendant type program computer-telephony application; Data Communications Services; and Remote Management System Communications system 50 delivers comprehensive communications support—multiprotocol router, full LAN/WAN connectivity, PBX voice capability, and a suite of communications applications—in a unified platform designed for scalability, reliability, and ease of use.

Communications system 50 Data Communications Services provide built-in services for local area networks, connecting branch offices to headquarters, and providing remote access and Internet connectivity to its employees. In addition, the Data Communications Services allow offices to create virtual private networks (VPNs) to save money on remote access and interoffice connectivity. Further, an office can save significant money by integrating both voice and data traffic over the same T1 access circuit. The built-in multiplexer passes data traffic to the Data Communications Services for processing; the remaining voice traffic is passed directly to the PBX.

Communications system 50 multiprotocol router is based on Microsoft's NT Routing and Remote Access Server (RRAS). An office using communications system 50 may extend the base RRAS elements with value-added services such as frame relay and versatile WAN interfaces, including analog dial-up and integrated digital T1 and/or DDS circuits. Multiprotocol routing (MPR) capabilities provide full-featured, standards-based LAN and WAN routing optimized for small and branch offices. Standards-based features include: IP routing (RIP, RIPv2, OSPFv2); IPX routing (RIP, SAP, IPXWAN); Packet filtering; Frame relay (RFC 1490, Cisco); Point-to-point protocol (PPP), Multilink PPP; Dial-on-demand routing; Classless Inter-Domain Routing (CIDR); PPP authentication protocols (CHAP, PAP); DHCP relay agent; Compression of TCP/IP headers for low-speed serial links; Path MTU discovery; PPP Internet Protocol Control Protocol (IPCP); Compression Control Protocol; and ICMP router discovery messages.

Communications system 50 Data Communications Services include remote access services, allowing your business to extend its networks through phone lines—and keep up with an increasingly mobile work environment. Network managers can use the remote access server capabilities for out-of-band management access, which is especially useful for initial installation and troubleshooting from remote locations. Furthermore, mobile and work-at-home users can seamlessly and securely access the user's corporate network. They can work, print, and run applications remotely using such features as the following: Comprehensive dial-up networking support for all mainstream remote clients; Authentication; RADIUS client support; Token card support; PPP and Multilink PPP; Microsoft Point-to-Point Compression; Restartable file copy; and Idle disconnect.

Virtual private networks lets a user use IP packet networks, such as the Internet, to provide secure connections between remote users and their corporate networks, without the expense of a dedicated private network. Communications system 50 offers a flexible and comprehensive solution, based on the Point-to-Point Tunneling Protocol (PPTP), for creating VPNs.

With PPTP, a user can dial into a local Internet service provider and access the network as easily and securely as if they were at their desks. PPTP technology offers significant advantages such as the following: Full interoperability with Windows 95, Windows 98, Windows NT Workstation, and many other VPN products; PPTP Client-to-Network; PPTP Network-to-Network for interoffice connectivity; Data encryption (RSA RC4); and Compatibility with IP, IPX, and NetBEUI.

Data Communications Services include powerful management software that enables administrators to centralize ongoing network maintenance, diagnostics, and troubleshooting; and easily accomplish remote changes such as setting up a brand new office or making changes to an existing one. Features include the following: Full SNMP instrumentation; MIBs implemented for data and voice services; Performance and capacity monitoring; Display of interface status in real time; Ping; Trace route; NetStat; and WAN protocol trace capability.

Data Communications Services are an integral part of communications system 50. Other communications system 50 software components include: PBX services; Communications system 50 computer-telephony application Voice Mail and AutoAttendant applications; and Remote Management System.

Ongoing management costs make up the majority of operating expenses of a communications infrastructure. This is especially true for remote offices, where technical expertise is rare and trained personnel frequently make on-site visits to perform routine tasks such as moves, adds, and changes. Adding to the problem is the fact that most communications infrastructures consist of multiple boxes from multiple vendors, requiring a variety of specialized personnel to operate and maintain the many components.

Communications system 50 Remote Management System addresses these cost-of-ownership issues by providing integrated remote management capabilities for both voice and data services. Designed for remote management and fault monitoring, the Remote Management System provides a cost-effective method for managing the entire customer premise remotely. Companies with multiple offices or plans to expand can realize significant cost savings by leveraging their expensive technical resources, no matter where they are located. Furthermore, the centralized management capabilities of communications system 50 present a unique managed network service opportunity for both voice and data service providers.

The Remote Management System consists of the following components:

(1) Remote Management Console: This component provides a unified Web interface for managing all aspects of communications system 50. Based on HTML, Java, and push technologies, the Remote Management Console provides a consistent interface that is easy to learn and use.

(2) SNMP: Both the voice and data aspects of communications system 50 have been SNMP instrumented, including key application services such as voice mail and PBX.

(3) Call detail recording: A complete record of all voice and data calls placed or received by communications system 50, this information can be used to analyze call patterns and trunk utilization, and to generate call reports.

(4) Independent fault monitor: A feature typically found only on large central-site systems, the independent fault monitor supervises system operation, and detects and reports faults to the system administrator.

(5) Trace manager: A complete log of all system activity, the trace manager provides useful information such as real-time call progress, WAN protocol traces, frame relay management information, and voice mail activity to facilitate troubleshooting.

Below is the specifications for communications system 50 Remote Management System: Rapid installation: less than 30 minutes; Remote software upgrades; Minimal technical expertise required; Robust, low-maintenance platform; Architected for high availability; Self-diagnostics to ease management burden; Remote management via digital trunks and over embedded 56 Kbps modems; and Centralized password facility. Remote Management Console of the present invention includes the following features and benefits: Web-based console that manages all voice and data services; Management of any InstantOffice system in your network over any TCP/IP connection; Multiple administrative levels (customizable); Password protection; Support for remote moves, adds, and changes; Monitoring and diagnostic utilities; Chassis view that provides an at-a-glance view of InstantOffice system status, including LED states; Graphical user interface that is easy to learn and use; Extensive online help; and Runs on Windows 95 and Windows NT, using Internet Explorer 4.0 or Netscape 4.0.

The SNMP features include the following: Full SNMP instrumentation for voice and data; Support of standard enterprise network management stations such as HP OpenView and Sun NetManager; SNMP standards: SNMP (RFC 1157), Structure and Identification of Management Information (RFC 1155), Concise MIB Definitions (RFC 1212), MIB-II MIB (RFC 1213), Traps (RFC 1215); Standard MIBs: Frame Relay DTE (RFC 1315), T1/E1 Interfaces (RFC 1406), Repeater (RFC 2108), Microsoft HTTP, Microsoft LAN Manager, Microsoft RIPv2, Microsoft OSPFv2; Private MIBs: T1 extensions, station module, voice mail Call detail recording (CDR); Complete record of all voice and data calls placed or received; Standard file format for import into CDR applications; and Remote analysis of CDR information without a dedicated workstation.

The Independent fault monitor includes the following features and benefits: Embedded processor that provides an independent watchdog service for the overall system; System event log; Dedicated modem for remote access; Pager notification of system faults; System status: fan, power supply, operating system; and System reset.

The Trace manager includes the following features, and benefits: Display of all system activity; Graphically based; Enabled on a per-service basis; Multiple trace levels; and, Events color-coded for readability.

The Communications system 50 Remote Management System is an integral part of the communications system 50. Other communications system 50 software components include the following: PBX services; Communications system 50 computer-telephony application; Data Communications Services; and Voice Mail and AutoAttendant applications.

Together, these software components combine to provide you a powerful, easy-to-use communications solution optimized for your remote or small office.

Figure 14:
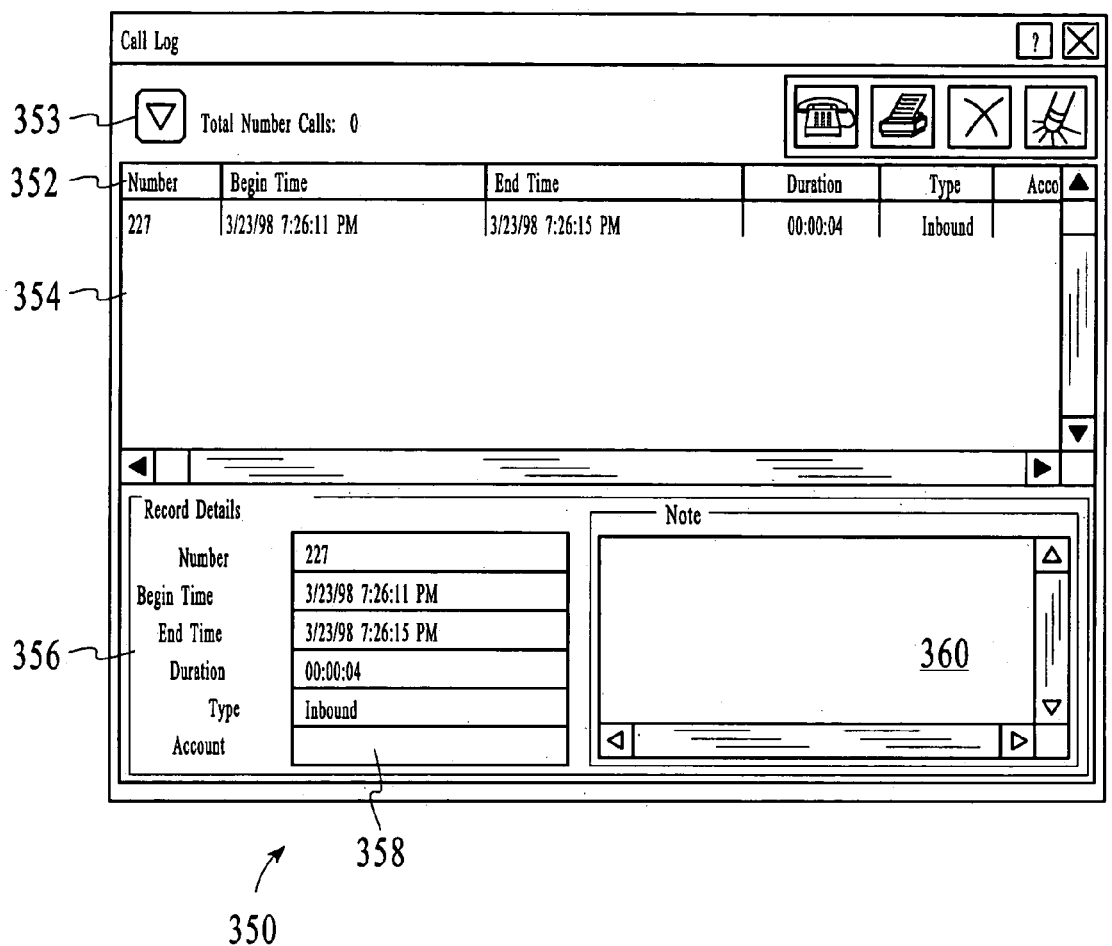
FIG. 14 illustrates additional preferred embodiments of the present invention utilizing advanced call logging features.

Referring now to FIG. 14, additional preferred embodiments utilizing advanced call logging features will now be described. As illustrated in FIG. 14, call logging window 350 may be opened by a user of an office attendant-type program running on a computer in accordance with the present invention (see, e.g., FIG. 8A, call log icon 142). In alternative embodiments, call logging window 350 may be automatically opened upon receipt of an incoming call, or upon initiation of an outgoing call. Window 350 preferably includes display windows 352 and 354, which preferably displays information for calls in the log, such as a call log identification number, begin call time, end call time, duration of call, type of call (either inbound or outbound), account information, etc. In other embodiments, other information desired to be included in a call log record is included in such a window. Window 354 is illustrated with only one call displayed, although it should be understood that a plurality of calls may be displayed in window 354, and in fact the call log can include numerous calls that cannot be displayed simultaneously in window 354. A scroll button or buttons (such as scroll icon 353) preferably are provided to scroll up and/or down the logged calls.

Preferably, window 356 is provided to display details of a particular call, which may be selected from a plurality of logged calls in window 354 by a click of a mouse or pointer. Window 356 preferably includes details of the particular logged call, and also preferably includes account field or window 358 and note window 360. It should be noted that account field window 358 in preferred embodiments may be desirably utilized for purposes of tracking calls by account, and for desirably collecting such logged call information from a plurality of computers and generating reports based on such information. Window 360 may be utilized to display notes entered by the user prior to, during or after the call, and/or may display previously entered information. In certain embodiments, window 360 may display information received from communications systems 50 over a packet bus, or from another computer on the packet bus, such as account status information, payment information, ordering information, etc. In such embodiments, such as based on the account information, particular information corresponding to this account may be desirably retrieved and made available to the user calling the particular account, etc.

In certain embodiments, upon receipt of an incoming call or upon initiation of an outgoing call, a window such as window 350 automatically appears (this may be by way of the office attendant-type program for a user who is managing incoming and outgoing calls of the office, or by way of a companion program for a user not managing incoming and outgoing calls of the office). In preferred embodiments, the user is prompted by a brief message is displayed on the screen and/or an audio message played on the user's computer to enter the account number in window/field 358. In still other embodiments, the user must insert an account number in window/field 358 in order to complete the incoming or outgoing call. In such embodiments, processor/system resources 70 and/or the user's computer promptly reads any account number information provided by the user and any accepts or validates the account number (e.g., compares the entered account number to a stored list of valid account numbers, and determines if there is a match). In the event that an invalid account number is detected, a suitable message window and/or audio alert indicating that the account number entered is invalid, unrecognized, etc., preferably is provided to the user. In the event that a valid account number is detected, then the call is completed.

In alternate embodiments, the user is prompted by a brief message displayed on the screen (such as in a suitable window) or audibly, and the call completed but only for a predetermined time. This would enable the call to be completed without account authorization and/or validation, but would require that the account information be promptly input in a predetermined time interval.

In still alternate embodiments, communications system 50 (and/or another computer coupled to communications system 50 via a packet bus, etc.), periodically polls the computers utilizing a program with a call logging such as previously described retrieves the call log information. With automated call log polling, a central resource such as communications system 50 (and/or another computer) may periodically, and preferably automatically, collect call logging information over the packet bus (again, see, e.g., FIG. 3), which may be then made available to a suitable application running on communications system 50 and/or another computer, and compiled, processed, analyzed, printed, etc. In accordance with such embodiments, incoming and outgoing calls may be desirably logged and associated with account information, with such logged information desirably collected from a plurality of computers and made available to a central resource for further processing and/or use.

It should be noted that in preferred embodiments, communications system 50 continuously monitors or knows which particular computers are "logged on" and running an office attendant-type program or a companion or other program. In this manner, communications system 50 may continually be aware of which computers/users are logged on, and may thus send emails, commands, net messages or take other actions based on such information.

Referring now to FIGS. 15 through 17H, various aspects of remote administration/configuration and remote diagnostics of a system such as communications system 50 in accordance with certain preferred embodiments of the present invention will now be described.

Figure 15:
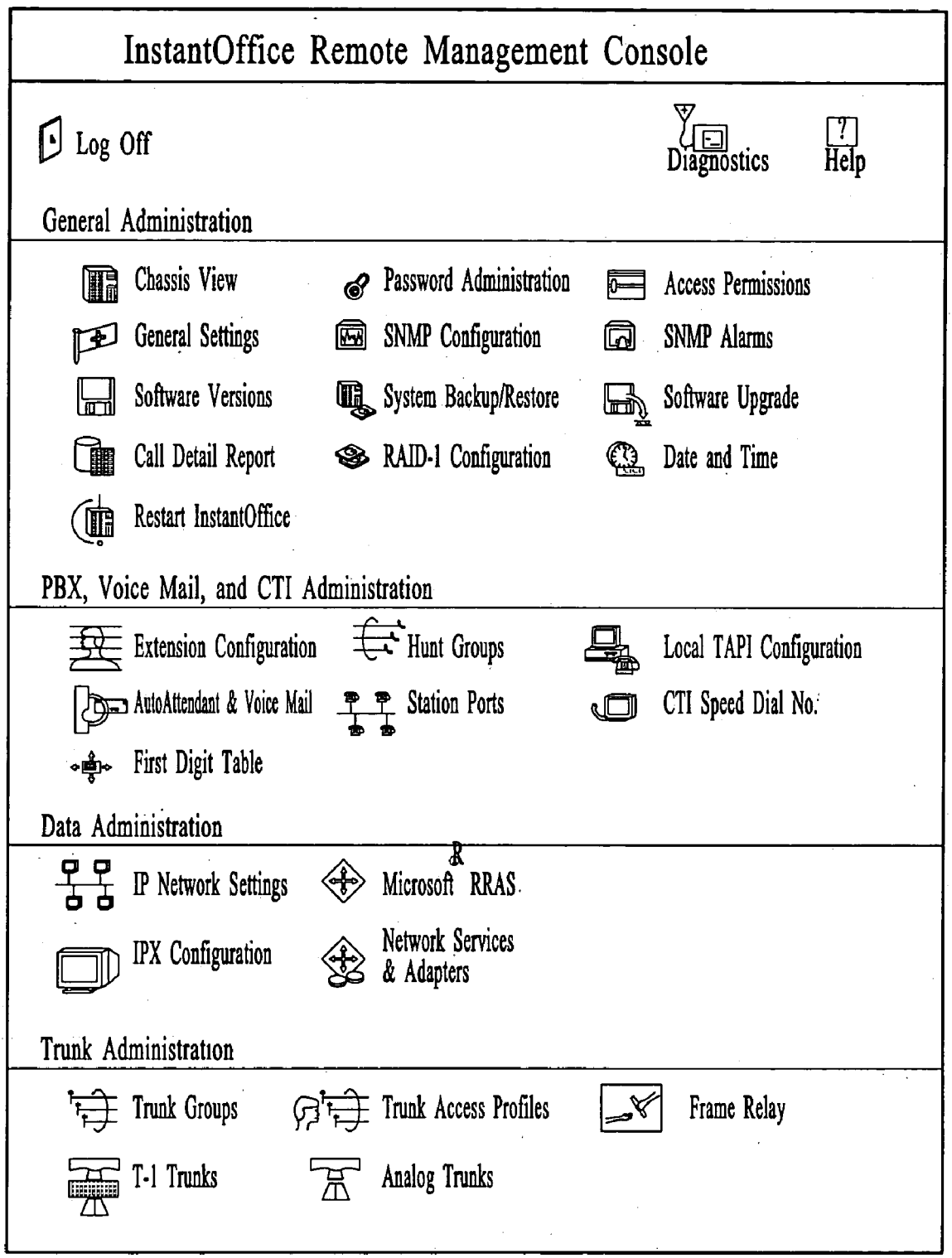
FIG. 15 illustrates a window from a remote administration/configuration application/applet in accordance with preferred embodiments of the present invention.

FIG. 15 illustrates a window from a remote administration/configuration application/applet (preferably what is known as a Java applet, etc.) that preferably utilizes a desirable browser-type application interface. With a browser type interface, a person desiring to remotely configure or administer communications system 50 desirably uses a browser and preferably establishes an IP or similar connection with communications system 50. In preferred embodiments, the IP-type connection may be established via WAN connection (via WAN network services 58; see, e.g., FIG. 3), via a LAN connection, via a serial port connection (via, for example, a serial port to processor/system resources 70), via a modem connection (via modem 75 of FIG. 3), etc.

What is important to note is that administration/configuration of communications system 50 may be remotely performed via an IP or similar connection, preferably with a browser-type application, and preferably using the Hyper-Text Transfer Protocol ("HTTP") or similar protocol. In such preferred embodiments, HTTP commands may be used to remotely administer, configure and diagnose communications system 50 in a desirable and flexible manner. It should also be noted that the use of HTTP commands in such a manner to administer, configure, etc., WAN resources (e.g., T-1 cards or resources), PBX and telephony resources (e.g., station cards, voice mail), and LAN resources (e.g., ethernet or other network cards/resources) enables remote control and monitoring of communications system 50 in a flexible and desirable manner. In particular, if a security arrangement known as a "firewall" is implemented in conjunction with communications system 50, the use of such HTTP commands to configure a WAN service (for example) may be more readily accomplished in that most firewall systems utilize ports that allow HTTP communications/traffic, which thereby reduces conflicts with the firewall security system. In effect, remote processing may be accomplished by HTTP "tunneling" into communications system 50 with an IP-type connection, etc.

It also should be noted that password/user identification security arrangements are preferably utilized in such embodiments in order to maintain security over the configuration and operation of communications system 50. Encryption techniques also may be utilized in order to improve such security if desired for the particular application.

It also should be noted that such embodiments preferably operate on the basis of "transactions." Preferably, the remote computer or client coupled to communications system 50 using a session implemented with HTTP "tunneling" establish a transaction-based interaction. In accordance with such embodiments, the client initiates a transaction using, for example, Java programming remotely, such as over the Internet, preferably using what is known as a private virtual network or private virtual channel connection. The particular transaction or operation (such as described elsewhere herein) are initiated by client and proceed until completion, at which time the results of the transaction are made known to the client, or else the client has the option prior to completion of the transaction of "rolling back" or canceling the transaction in the event that the client user determines that something is wrong or incorrect with the transaction, etc. Preferably, the software on the communications system "server" prompts the client with an option to accept, modify or roll-back the transaction. In preferred embodiments, the client-server session may process one or a series of such transactions. With such a transaction-based system, remote commands and operations may be performed in a more secure manner between the preferably Java client and server, all of which is preferably achieved using HTTP tunneling as previously described.

Referring again to FIG. 15, various icons are illustrated for remote access by a user desiring to remotely administer/configure communications system 50. By clicking appropriate icons, various system administration/configuration functions may be implemented. As illustrated, general administration functions may include or relate to: log off, diagnostics, help, chassis view (described in greater detail later), general settings, software versions (enabling a viewing of a registry of software modules and releases, etc., installed on the particular communication system 50), call detail report, restart/reboot, password administration, SNMP configuration, system backup/restore, disk array configuration, access permissions, SNMP alarms, software upgrade, date and time, etc. As illustrated, PBX and voice mail administration functions may include or relate to: extension configuration, auto attendant and voice mail, first digit table, hunt groups, station ports, local TAPI configuration, CTI speed dial numbers, etc. As illustrated, data administration functions may include or relate to: IP network settings, IPX configuration, RRAS routing (routing and remote access service), network services and adapters, etc. As illustrated, trunk administration functions may include or relate to: trunk groups, T-1 trunks, trunk access profiles, analog trunks, frame relay, etc.

What is important to note is that, in such preferred embodiments, various icons are presented so that a remote person may conveniently select via an appropriate and intuitive icon an applet to achieve the desired function or operation, and which may conveniently be used to configure and administer the communications system and configure PBX, voice mail, LAN and IP network connections, trunk groups, T-1 trunks, frame relay, etc. In accordance with such embodiments, a single user interface, remotely viewable, may be used to access and administer, etc., voice, data, LAN, WAN services and applications, etc.

FIGS. 16A through 16F will be used to further describe various aspects of such remote administration/configuration in accordance with preferred embodiments of the present invention.

Figure 16A:
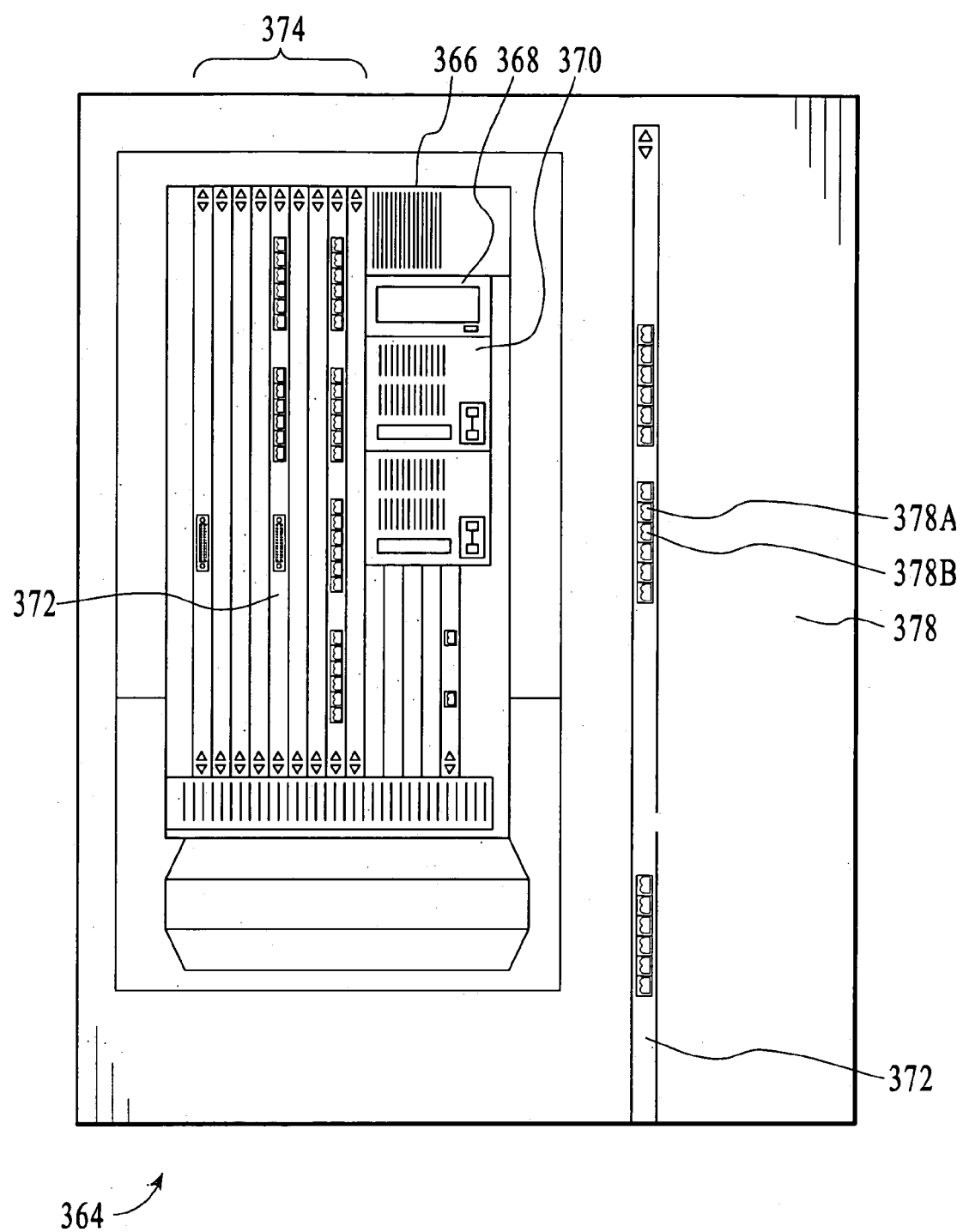
FIG. 16A illustrates a preferred exemplary embodiment of a chassis view window in accordance with preferred embodiments of the present invention.

FIG. 16A illustrates a preferred exemplary embodiment of "chassis view" window 364, which, for example, may be displayed in response to selecting of the chassis view icon of FIG. 15. Window 364 preferably includes a visual representation of chassis 366 of communications system 50, and preferably includes a visual representation of various station cards, resources cards, power supplies, drives, etc. Such a visual representation may include station/resource cards 374, included particular card 372 indicated with a pointer arrow, power supply(ies) 370, drive 368, etc. What is important is that an intuitive visual representation of the overall system be desirably displayed in a manner to facilitate an understanding of the configuration of the particular communications system 50 that is being remotely monitored, administered, configured, etc.

In preferred embodiments, pointing to a particular card or resource results in an enlarged visual representation of that card or resource, as illustrated by the pointer being directed to card 372, resulting in an enlarged representation of card 372 appearing adjacent to the chassis view. In the illustrated example, card 372 includes network connection ports in circle 378, and as examples shows empty port 378A and occupied port 378B. Thus, in accordance with such embodiments, an enlarged view of a card or resource may be visually displayed and remotely viewed, and a visual representation of whether particular ports or resources are utilized (such as, for example, by having an ethernet or other network cable attached) also may conveniently be provided.

In accordance with preferred embodiments, various functions and/or operations are provided for remote administration/configuration, such as previously described. Windows to provide such functions and operations preferably are displayed in a manner to intuitively lead the remote person through the desired operation, etc. Such windows may be accessed by selecting an appropriate icon such as are illustrated in FIG. 15 (the icons of FIG. 15 are © 1998, Vertical Networks, Inc. (assignee of the present application)), or they may be accessed by way of clicking on a particular station or resource card in the chassis view of FIG. 16A. Various remote administration/configuration windows will now be further described.

Figure 16B:
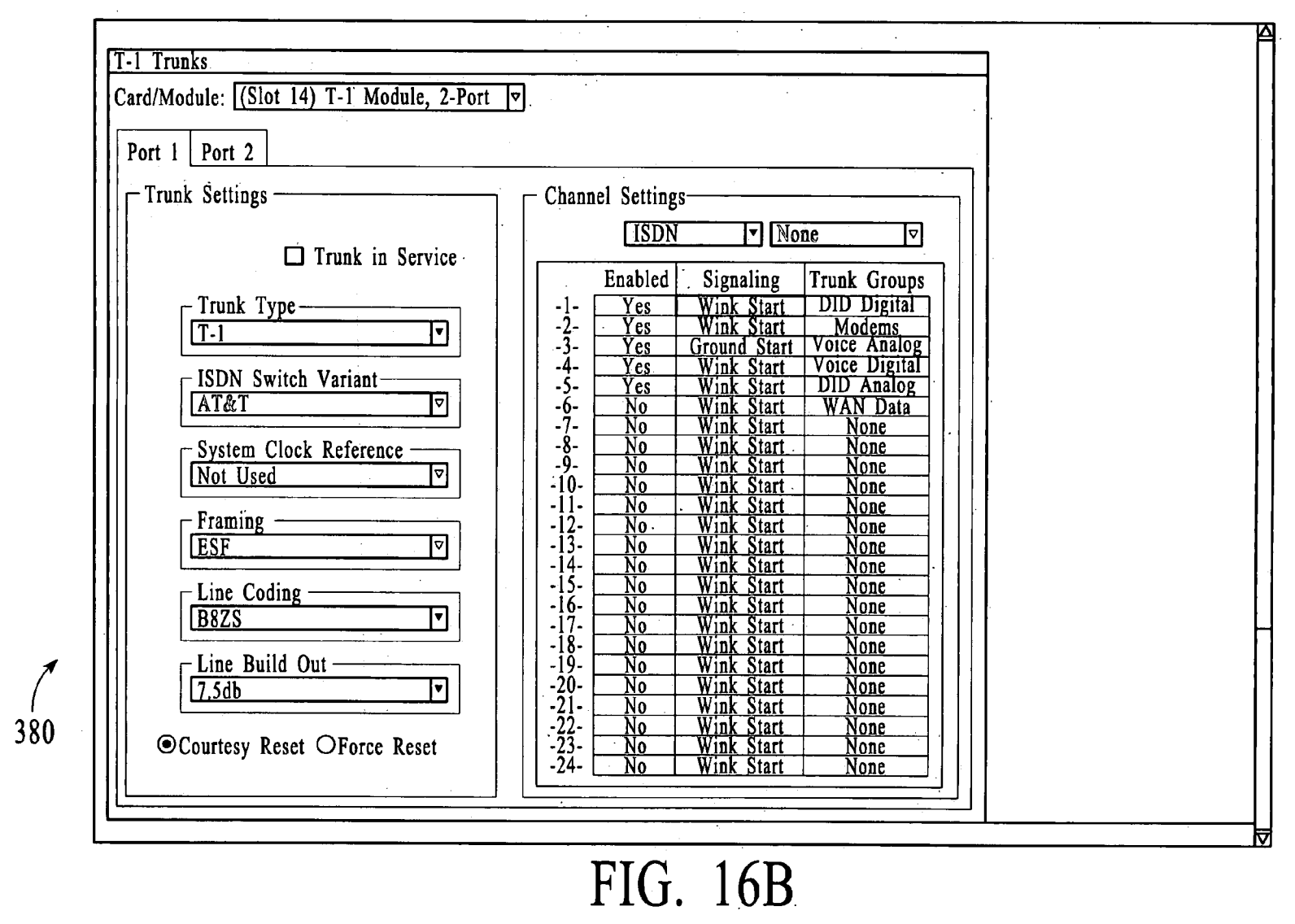

Referring to FIG. 16B, window 380 is provided for configuration of T-1 channels of a particular communications system 50. As previously described, window 380 may be presented in response to clicking on the T-1 trunks icon of FIG. 15, or alternatively window 380 may be presented in response to clicking on a T-1 resource/station card of the chassis view of FIG. 16A. As illustrated, with a point and click operation on window 380, the remote person may enable/disable T-1 channels, set or reset signaling (e.g., wink start, ground start, etc.), configure trunk groups (e.g., WAN data (which may be used to direct clear channel data trunk traffic to an RRAS interface, thereby enabling the LAN to transmit/receive data to/from the WAN), voice analog (e.g., to direct incoming analog voice trunk traffic to a default destination), voice digital (e.g., to direct incoming digital voice traffic to a default destination), DID analog (e.g., to direct incoming direct inward dial analog voice trunk traffic to a default destination), DID digital (e.g., to direct incoming DID digital trunk traffic to a default destination), and modem (e.g., to direct either T-1 trunks or analog trunks to one or more modems included as part of communications system 50).

In accordance with such embodiments, T-1 trunks may be configured in an intuitive point and click manner, thereby facilitating remote administration and configuration of such resources. As a particular example, multiple T-1 channels may be selected in FIG. 16B as a block with the mouse or pointer, and such block-selected T-1 channels may then be simultaneously configured (e.g., configure to be enabled/disabled, configure signaling, configure trunk groups, etc.). With such a click and block select operation, multiple T-1 channels may be configured in a group.

As illustrated in FIG. 16C, window 382 may be presented in order to configure station ports of a station card (again, either by icon selection or selecting a station card in chassis view, etc.). Also as illustrated, the state of particular stations (e.g., enabled or disabled), phone type (e.g., caller ID, basic, etc.), mail waiting indicator (MWI) (e.g., stutter the dial tone, light a lamp on the phone, etc.), operation mode (e.g., operate as a station, direct to voice mail, etc.). As described earlier with respect to FIG. 16B, with intuitive point and click type operations, various station cards may be selected (including multiple stations that may be selected as a block, etc.) and configured remotely and in an intuitive manner.

Figure 16D:
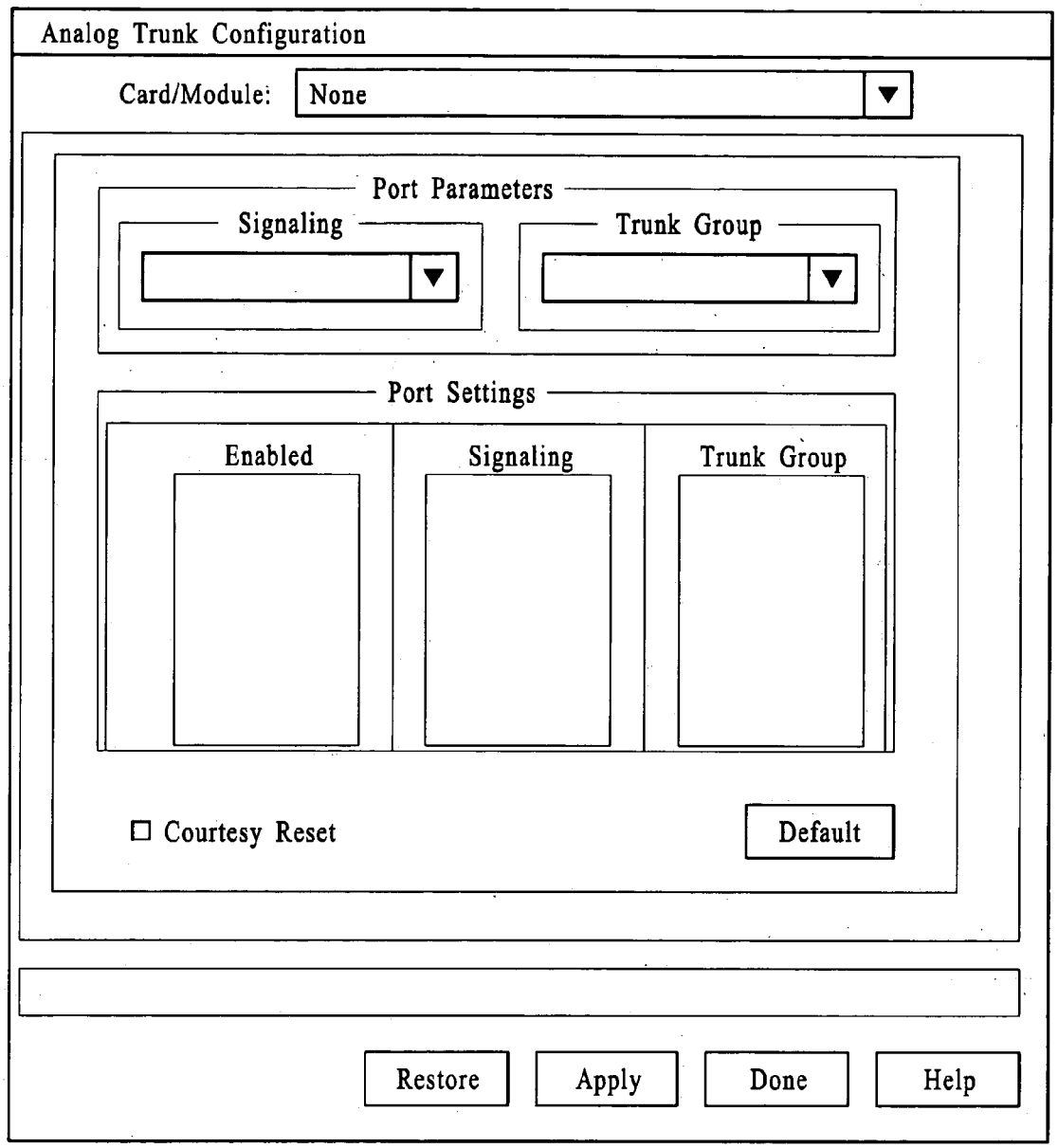
FIG. 16D illustrates a window for configuration of analog trunks in accordance with preferred embodiments of the present invention.
Figure 16F:
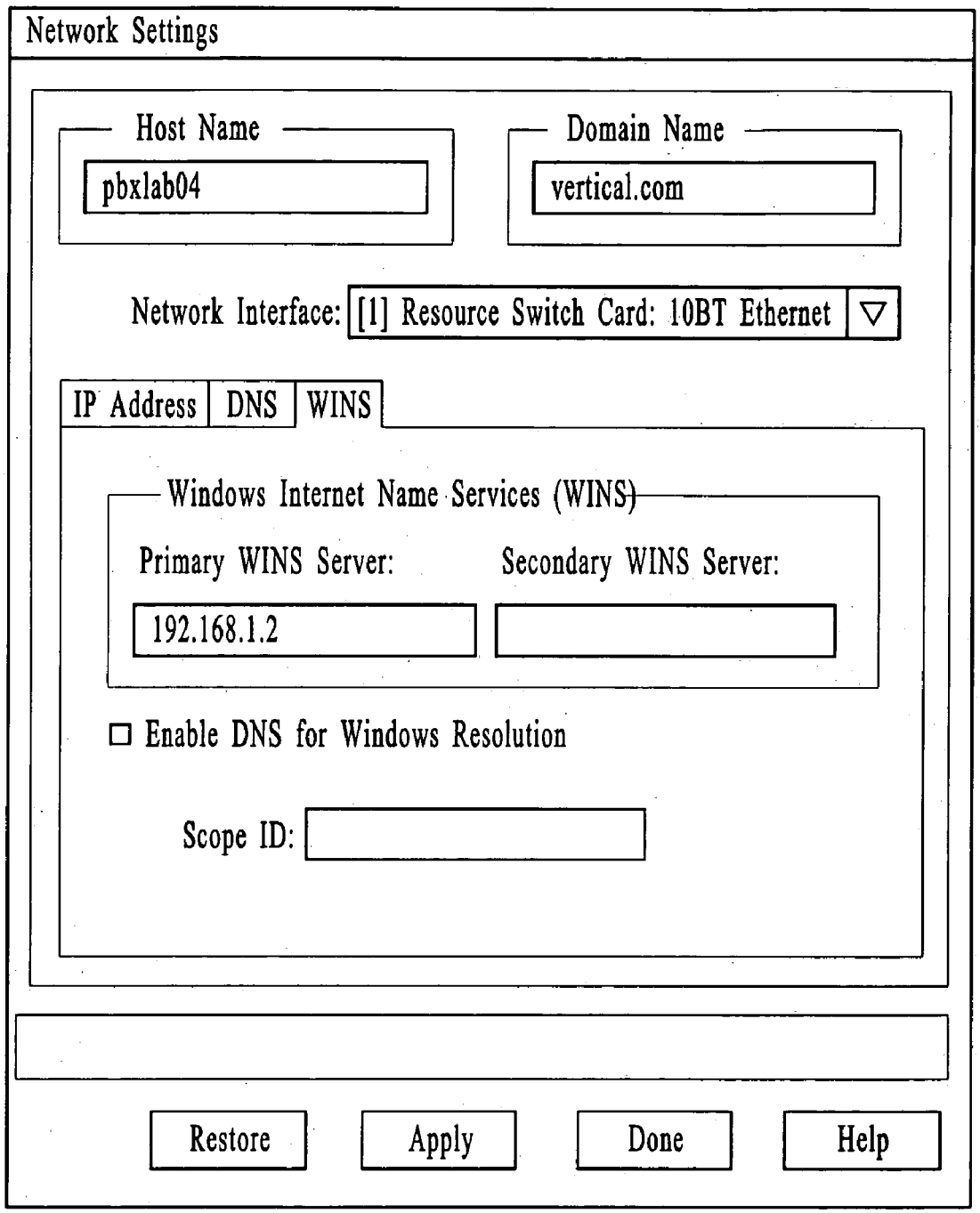
FIG. 16F illustrates a window for configuration of network settings in accordance with preferred embodiments of the present invention.

FIG. 16D illustrates window 384, which may be used to configure analog trunks in accordance with preferred embodiments of the present invention. FIG. 16E illustrates window 386, which may be used to configure frame relay type WAN resources in accordance with preferred embodiments of the present invention. FIG. 16F illustrates window 388, which may be used to configure network (e.g., IP network) settings in accordance with preferred embodiments of the present invention.

As will be appreciated from these illustrative examples, various administration/configuration operations may be carried out remotely, preferably using an intuitive browser-type interface, and preferably using HTTP type commands in an applet environment such as with Java, in a desirable and much improved manner.

As illustrated in FIGS. 17A through 17H, such remote processing concepts are extended to remote diagnostic operations in accordance with yet other preferred embodiments of the present invention.

Figure 17A:
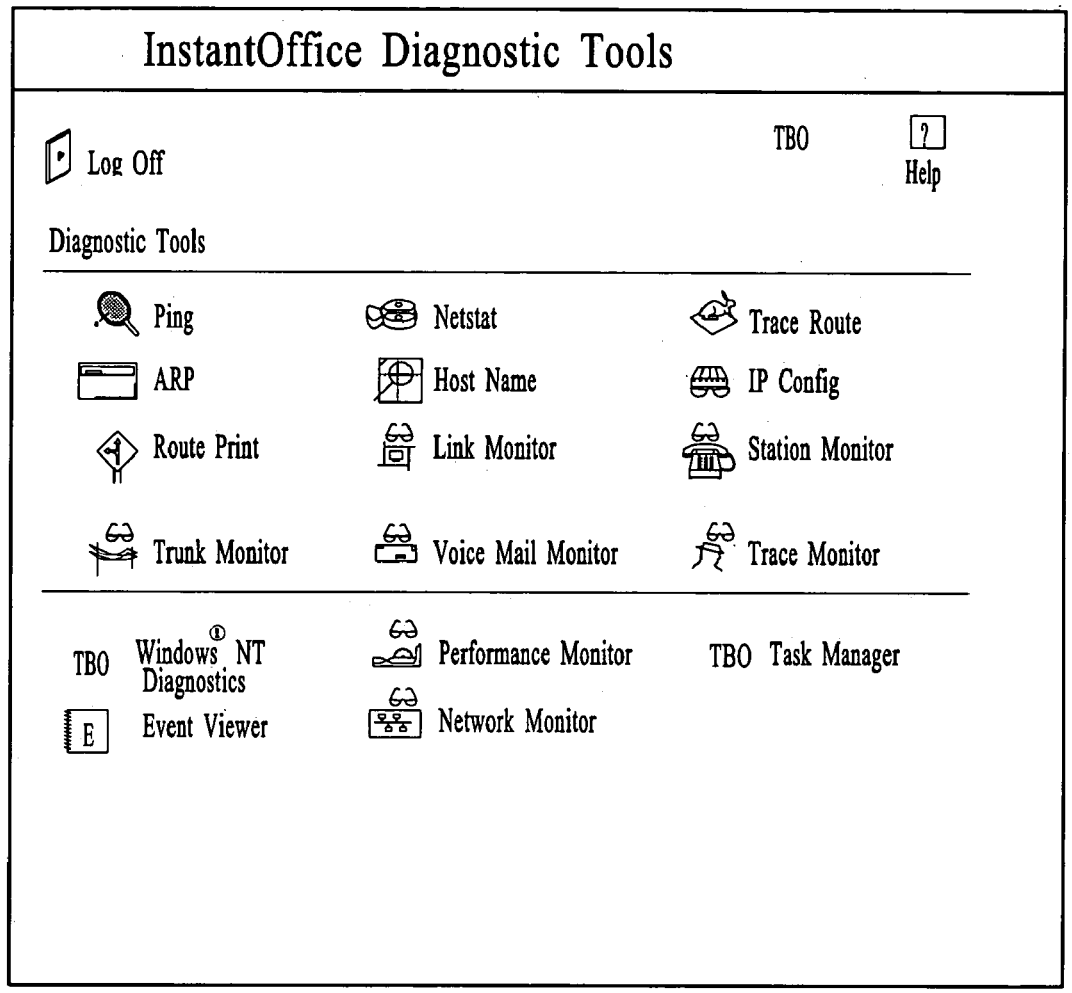
FIG. 17A illustrates various icons that may be presented to a remote user to perform remote diagnostics on the communication system in accordance with preferred embodiments of the present invention.

As illustrated in FIG. 17A, various icons may be presented in order for a remote user to perform remote diagnostics on communications system 50. Such icons may be used to present, for example, various "DOS prompt" type commands (e.g., Ping, ARP, route print, net stat, host name, trace route and IP config). Icons also may be presented for more advanced diagnostic-type operations, such as trunk monitor, link monitor, voice mail monitor, station monitor and trace monitor. Various of these diagnostic operations will now be more fully described.

As illustrated in FIG. 17B, window 390 may be presented in order to provide a trunk monitoring function. As illustrated, window 390 may be used to readily provide information regarding the slot, board, port, state, and called and calling party information of various trunks. As illustrated in FIG. 17C, window 392 may be presented in order to provide a link monitoring function. As illustrated, window 392 may be used to readily provide information regarding links that may be established within communications system 50, such as which cards are connected to which port, etc. As illustrated in FIG. 17D, window 394 may be presented in order to provide a station monitoring function. As illustrated, window 394 may be used to readily provide information regarding the status of various stations/extension in communications system 50. As will be appreciated, such windows may be used to readily present desired status and other diagnostic type information to a remote person.

Figure 17E:
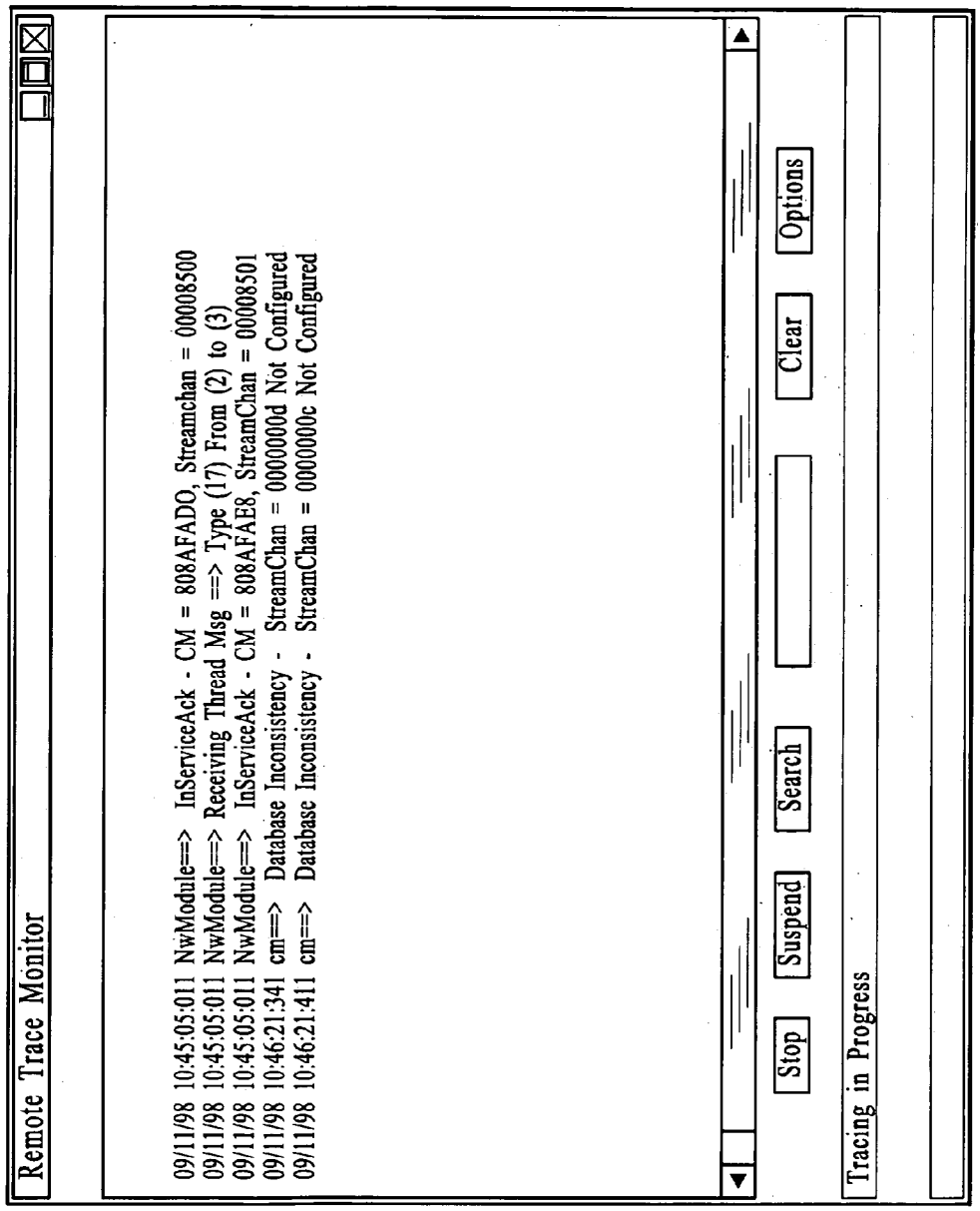
FIG. 17E illustrates a window for displaying trace information from various software components, driver, etc. in communications system in accordance with preferred embodiments of the present invention.
Figure 17F:
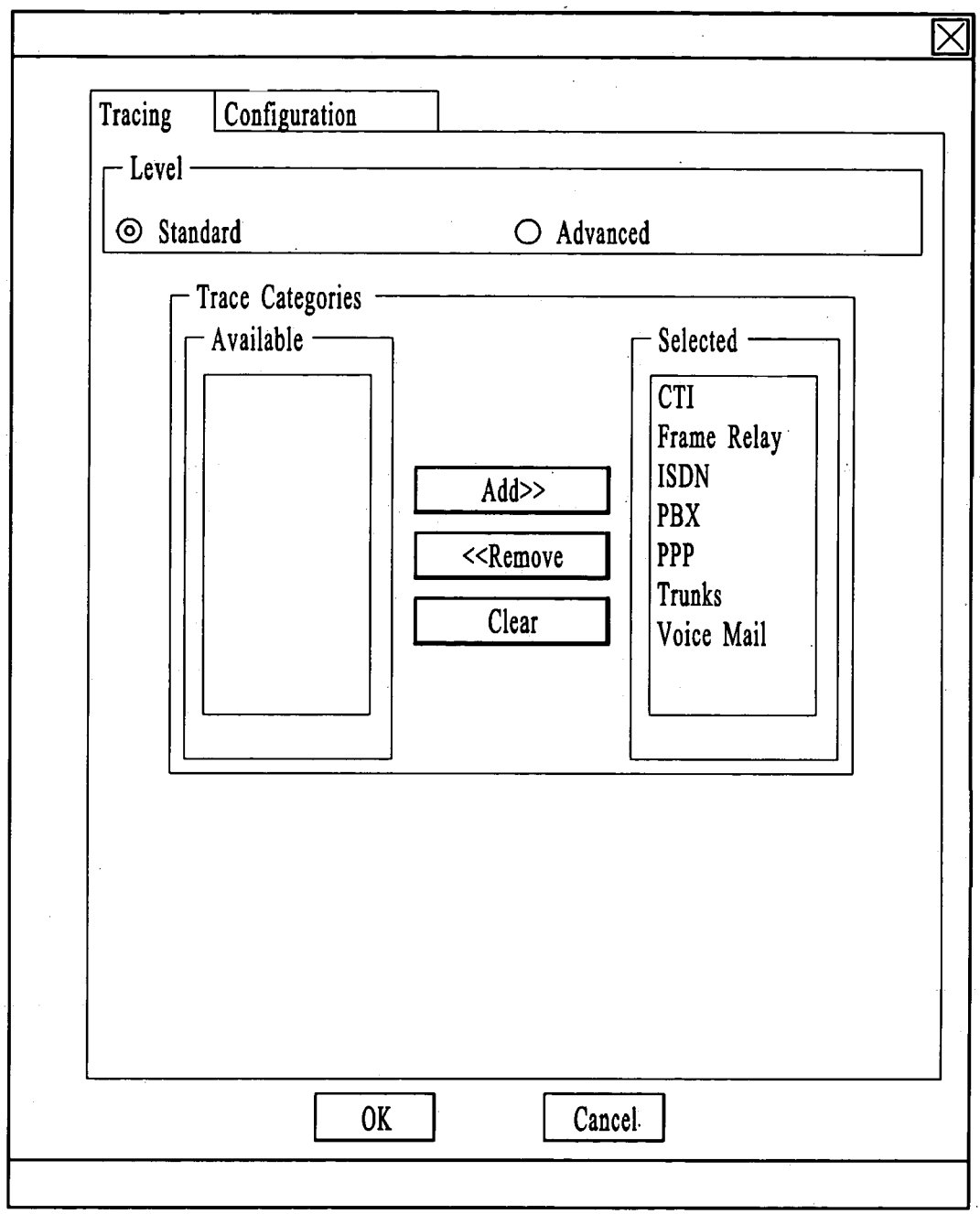
FIG. 17F illustrates a window for providing a first level of tracing information in accordance with preferred embodiments of the present invention.
Figure 17G:
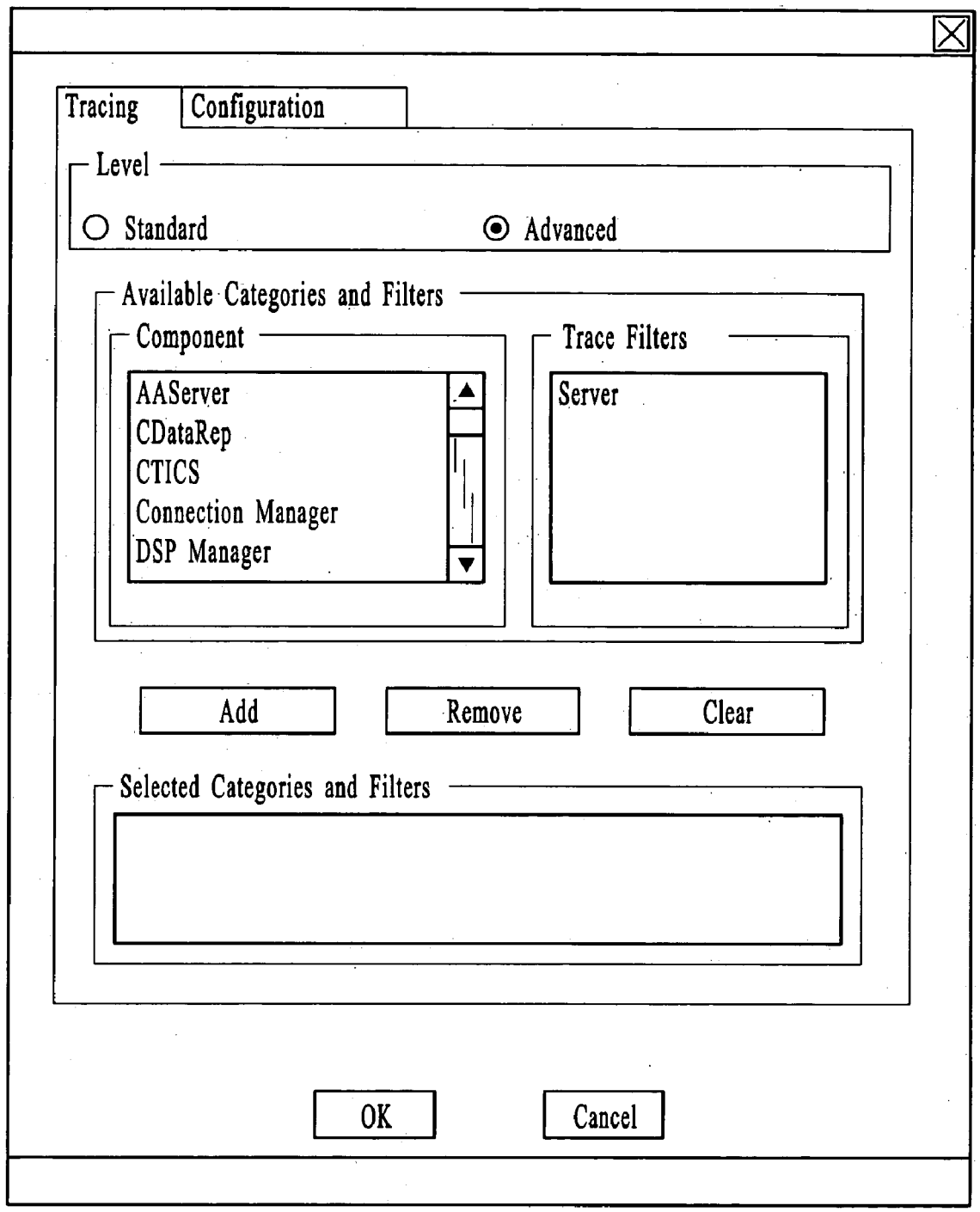
FIG. 17G illustrates a window for providing a second, higher level of tracing information in accordance with preferred embodiments of the present invention.
Figure 17H:
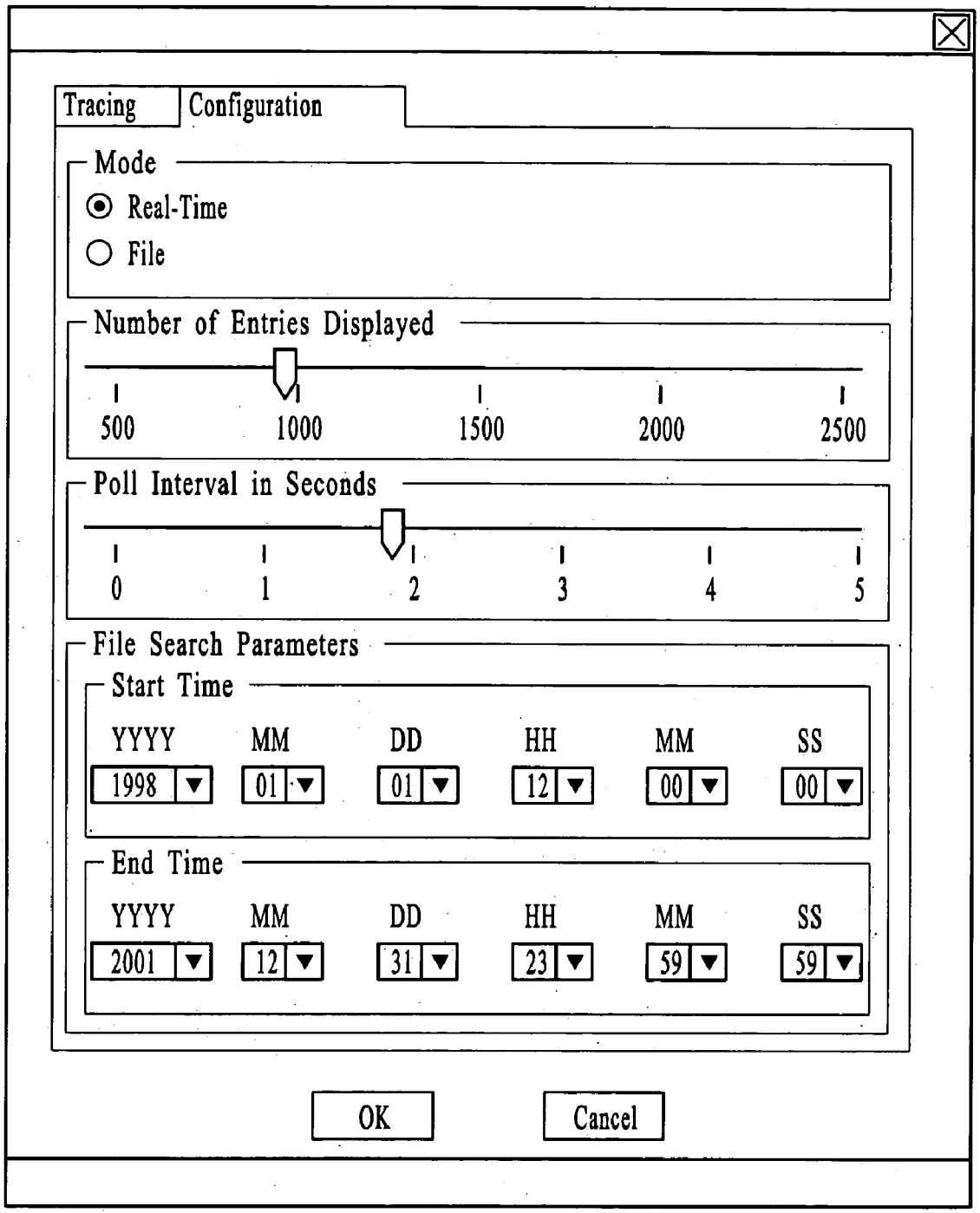
FIG. 17H illustrates a window for selecting-certain timing and mode information in accordance with preferred embodiments of the present invention.

In accordance with preferred embodiments, advanced remote trace monitoring also may be provided. FIG. 17E illustrates window 396, which may be used to display trace information from various software components, drivers, etc. in communications system 50. The level and type of trace information that is remotely provided may be desired controlled in accordance with preferred embodiments of the present invention. FIG. 17F illustrates window 397, in which a first level of tracing information (e.g., "standard") that may be provided is selected. As illustrated, the remote user may select various components to have trace information provided in the trace monitor window. FIG. 17G illustrates window 398, in which a second, higher level of tracing information (e.g., "advanced") that may be provided is selected. As illustrated, the remote user may select various software components, such as those related to automated attendant, voice mail, connection manager, DSP manager, T-1 drivers, LAN drivers, frame relay drivers, etc., and may also select various trace filters to more precisely control the trace information that is provided. FIG. 17H illustrates window 399, in which certain timing and mode information may be selected. As illustrated, window 399 may be used to provide that tracing information is presented in real time or stored to a file, with control preferably provided for the number of entries that are displayed, poll interval, etc. For trace entries stored in a file, start and end time search parameters also may be selected.

Figure 18:
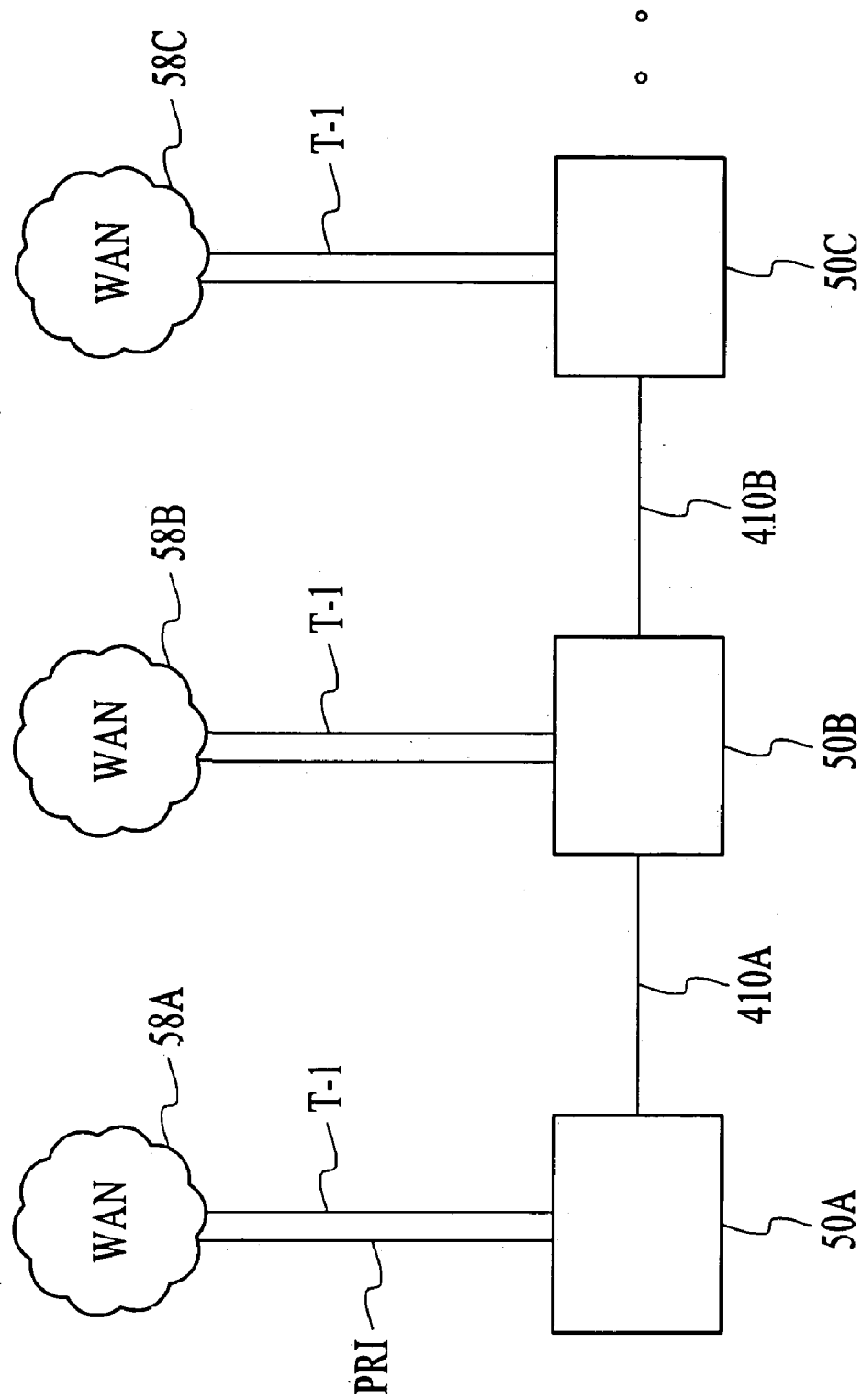
FIG. 18 illustrates a communication system in accordance with another preferred embodiment of the present invention.

Referring now to FIG. 18, additional aspects of preferred embodiments of the present invention will now be described.

Based on the description provided elsewhere, it will be apparent that communications system 50 may be coupled to other such communications systems in a manner desirable for the particular application. FIG. 18 illustrates three such communications systems 50A, 50B and 50C (in other embodiments other numbers of such communications systems 50 may be provided). The various communications systems are coupled to various desired WAN services (WAN services 58A, 58B and 58C being illustrated), and also may be coupled to each other, such as through connections 410A and 410B, etc. Connections 410A and 410B may be, for example, an ethernet or other LAN-type connection (e.g., for multiple communications systems 50 in the same general locations or physical proximity), or alternatively may be a remote connection such as a connection established over the Internet (e.g., an IP connection), such as for communications system 50 geographically remote from each other (e.g., a head office and one or more remote satellite-type offices, etc.). FIG. 3 illustrates the various paths that may be utilized to establish such a connection. What is important is that information may be coupled between the various communications systems in a manner suitable for the particular physical configuration.

Preferably, communications system 50A includes a PRI or primary rate interface or ISDN circuit that includes what a number of B (or "bearer") channels and at least one D (or "data") channel used to carry, for example, control signal signals and customer call data such as in a packet switched mode. As is known in the art, a D or similar control signaling channel typically is used to provide appropriate signaling information for the voice or B channels. The D channel typically and preferably carries such control signaling information in the form of a serial data stream. The control signaling over such a D-type channel is sometimes referred to as NFAS, or Network Facility Associated Signaling.

As illustrated, communications system 50A also preferably has coupled thereto one or more T-1 or similar digital transmission or other links, and communications system 50B and 50C also preferably have coupled thereto one or more T-1 or similar digital transmission or other links. With the various communications systems coupled together as previously described (e.g., ethernet/LAN connection, IP connection, etc.), the D channel coupled to communications system 50A may be used to provide signaling-type information for one or more T-1 links coupled to communications systems 50A, 50B and/or 50C. As in many applications the D-type signaling channel may have sufficient bandwidth to provide signaling information for a plurality of communication links, with communications systems implemented and/or connected together as described herein, a common D-type signaling channel may be used to efficient provide signaling information for a plurality of T-1 or similar links coupled to a plurality of such communications systems, etc. Thus, in accordance with such embodiments, a distributed-type NFAS signaling arrangement may be implemented for a plurality of communications systems.

Figure 19:
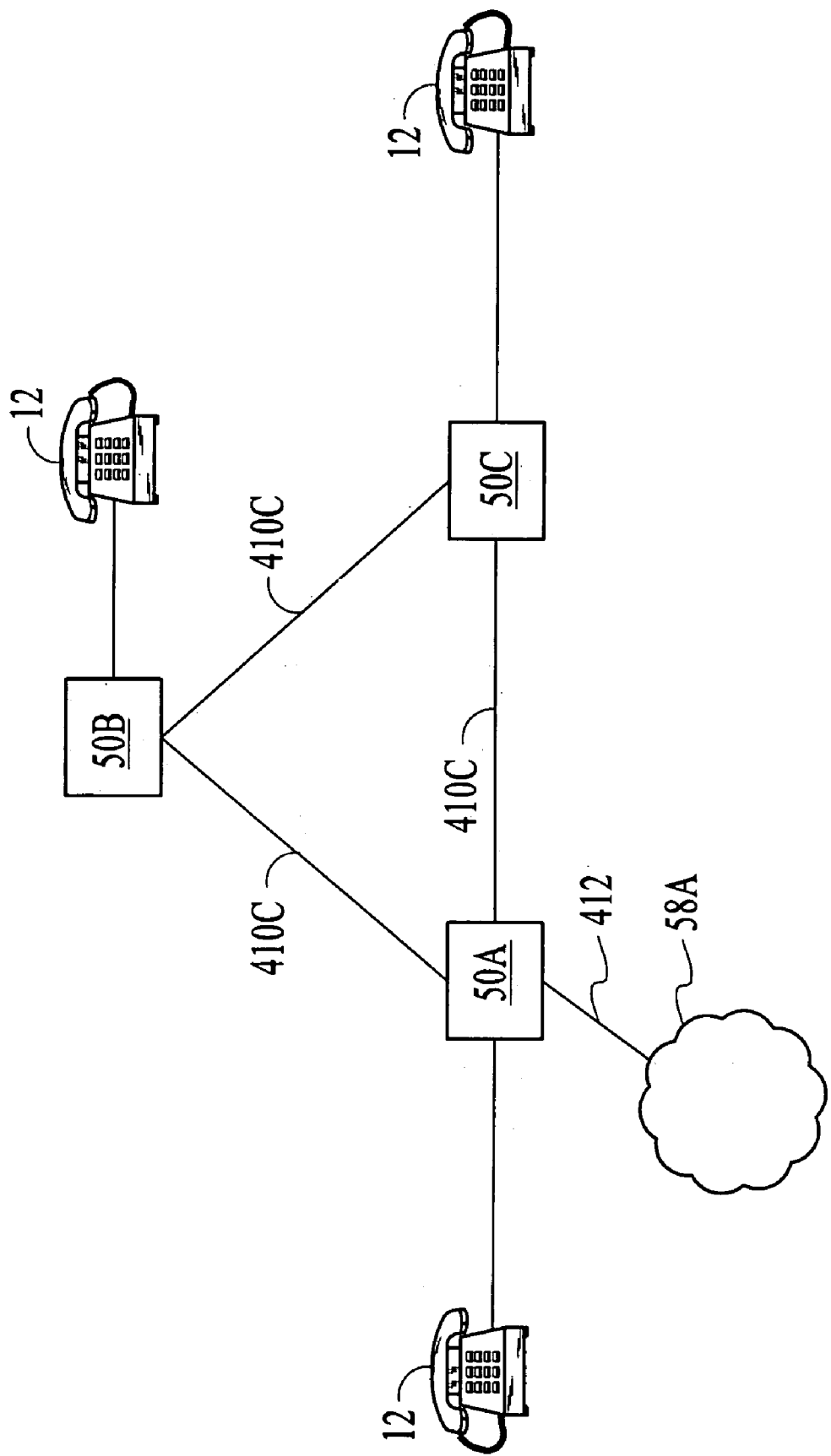
FIG. 19 illustrates a communication system in accordance with another preferred embodiment of the present invention.

FIG. 19 illustrates another configuration of a plurality of communications systems 50 (this type of configuration may be substituted for the configuration illustrated in FIG. 18, or vice versa, or some combination of these configurations). While three communications systems are illustrated (50A, 50B and 50C), other numbers of communications systems are utilized in other embodiments.

As illustrated, communications system 50A is coupled to WAN services 58A over connection 412 (the other communications systems may be similarly coupled to WAN services, etc.), which may be any suitable connection/link such as described elsewhere herein. As described elsewhere herein, VoIP (or other packetized voice/data communications) may be coupled to/from WAN services 58A and communications system 50A. As previously described, communications systems in accordance with the present invention include suitable HDLC or other data framing/deframing engines, DSPs (such as for decompression or other processing), PBX and LAN router types of functions. With an arrangement such as illustrated in FIG. 19, a VoIP or similar or other packetized data may be received, for example, by communications system 50A. This data stream conventionally might be de-packetized and processed upon receipt by the receiving system. Communications systems in accordance with embodiments of the present invention, however, have the ability to route the data stream to other communications systems (e.g., 50B or 50C) over a suitable connection 410C. As previously described, such systems may be coupled via an ethernet or LAN type connection, an IP or other connection, which preferably supports packetized transmissions. Thus, a packetized communication/data stream may be received by a first communications system, which may depacketize and process the communication/data stream, or forward without depacketizing to a second communications system, which may depacketize and process the communication/data stream, or forward without depacketizing to a third communications system, and so on. In this manner VoIP other communications may be achieved with a plurality of communications systems, with a reduced latency over systems that, for example, must depacketize, decompress, etc. the data stream before it is provided to another computer or system. Thus, a data stream may be routed by one communications system to another without such additional processing.

It should be noted that communications systems 50 illustrated in FIGS. 18 and 19, for example, also have coupled thereto a plurality of computers, telephones, etc., as previously described for purposes of generating, receiving various data streams, etc., although such details have not been shown for ease of description.

As described elsewhere herein, various voice mail type options may be presented to users of such communications systems in accordance with the present invention. One such advantageous voice mail option provided in accordance with preferred embodiments of the present invention include advanced email or voice mail-type broadcasts of desired messages. A user may decide to send a voice mail or email to some or all users of the communication system. With a suitable office attendant-type or companion-type program, for example, a user may select from a group list, etc., a desired group of persons to receive the communication. A broadcast voice mail, for example, could be input through the user's telephone in a conventional manner, and routed (see FIG. 3) through, for example, DSP 78 (via TDM bus 78, switch/multiplexer 74, etc.) which converts the voice mail message into an suitable data format, such as what is known as a WAV file, etc., and then sent via (for example) packet bus 80A and/or 80B to a plurality of computers. Communications system 50 also, for example, can record which users have received or not received the communication so that users may later receive the communication (such as when they log on at a later time). In addition, communications system 50 also has the capability to parallely process the communication as a message that is to be sent to persons via, for example the Internet. Using an HDLC framer/deframer as is provided in accordance with the present invention, a user may generate a voice mail or email communication that the communications system sends as packetized data over the LAN to recipients recognized to be users having a computer on the LAN, while generating a suitable HDLC, ATM framed communication to recipients who are reachable over the WAN, such as over the Internet or other IP connection, etc.

Described elsewhere herein are embodiments in which visual representations of pink slips or yellow stick-ons are generated to represent net messages, etc. This concept, in other embodiments, is extended also to voice mail and email messages. While not expressly illustrated, it should be understood that the present invention includes the ability to convert voice information (including voice mail type messages) into a suitable data format so that it may be delivered over the WAN or LAN to various computers coupled to communications system 50. Similarly, communications system 50 has the capability also to serve as an email server (in addition to other functions, as described elsewhere herein). Thus, in conjunction with a suitable program running on particular computers coupled to communications system 50, voice mails may be presented as data files to the various particular computers, and emails and net messages may similarly be presented to the various particular computers (such as described elsewhere herein). In certain alternate embodiments one, two or three visual "stacks" may be presented, for example, with one stack constituting a visual representation of a stack of voice mails (with suitable icons for play, pause, backward, forward, delete, file, freeze/hold, etc., as well as other icons analogous to those described for net messages), with a second stack constituting a visual representation of a stack or net messages (such as described elsewhere herein), and/or with a third stack constituting a visual representation of a stack of email messages (with icons similar to those described for net messages, etc.). Such stack preferably may be minimized or expanded, and desirably provide a unified visual interface for a variety of communications, etc.

It also should be noted that DSP 76 is desirably utilized in accordance with various embodiments of the present invention. Data streams may be desirably coupled to a resource such as DSP 76 in order to have, for example, processes such speech/voice recognition, text to speech conversion, speech to text conversion, compression, translation, etc. Thus, data streams from the LAN, WAN, modem, etc. may be desirably coupled to resources such as DSP 76 to provide such processes.

It also should be noted that, in preferred embodiments, DSP 76 is coupled to switch/multiplexer 74 in a manner so that it may "tap" into the various TDM data streams. This provides a significant improvement over systems in which data streams must be directed into a resource such as DSP 76, and then sent from DSP 76 over a separate channel, etc. (thereby utilized two channels, etc.). In such embodiments, DSP 76 can tap into or monitor data streams on particular TDM channels and provide, for example, processing to accomplish recognition (voice or speech, etc.), detection (such as of a fax or modem call, etc.), compression (including compression, transcoding, streaming and storing, etc.), packetizing (such as to prepare a data format such as for an email, etc.). In one illustrative example of such embodiments, communications system 50 may be programmed so that particular users (e.g., president, technical support, warranty claims line, etc.) automatically have voice mails stored as voice mails and also as an email or other data form. Thus, a voice call may be directed into voice mail, while DSP 76 concurrently processes the voice data stream into another form (e.g., email, data file, etc.), which may be stored, send over the WAN or LAN, etc. Having DSP 76, and particularly configured (such as with switch/multiplexer 74) so as to tap into the various channels, provides significant advantages in a variety of applications.

Figure 20:
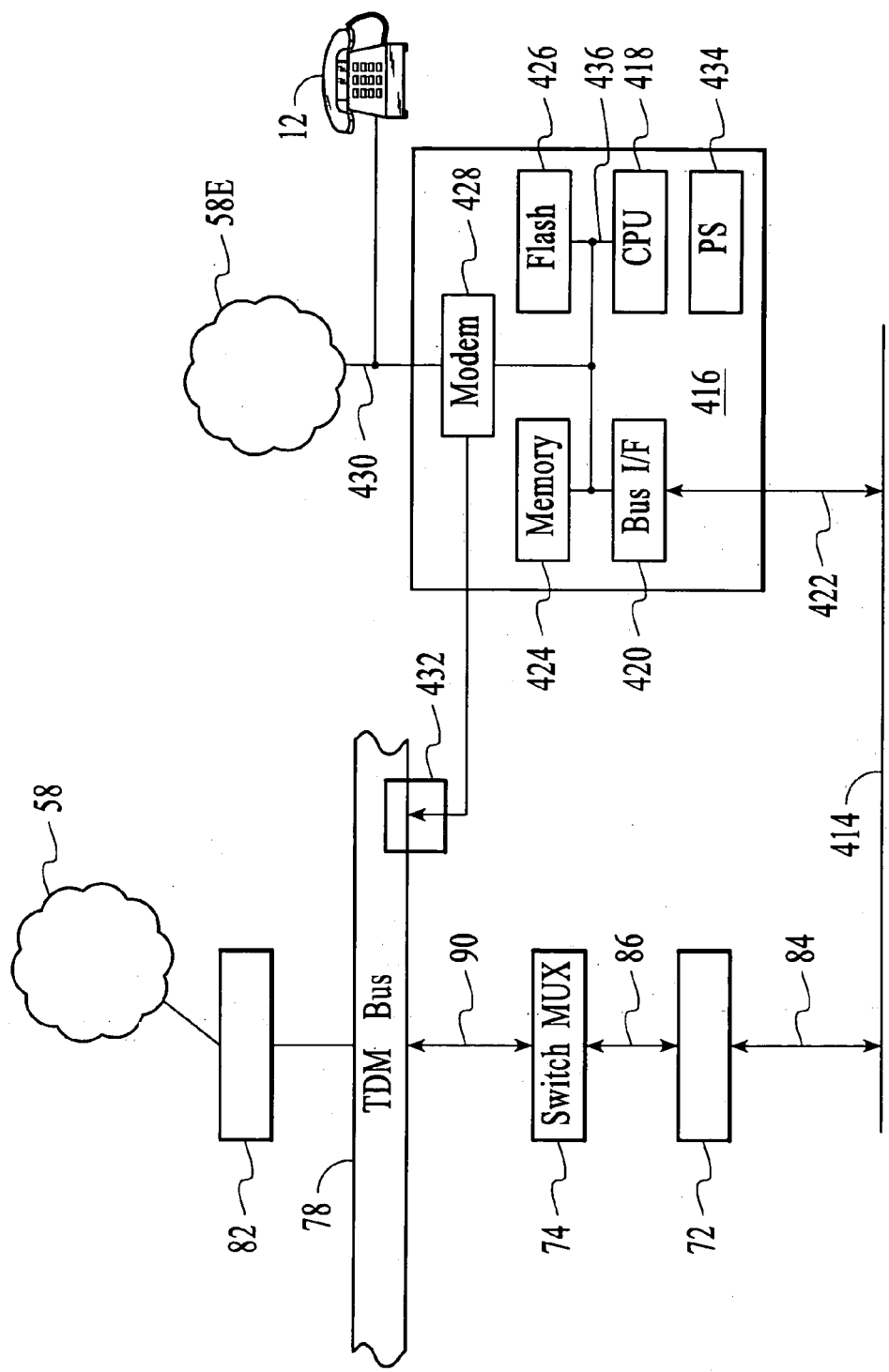
FIG. 20 illustrates a backup communication module in accordance with preferred embodiments of the present invention.

Referring now to FIG. 20, an embodiment of the present invention including a backup communications capability will now be described.

As illustrated in FIG. 20, backup communication module 416 preferably is provided in communications system 50. In the illustrated embodiment, backup communication module 416 is coupled to bus 414, which may be a part of processor/system resources 70 (such as, for example, bus 408 of FIG. 3A, etc.), and may be a ISA or PCI-type of bus, etc. Coupled to bus 414 are other components of communications system 50, such as bus 84, buffer/framer 72, switch/multiplexer 74, buses 86, 90 and 78, cards 82, WAN services 58, etc. In general, the various components discussed in connection with FIG. 3 are applicable with embodiments incorporating backup communication module 416, although such components are not illustrated in FIG. 20.

Backup communications module 416 preferably includes bus interface 420 for coupling information to/from bus 414, memory 424 for storing various information, as will described hereinafter, CPU 418, FLASH or other programmable memory 426, and modem or other communication unit 428. Module 416 preferably includes a standby or backup power supply 434, although in certain alternate embodiments communication unit 428 is coupled to, for example, link 430 of WAN services 58E, which may be a dedicated telephone line, POTS line, etc., which provides sufficient power to module 416 so that power supply 434 is not required. In such alternate embodiments, the various components of module 416 are implemented in low power CMOS technology or the like, and consume sufficiently low amounts of power so that module 434 may operate at a suitable speed in order to provide backup communications using only the power provided by link 430, such as, for example, in the event of a power failure in communications system 50 or the office in which communications system 50 is located, etc.

Preferably, memory 424 receives and stores via bus interface 420 a variety of information regarding the status and operation of communications system 50. For example, memory 424 may store power-on self test data (i.e., status, trace or other information generated during power-on, boot-up, etc.), SNMP data for the PBX, WAN resources, voice mail, LAN resources, etc.), monitor or trace data (such as described elsewhere herein). Preferably, module 416 receives periodic updates from communications system 50, including information sufficient to debug, reboot, etc., communications system 50. Various trace, monitoring, diagnostic or other information may be made available to module 416 for storage in memory 424.

The data in memory 424 preferably is organized in a hierarchical manner, with, for example, various levels of information. Certain information may be so critical that it is retained in memory 424 until deleted (e.g., a level 1 category of information, such as critical fault data, etc.). Other information may be retained for a predetermined period of time and then purged, unless, for example, a level 1 event has occurred (e.g., a level 2 category of information). Still other information may be retained for a predetermined period of time (the same as or different from the level 2 period) and then purged, etc. What is important is that a variety of information be provided to memory 424 and hierarchically retained, which less critical information periodically purged in order to make room for additional information in memory 424, etc.

Still preferably, CPU 418 executes what is know as a watch dog timer (WDT) function. In preferred embodiments, a fault monitoring subsystem of communications system 50 periodically provides a signal/update indicative of the status of communications system 50 (e.g., normal, active, ok, etc.). In the event that such a signal or information is not provided in a predetermined interval of time, CPU 418 may recognize this event as an abnormality and begin a process to communication with communications system 50, and/or initiate a remote communication such as over communications unit 428 in order to alert a remote user or system of the abnormality, etc.

Preferably, FLASH or other programmable memory 426 is provided in module 416. Memory 426 preferably stores operational programs for module 416, including, for example, diagnostic, debug, monitor or other routines in order to facilitate a debug, reboot, etc. of communications system 50. Preferably, the algorithms and/or programs in memory 426 may be periodically updated, either over bus 422, but preferably through link 430 and communications unit 428. Programming of memory 426 remotely, such as over communications unit 428, enables a remote technician, for example, more flexibility in remotely monitoring, debugging, rebooting, etc. communications system 50.

As previously described, module 416 preferably has a dedicate line (e.g., a POTS line) for such backup communications, and telephone 12 optionally may be coupled to such line for emergency voice calls or the like, etc. In alternate embodiments, however, communications unit is also (or alternatively) coupled to channels of TDM bus 78. In certain embodiments, a predetermined channel or channels of TDM bus 78 are dedicated for such backup communications. In other embodiments, communication unit 428 is coupled to TDM bus 78 through switch 432, and in such embodiments dedicated TDM channels are not required.

As will be appreciated, information contained in memory 424 may be remotely viewed, either through communications unit 428 or through a connection established through buses 422 and 414, etc. Bus interface 420 enables data transmissions to/from module 416 when communications system 50 is operating in a normal manner, while also having the ability to isolate module 416 from bus 414 in the event of a serious abnormality in communications system 50. It also should be noted that communications unit 428 preferably is a modem, but communications unit 428 also could consist of a signaling device to a pager or other wireless communication device, or could be a unit for establishing IP or other packet communications, etc. What is important is that communications unit 428 have capability to transmit desired information over the choice medium for link 430 in order to provide desirable backup communications and monitoring of communications system 50 in accordance with the present invention.

In accordance with such embodiments, the remote user may configure tracing in desirable and flexible manner. Through the use of trace filters, various software components and drivers in effect may be told what trace information to provide, which information is preferably provided to a central storage location in communications system 50 and made available in real time or by file access to such a remote user.

Methods of Implementing Language Capabilities

As described above, in accordance with the present invention systems for intelligently managing voice, data and video communications such as in a small office or similar environment may be efficiently and desirably employed (see, e.g., FIGS. 2–5 and related and subsequent description for a discussion of such systems). Such a system, however, may be desirably adapted to support various languages in the automated attendant, voice mail or other applications/subsystems (as will be appreciated from the forgoing description, embodiments of the present invention provide audio or voice prompts or information, etc., to users or other parties interfacing with such automated attendant or voice mail applications/subsystems, etc., which must occur in some defined language, such as U.S. English, U.K. English, Canadian French, France French, Italian, German, etc.). As particular examples, it may be desirable to have a system that can be readily configured to support one or more initial languages, or it may be desirable to adapt a previously installed system to support an additional language, etc. In any event, what should be appreciated is that systems in accordance with embodiments of the present invention are often desired to support one or more than one particular language in its voice/audio prompt and information capabilities.

In previous systems supporting such voice/audio prompt and information capabilities, it was understood that, due to the particular intricacies and nuances of the particular languages (e.g., sentence structure, syntax, grammar, dialects, etc.), such voice/audio prompts and/or information (as used hereinafter, generally "voice prompts") are programmed uniquely for each set of voice prompts for each language. Thus, for each particular language or language variant to be supported in the system, software must be written to specifically implement the set of voice prompts to support the particular language or language variant. This typically would require that a programmer and a linguist or other language specialist expend substantial time and resources, etc., to specifically write code for each particular language/language variant to be supported by the system As the need for additional language/language variant support arises, this inevitably results in substantial delays and expense while such software is developed and debugged, etc.

In accordance with preferred embodiments of the present invention, however, language support for such systems is accomplished by way of a program/data structure so that additional language support may be readily implemented, for example, by a non-software programmer using grammar and voice prompt files, which are preferably located in a predetermined directory in the system. Thus, in the example of the need to add a language/language variant to a particular system, grammar and voice prompt files may be created by a person (or persons) with appropriate knowledge in the particular language/language variant, without requiring the development of specific software (by a software programmer, etc.) to implement such additional language/language variant.

Figure 25:
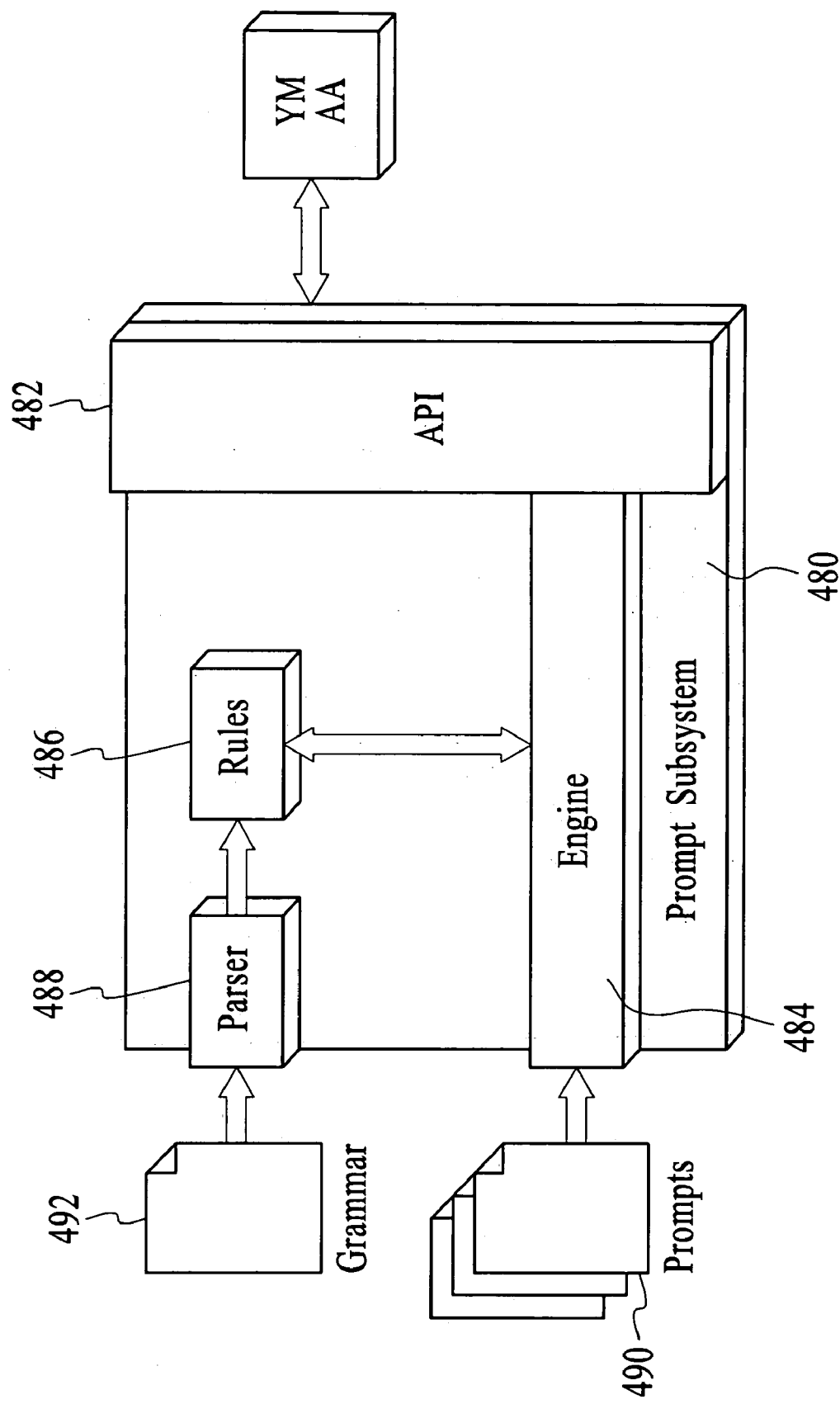
FIG. 25 is a block diagram illustrating methods of implementing language capabilities in accordance with preferred embodiments of the present invention.

Referring now to FIG. 25 (and figures thereafter), additional preferred embodiments of such a voice prompt "subsystem" will be described. Such preferred embodiments of prompt subsystem 480 preferably provide voice prompts or feedback in the Telephone User Interface ("TUI") of the overall system. Feedback in the TUI consists of audio or voice prompts or messages played through the telephone. The voice prompts are preferably created by stringing a series of audio or sound files together, so that when they are played sequentially they create well-formed, and grammatically proper, sentences. In preferred embodiments, the prompt subsystem is implemented using the Java programming language and Object Oriented methodologies, and preferably is operating system/platform independent. Also in accordance with such preferred embodiments: multiple languages may be used at the same time by different users; mailboxes may be configured by a system administrator to use a preferred language; a system wide preferred language may be chosen; and grammars for languages may be kept and used in external (and preferably) text files in order to facilitate the addition or modification of languages supported by the system.

As illustrated in FIG. 25, prompt subsystem 480 preferably consists of four major parts: parser 488; rules 486; engine 484; and application programming interface ("API") 482. Parser 488, which serves as a "grammar reader," is responsible for parsing the grammar description of the desired language or languages from external grammar files 492 and translating them into rules 486. Grammar files 492 (essentially files that include high level grammatical structures or constructs, etc.) provide a relatively high level specification of how phrases are to be strung together to form grammatically correct phrases in the desired language or languages. Rules 486, which are "built" from the parsing of grammar files 492, specify in preferably database-type form how the detailed language grammars are stored in memory for quick look up from engine 484. With rules 486, engine 484 may more quickly respond to requests for prompts from API 482.

Engine 484 is responsible for actually responding to a prompt request from API 482 by using rules 486 to return a sequential list of prompt files 490 to API 482, such that the sequential playing of the prompt files (which preferably are in what are known as WAV or other suitable audio format) produces the desired and grammatically correct prompt in the TUI. As will be appreciated by those skilled in the art, API 482 provides the software interface between, for example, engine 484 and applications or other programs such as voice mail, automated attendant, etc. API 482 in effect provides an interface for engine 484 to the outside world, through which applications may request prompts from engine 484, and through which engine 484 may return the list of prompt files 490, so that the desired prompt may be created.

As will be appreciated, parser 488 enables rules 486, which preferably is of a database or similar-type structure so that engine 484 may respond to prompt requests in a timely manner, with rules 486 developed by parser 488 based on grammar files 492. In accordance with such embodiments, grammar files 492 may specify, in a grammatically proper manner, a series of prompts in a desired language or languages. Thus, grammar files 492 may be developed, for example, by non-programmers with linguistic or other language expertise in the desired language or languages. By development of grammar files 492 and appropriate prompt files 490, new languages (or modification of previously existing languages, etc.) may be readily added to the system.

Figure 26:
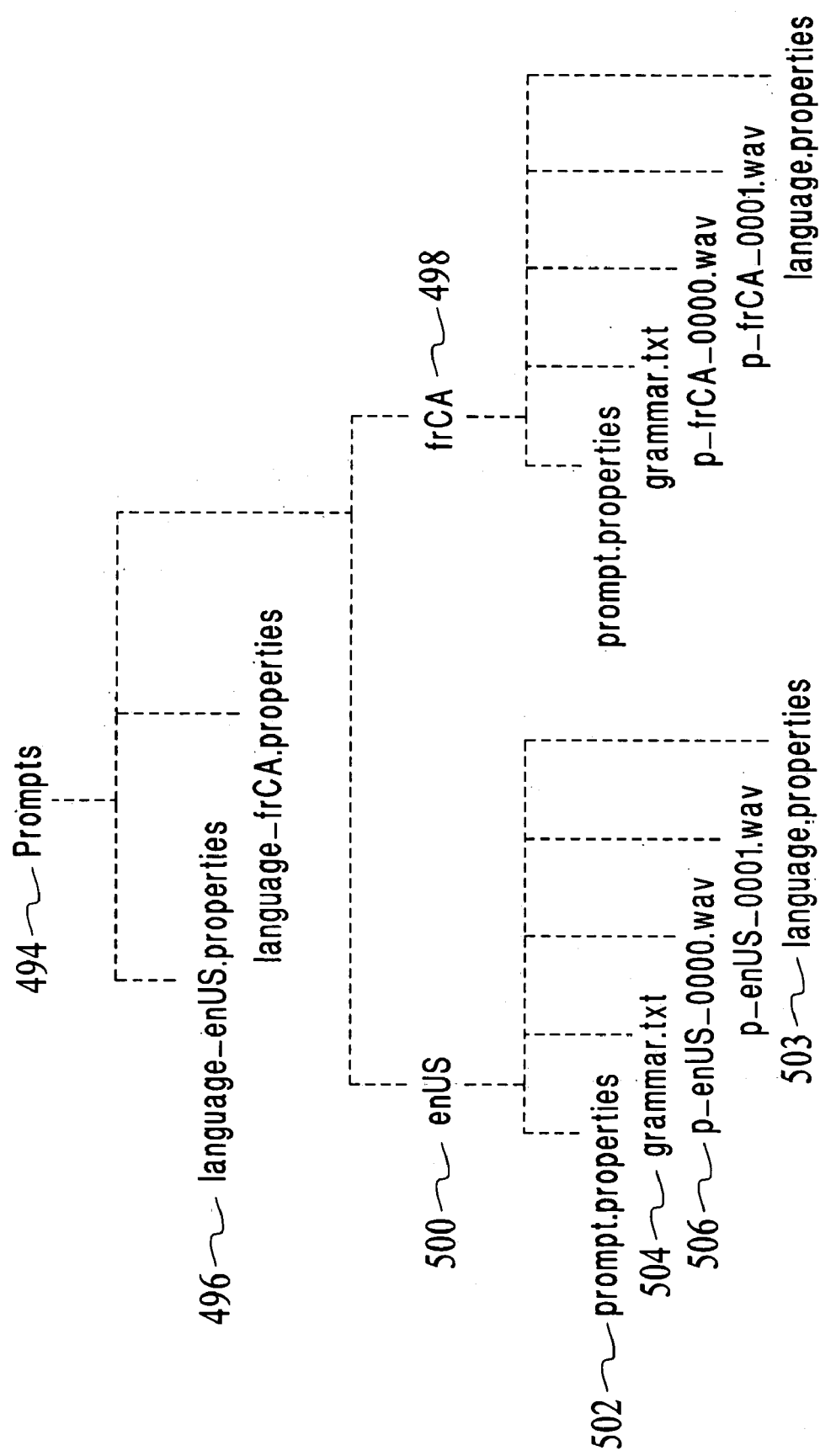
FIG. 26 is an exemplary directory structure related to methods of implementing language capabilities in accordance with preferred embodiments of the present invention.

A preferred directory structure for use with such preferred embodiments will now be described with reference to FIG. 26. As illustrated in FIG. 26, a single prompt directory (or folder, etc.) 494 preferably contains all of the necessary prompt subsystem resources in suitable location. In preferred embodiments, prompt directory 494 includes language files 496, one for each particular language supported by the system. With such language files 496, files that contain information about the language capabilities of the system may be readily located and accessed, providing a readily available means to determine the language capabilities of the system. It should be noted that, particularly with the flexible manner in which language support may be added to the system, particular variants or dialects or customizations, etc., such as U.S. English, U.K. English, Canadian French, France French, or Southern U.S. English, or using the voice and expressions unique to a particular company (e.g., AT&T),etc., may be added to the system and conveniently reflected in a language file 496.

Also within prompt directory 494 in preferred embodiments, are one or more language directories 498, 500. For each language or language variant supported by the system, there preferably exists a separate language directory. In the illustrative example of FIG. 26, two such directories are illustrated; language directory 500 for U.S. English, and language directory 498 for Canadian French. Such language directories preferably contain all (or essentially all) of the information and resources for constructing prompts for the specific language or language variant, including grammar files (grammar.txt files 504 in FIG. 26), text translation files (prompt.properties files 502 in FIG. 26), language property files (language.properties files 503 in FIG. 26), and sound files (xxx.wav sound files 506 in FIG. 26).

Grammar files 504 provide a relatively high level means for the grammatical rules or structures, etc., for particular language or language variants to be specified. An exemplary specification of a grammar file 504 is provided in Appendix A. In other embodiments, other types of grammar files are utilized. What is important is that the grammatical rules for a particular language or language variant be specified and/or defined in a suitable high level manner, so that parser 488 and rules 486 of FIG. 25 may desirably utilize such grammar files in a manner such as previously described. Thus, such a choice of grammar file enables, for example, non-programmers to design and add new language capabilities (or modify existing language capabilities) in a desirable and expeditious manner.

Text translation files 502 preferably provide a text version of all of the prompts for the particular languages or language variants supported by the system. In accordance with preferred embodiments, such text versions of the prompts are available for display, etc., such as for logging, reporting and debug purposes. It has been determined that, for example, in connection with the debugging of a new language to be supported by the system, displaying the text version of the particular prompts (by way of text translation files 502) at the same time as the prompts are audibly played (by way of sound files 506) provides a highly desirable way to confirm the correctness of the prompt subsystem for the particular language/language variant.

Language property files, utilized in certain preferred embodiments, allow certain language attributes to be stored in a convenient manner in a desirable location. For example, a grammar file 504 contains the knowledge on how to speak different phrases, such as time, but typically such a grammar file does not contain any knowledge about what type of time it is speaking, such as 12 or 24 hour time, etc. Applications using the Prompt Subsystem might need to know information about the language such as this, especially when they want to gather input. For example, it is logical that a user would input the time (e.g., 10:00 am or 22:00, etc.), as it is spoken to them. Therefore, applications such as a voice mail or an automated attendant type application can query the Prompt Subsystem, through API 482 to determine certain attributes about how the language is spoken. Since, the grammar file typically will not contain this information, in preferred embodiments such information is stored in the language property file.

Sound files 506 are audio files, such as what are commonly known as .wav files (or other suitable audio-type files), for the particular expressions and words that ate used to construct the desired prompts. As previously explained, a properly specified sequence of sound files 506, when sequentially played in the specified order (e.g., specified by rules 486 of FIG. 25), produce the desired prompt in grammatically proper manner.

Figure 27:
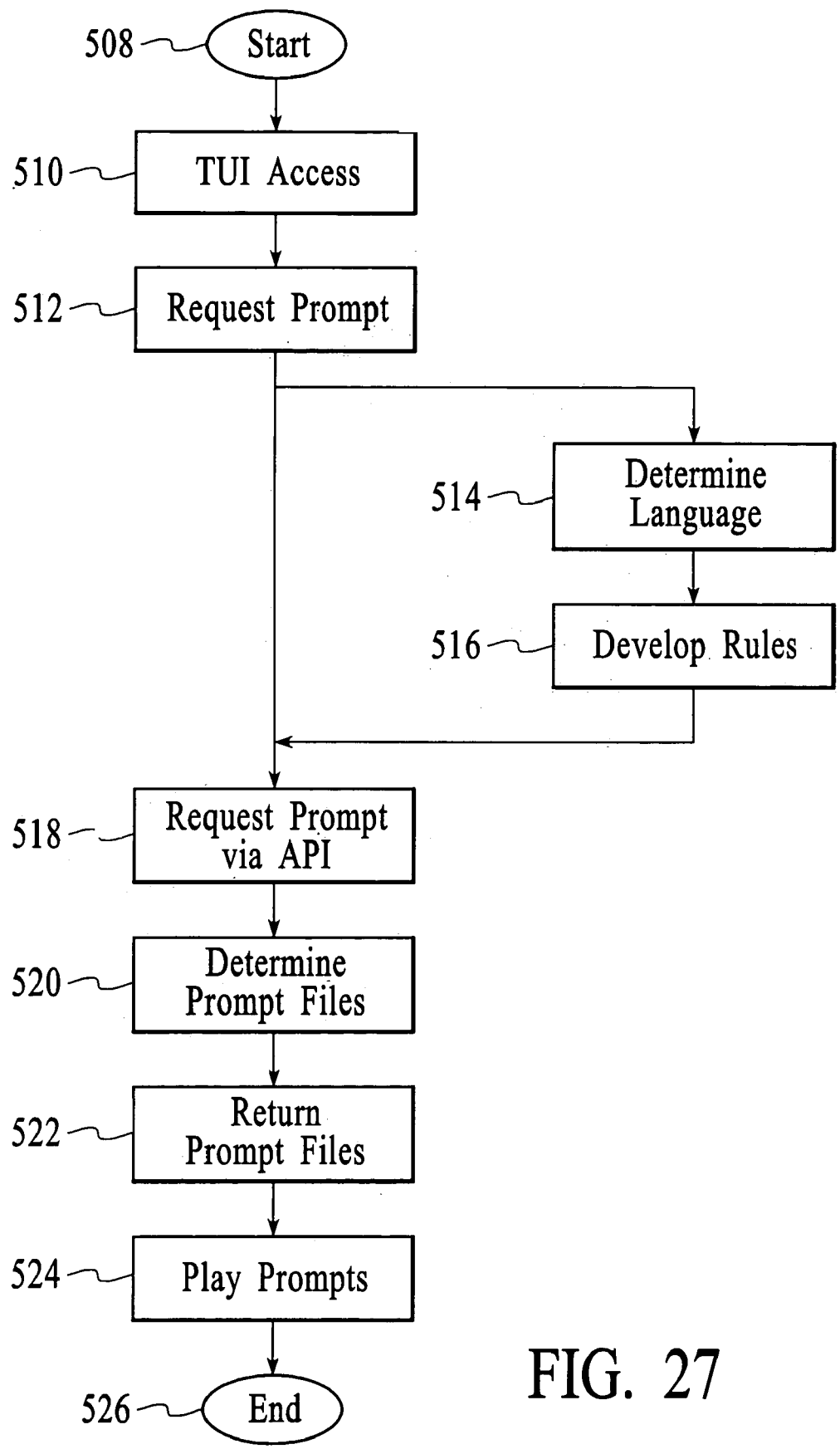
FIG. 27 is a flow chart illustrating methods of implementing language capabilities in accordance with preferred embodiments of the present invention.

Referring now to FIG. 27, an exemplary general flow chart applicable to certain of such preferred embodiments will now be described. At start step 508, the system (such as previously described, etc.) is powered up, operating, and serving to manage voice, data, video, etc., communications in the office or other environment. A voice mail or automated attendant type application program, etc., provides a telephone user interface ("TUI") to a user. At step 510, the user interacts with the TUI in a one of a variety of ways, such as dialing into the system, attempting to access voice mail with a telephony device, etc. At step 512, in response to the user access and/or user command, it is determined at the application level that a prompt is needed (such, a welcome greeting, request to enter an extension, etc.). At step 518, a request is made via API 482 for the desired prompt. After receipt by engine 484, at step 520 engine 484 interacts with rules 486. At step 522 engine 484 returns a list of prompt files 490 to API 482. As discussed previously, the list of prompt files 490 returned by engine 484 are such that, if played in sequence at step 524, the desired prompt is audibly played in a grammatically proper form. At step 526 the return of the prompt process is completed, and the system continues to process voice mail or automated attendant commands, etc., until further prompts are requested, the transaction is completed, etc.

It should be noted that, as illustrated at step 514, a step of determining the desired language to service the prompt request is performed. As will be understood, for the preferred embodiments that support multiple languages, a determination must be made as to which language should be utilized for the prompts. In certain preferred embodiments, the first choice for such determination is based on call information, such as calling party name, calling party number, called party name, called party number, etc. As previously described elsewhere herein, systems in accordance with the present invention include resources that maintain subscriber directories and the like, and associated therewith in preferred embodiments are language preferences for the various subscribers. Thus, in accordance with calling or called party numbers or names, the system may determine the desired language for the desired prompts.

As an alternate choice, for internal calls to the office in which the system is located, each subscriber has a voice mail account with an express setting for desired language. Thus, when it is determined that such a subscriber is calling or being called, the system may reference the voice mail account setting for that subscriber and use the language preference specified therein. In addition, in certain situations the user of the system may be given a choice to select the language, through, for example, what are sometimes known as single digit menus. As an illustrative example, the user may be prompted by the TUI to press 1 for English, 2 for French, etc. With such a digit command, the system may then process the call using the specified language. As another option, if the foregoing conditions are not satisfied or appropriate in the given context, a system default language setting may be utilized. In preferred embodiments, the system administrator sets a default setting that is used until such time as it is overridden by a digit command, a mail box with a different language preference is accessed, and so on. What is important is that, at step 514, the system determines which of the available languages should be utilized for prompts generated for a particular call, voice mail transaction, etc.

At step 516, a step of developing rules 486 may be performed. In certain preferred embodiments, language capabilities may be available for the system, but rules 486 not yet implemented until they are needed. As rules 486 preferably comprise a database structure or "hashtable" of entries for quickly producing a list of prompt files, this use of system resources may be deferred until such time as it is determined that the language capabilities are in fact needed. At such step 516, parser 488 accesses grammar files 492 (as described previously in connection with FIG. 25) to produce rules 486. It also be noted that, in particular embodiments, a default sets of rules or various sets of rules for particular languages may be developed at the time of manufacture or testing, at boot-up of the system, or at the command of a system administrator. What is important is that step 516 be performed prior to processing of prompt requests for particular language or language variants supported by the system. As will be appreciated from the foregoing, language capabilities may be more readily added to or modified, by a non-programmer, etc., by adding grammar and sound files to a known location in the system. Thus, language capabilities may be added or changed in a more expedited and desirable manner.

Although various preferred embodiments of the present invention have been disclosed for illustrative purposes, those skilled in the art will appreciate that various modifications, additions and/or substitutions are possible without departing from the scope and spirit of the present invention as disclosed in the claims.

APPENDIX A

Exemplary Grammer File Ssecification

A grammar file is made up of rules. Rules preferably have the following form:
Definition
RULE_NAME:
Definition;
END The "RULE_NAME:" is the unique name of the rule. The "RULE_NAME:" can be made of any characters A–Z, a–z, 0–9 or '_'. It can only start with the characters A–Z or a–z and it must end with a ':'.

"END" marks the end of a rule.

The "Definitions;" is the definition of the rule. Rule definitions must end in a semi-colon (;). Rule definitions can be made of the following components:

P(XXXX)
A reference to a specific prompt where 'XXXX' is the four digit key to the specific prompt. For example, P(0001) references the prompt, "I'm sorry you are having trouble," in the US English grammar.

<RULE_POINTER>
A reference to another previously defined rule. "RULE_POINTER" must match a name of a rule already defined in the grammar.

{PROMPT}
A special place holder for a dynamically created prompt. A dynamically created prompt could be a user's name or greeting.

A simple example of a rule is:
HOLD_FOR_EXTENSION:
P(9007)P(5132)<DIGIT>;
END

There are five types of Rules:

Simple
A simple rule can have any number of prompts and at most one other rule, Below are a few examples of simple rules.
Rule for saying a phrase like, "Please hold for extension 200."
HOLD_FOR_EXTENSION:
P(9007)P(5132)<DIGIT>;
END
Rule for saying a phrase like, "Extension 200 is unavailable."
EXTENSION_UNAVAILABLE:
P(5135)<DIGIT>P(5136);
END
Rule for saying a phrase like, "I'm sorry, extension 200 does not answer."
SORRY_EXTENSION_DOES_NOT_ANSWER:
P(5131)P(5132)<DIGIT>P(5139);
END Complex
A complex rule is just like a simple rule, but it can have any number of other rules. Below are a few examples of complex rules.
Rule for saying a phrase like, "Message received at 1:00 pm on Tuesday, June 22."
TIME_STAMP:
P(5171)P(5114)<TIME>P(9001)<DATE>;
END
Rule for saying a phrase like, "The system will try to notify you from 8:00 AM until 5:00 PM, calling every 15 minutes."
NOTIFY_SCHEDULE:
P(5168)<TIME>P(5169)<TIME>P(5170)<DURATION_MINUTES>;
END Prompt
A prompt rule is simply a '{PROMPT}' component. Below are a few examples of rules that contain a prompt rule.
Rule for saying a phrase like, "Your recorded name is 'Chris Johnson'."
RECORDED_NAME:
P(5167){PROMPT};.
END
Rule for saying a phrase like, "Please hold for 'Fred Sarkissian'."
HOLD_FOR_NAME:
P(9000){PROMPT}P(5141);
END Index
An index rule is a rule with multiple rule definitions. An example of an index rule is:
ORDINAL:
[1] P(5057);
[2] P(5058);
[3] P(5059);
[4] P(5060);
[5] P(5061);
END An index rule can have a special modifier called 'RANGE', which is a short cut for repeating a similar rule across multiple indexes. For example:
RANGE_TEST:
[1] P(5057);
[2] P(5058);
[3] P(5059);
[4] P(5060) RANGE 10;
END This rule would replicate the rule definition of 'P(5060)' up till and including index 10. It is the same as the rule:
RANGE_TEST:
[1] P(5057);
[2] P(5058);
[3] P(5059);
[4] P(5060);
[5] P(5060);
[6] P(5060);
[7] P(5060);
[8] P(5060);
[9] P(5060);
[10] P(5060);
END Digit A digit rule is a special case of an index rule. It has the name 'DIGIT' and it is a rule that provides digit prompts for other rules. A digit rule does this by automatically using all the digits passed as parameters. Normally, if the parameter list of "274" was passed to an ordinary index rule then the first parameter '2' would be stripped off and the rest of the parameters "74" would be passed to the rule found at the index 2. A digit rule, by contrast, will continually call itself as long as the first parameter is a number, appending the results of the last call of the digit rule to the previous. Thus a parameter list of "274" would result in the prompts from index 2,7 and 4 being appended together in that order. By definition there can only be one digit rule per grammar and indexes of digit rules should not contain Rule Pointers.

Example of usage is:
HOLD_FOR_EXTENSION:
P(9007)P(5132)<DIGIT>;
END

An exemplary digit rule is:
DIGIT:
[0] P(5026);
[1] P(5027);
[2] P(5028);
[3] P(5029);
[4] P(5030);
[5] P(5031);
[6] P(5032);
[7] P(5033);
[8] P(5034);
[9] P(5035);
END

What is claimed is:

1. In a system for managing voice communications, the system providing voice prompts in one or more particular languages, a method for providing a set of voice prompts in a particular language, comprising the steps of:
defining high level grammatical rules for the set of voice prompts in the particular language;
storing the grammatical rules for the set of voice prompts in the system;
developing a set of audio files in the particular language;
storing the audio files in the particular language in the system;
receiving a call from a user, wherein the system initiates a request for a voice prompt in response to the call from the user;
in response to the request for the voice prompt, developing a sequential list of audio files, wherein, when the sequential list of audio files is played by the system, the requested voice prompt is played to the user in the particular language;
wherein the sequential list of audio files is produced based on the grammatical rules;
wherein the system is controlled by a processor and coupled to a wide area communication network, the system providing voice and data communications to a plurality of users, the method further comprising the steps of:
transferring packetized data to and from the system via at least a first packet bus coupled to one or more packet-based devices under control of the processor;
coupling voice communications from one or more telephones to at least one time division multiplex (TDM) bus, wherein the TDM bus is selectively coupled to the wide area communication network under control of the processor;
wherein the processor selectively controls voice communications from the one or more telephones over the TDM bus and packet-based communications over the first packet bus, wherein the sequential list of audio files in accordance with the particular language are developed and played under control of the processor, wherein system configuration and management commands for controlling the system via the processor are remotely generated and received by the system via the wide area communication network and the TDM bus and/or via an external computing device and the first packet bus;
wherein the system is controlled at least in part in response to one or more commands entered by the user after playing of the requested voice prompt, wherein the packet-based communications include VoIP communications.

2. The method of claim 1, wherein a parser parses the grammatical rules to produce a database structure, wherein, in response to the request for the voice prompt, the sequential list of audio files is produced based on the database structure.

3. The method of claim 1, wherein the steps of defining high level grammatical rules, storing the grammatical rules, developing a set of audio files and storing the audio files are repeated a plurality of times for a plurality of particular languages, wherein the system provides voice prompts in each of the plurality of particular languages.

4. The method of claim 3, further comprising the step of determining which of the particular languages are to be used for a particular user.

5. The method of claim 1, wherein the system includes hardware and software selectively allocating resources within the system, wherein the processor determines a communication path from one or more communication paths in the system for each of the voice and packet-based communications in the office based on available network resources, type of communication, and/or usage patterns in the office.

6. The method of claim 1, wherein a LAN bus is coupled to the first packet bus and a second packet bus is coupled to the LAN bus, wherein the processor controls communications between the first packet bus and the second packet bus over the LAN bus.

7. The method of claim 1, wherein the system comprises hardware and software selectively allocating resources within the system, wherein the system determines one or more communications paths within the system and over the wide area communication network for processing voice and packet-based communications based on predetermined rules.

8. The method of claim 7, wherein the rules selectively allocate resources within the system as a function of time of day, resource availability over the wide area communication network, type of communication and/or usage patterns.

9. The method of claim 1, wherein the TDM bus comprises an MVIP bus and/or wherein the first packet bus comprises an Ethernet bus.

10. The method of claim 1, wherein data communications are coupled to the TDM bus via an HDLC protocol, wherein a framing/deframing circuit coupled to the TDM bus frames and deframes the data communications to and from the HDLC protocol.

11. The method of claim 1, wherein data communications are coupled to the TDM bus an ATM protocol, wherein a framing/deframing circuit coupled to the TDM bus frames and deframes the data communications to and from the ATM protocol.

12. The method of claim 1, wherein the system controls voice communications between one of the telephones and the wide area communication network, wherein packet-based communications are concurrently occurring between the wide area communication network and the first packet bus.

13. The method of claim 1, wherein a multiplexer is coupled to the TDM bus, wherein the multiplexer maps data to predetermined slots of frames of the TDM bus, wherein a framer/deframer is coupled to the multiplexer, wherein the framer/deframer processes data in accordance with a first protocol and in accordance with a second protocol.

14. The method of claim 13, wherein a digital signal processor circuit is coupled to the framer/deframer and the TDM bus, wherein the digital signal processor circuit provides at least a dial tone or DTMF digit detection for at least certain of the plurality of telephones coupled to the TDM bus.

15. The method of claim 14, wherein, the processor selectively couples data to the digital signal processor circuit for processing, wherein data communications over the wide area communication network in accordance with the first protocol occur via the TDM bus, wherein data communications over the wide area communication network in accordance with the second protocol occur via the TDM bus.

16. The method of claim 13, wherein the first protocol comprises HDLC and/or the second protocol comprises ATM or a raw data protocol.

17. The method of claim 13, wherein the first and second protocols each comprise HDLC.

18. The method of claim 1, wherein voice communications that stay in a circuit-switched form in the communication system occur over the TDM bus and the wide area communication network, and wherein VoIP packet-based communications are selectively coupled to the wide area communication network via the TDM bus.

* * * * *